(12) United States Patent
Miller et al.

(10) Patent No.: US 11,955,116 B2
(45) Date of Patent: Apr. 9, 2024

(54) ORGANIZING CONTENT FOR BRANDS IN A CONTENT MANAGEMENT SYSTEM

(71) Applicant: Sinclair Broadcast Group, Inc., Cockeysville, MD (US)

(72) Inventors: Benjamin Aaron Miller, Issaquah, WA (US); Jason D. Justman, Seattle, WA (US); Lora Clark Bouchard, Leavenworth, WA (US); Michael Ellery Bouchard, Leavenworth, WA (US); Kevin James Cotlove, Normandy Park, WA (US); Mathew Keith Gitchell, Port Orchard, WA (US); Stacia Lynn Haisch, Seattle, WA (US); Jonathan David Kersten, Snohomish, WA (US); Matthew Karl Marchio, Bonney Lake, WA (US); Peter Arthur Pulliam, Seattle, WA (US); George Allen Smith, Woodinville, WA (US); Todd Christopher Tibbetts, Seattle, WA (US)

(73) Assignee: Sinclair Broadcast Group, Inc., Cockeysville, MD (US)

( * ) Notice: Subject to any disclaimer, the term of this patent is extended or adjusted under 35 U.S.C. 154(b) by 351 days.

(21) Appl. No.: 17/142,397

(22) Filed: Jan. 6, 2021

(65) Prior Publication Data

US 2021/0125606 A1  Apr. 29, 2021

Related U.S. Application Data

(63) Continuation of application No. 15/170,886, filed on Jun. 1, 2016, now Pat. No. 10,923,116.
(Continued)

(51) Int. Cl.
*G10L 15/18* (2013.01)
*G06F 3/0482* (2013.01)
(Continued)

(52) U.S. Cl.
CPC ........ *G10L 15/1822* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS

| 5,638,113 A | 6/1997 | Lappington et al. |
| 6,125,229 A | 9/2000 | Dimitrova et al. |

(Continued)

FOREIGN PATENT DOCUMENTS

| WO | 2012/139200 A1 | 10/2012 |
| WO | 2014/191054 A1 | 12/2014 |

(Continued)

OTHER PUBLICATIONS

James Lin et al, "Employing patterns and layers for early-stage design and prototyping of cross-device user interfaces," The 26th Annual Chi Conference on Human Factors in Computing Systems, CHI 2008: Conference Proceedings ; Apr. 5-10, 2008 in Florence, Italy, ACM, New York, NY, USA, Apr. 6, 2008, pp. 1313-1322.
(Continued)

*Primary Examiner* — Hsiungfei Peng
(74) *Attorney, Agent, or Firm* — IceMiller LLP

(57) ABSTRACT

Content is organized for brands by selecting a plurality of brand templates. After each selection, a set of properties is generated by applying a portion of settings of the respective brand template, with the remaining settings being overridden with settings for a channel communicating one of a
(Continued)

plurality of presentations to a node of a network involved in the communication. The plurality of presentations may include different renditions of the same content. The properties may include sections configured for different focus areas and/or types of content associated with at tags to enable brand-level-targeting. Filters may be identified in the properties. Based on each of the identifications, a property from among the generated sets of properties may be selected based on comparisons with the associated tags.

11 Claims, 54 Drawing Sheets

Related U.S. Application Data

(60) Provisional application No. 62/170,050, filed on Jun. 2, 2015, provisional application No. 62/169,502, filed on Jun. 1, 2015, provisional application No. 62/169,518, filed on Jun. 1, 2015, provisional application No. 62/169,507, filed on Jun. 1, 2015, provisional application No. 62/169,505, filed on Jun. 1, 2015, provisional application No. 62/169,506, filed on Jun. 1, 2015.

(51) Int. Cl.

| | |
|---|---|
| *G06F 3/04847* | (2022.01) |
| *G06F 3/0488* | (2022.01) |
| *G06F 16/31* | (2019.01) |
| *G06F 16/48* | (2019.01) |
| *G06F 40/106* | (2020.01) |
| *G06F 40/186* | (2020.01) |
| *G10L 15/04* | (2013.01) |
| *G10L 15/26* | (2006.01) |
| *G10L 19/018* | (2013.01) |
| *G10L 25/57* | (2013.01) |
| *H04L 65/611* | (2022.01) |
| *H04L 65/75* | (2022.01) |
| *H04L 67/02* | (2022.01) |
| *H04L 67/53* | (2022.01) |
| *H04N 21/2187* | (2011.01) |
| *H04N 21/234* | (2011.01) |
| *H04N 21/2343* | (2011.01) |
| *H04N 21/235* | (2011.01) |
| *H04N 21/254* | (2011.01) |
| *H04N 21/426* | (2011.01) |
| *H04N 21/438* | (2011.01) |
| *H04N 21/442* | (2011.01) |
| *H04N 21/4627* | (2011.01) |
| *H04N 21/466* | (2011.01) |
| *H04N 21/472* | (2011.01) |
| *H04N 21/4782* | (2011.01) |
| *H04N 21/81* | (2011.01) |
| *H04N 21/845* | (2011.01) |
| *H04N 21/854* | (2011.01) |
| *H04N 21/8543* | (2011.01) |

(52) U.S. Cl.
CPC .......... *G06F 3/0488* (2013.01); *G06F 16/328* (2019.01); *G06F 16/48* (2019.01); *G06F 40/106* (2020.01); *G06F 40/186* (2020.01); *G10L 15/04* (2013.01); *G10L 15/1815* (2013.01); *G10L 15/26* (2013.01); *G10L 19/018* (2013.01); *G10L 25/57* (2013.01); *H04L 65/611* (2022.05); *H04L 65/762* (2022.05); *H04L 67/02* (2013.01); *H04L 67/53* (2022.05); *H04N 21/2187* (2013.01); *H04N 21/23418* (2013.01); *H04N 21/23424* (2013.01); *H04N 21/234363* (2013.01); *H04N 21/23439* (2013.01); *H04N 21/235* (2013.01); *H04N 21/2541* (2013.01); *H04N 21/42684* (2013.01); *H04N 21/4383* (2013.01); *H04N 21/44222* (2013.01); *H04N 21/44226* (2020.08); *H04N 21/4627* (2013.01); *H04N 21/4668* (2013.01); *H04N 21/47205* (2013.01); *H04N 21/4782* (2013.01); *H04N 21/812* (2013.01); *H04N 21/8456* (2013.01); *H04N 21/854* (2013.01); *H04N 21/8543* (2013.01)

(56) References Cited

U.S. PATENT DOCUMENTS

| | | |
|---|---|---|
| 6,324,519 B1 | 11/2001 | Eldering |
| 6,698,020 B1 | 2/2004 | Zigmond et al. |
| 6,724,933 B1 | 4/2004 | Lin et al. |
| 7,702,995 B2 * | 4/2010 | Sahota ............. H04N 21/25883 |
| | | 715/239 |
| 8,094,656 B2 | 1/2012 | La Joie |
| 8,516,374 B2 | 8/2013 | Fleischman et al. |
| 8,542,265 B1 | 9/2013 | Dodd et al. |
| 8,943,197 B1 | 1/2015 | Taylor et al. |
| 9,037,983 B1 * | 5/2015 | Shmulevich .......... G06F 40/197 |
| | | 715/765 |
| 9,053,486 B2 | 6/2015 | Haberman et al. |
| 9,129,094 B2 | 9/2015 | King et al. |
| 9,529,788 B1 | 12/2016 | Gupta et al. |
| 9,898,748 B1 | 2/2018 | Taylor et al. |
| 10,224,028 B2 | 3/2019 | Miller et al. |
| 10,909,974 B2 | 2/2021 | Miller et al. |
| 2002/0052721 A1 | 5/2002 | Ruff et al. |
| 2002/0087530 A1 | 7/2002 | Smith et al. |
| 2002/0128826 A1 | 9/2002 | Kosaka et al. |
| 2002/0138513 A1 | 9/2002 | Korotney et al. |
| 2003/0067554 A1 | 4/2003 | Klarfeld et al. |
| 2004/0070690 A1 | 4/2004 | Holtz et al. |
| 2004/0177383 A1 | 9/2004 | Martinolich et al. |
| 2005/0033657 A1 | 2/2005 | Herrington et al. |
| 2005/0066269 A1 | 3/2005 | Wang et al. |
| 2005/0069225 A1 | 3/2005 | Schneider et al. |
| 2005/0119910 A1 | 6/2005 | Schneider |
| 2005/0138033 A1 | 6/2005 | Katta et al. |
| 2005/0187895 A1 | 8/2005 | Paya et al. |
| 2006/0287912 A1 | 12/2006 | Raghuvamshi |
| 2006/0288372 A1 | 12/2006 | Harada et al. |
| 2006/0293954 A1 | 12/2006 | Anderson et al. |
| 2007/0011206 A1 | 1/2007 | Gupta et al. |
| 2007/0055695 A1 | 3/2007 | Dorai et al. |
| 2007/0074243 A1 | 3/2007 | Verhaegh et al. |
| 2007/0132767 A1 | 6/2007 | Wright et al. |
| 2007/0143856 A1 | 6/2007 | Aerrabotu et al. |
| 2007/0207794 A1 | 9/2007 | Dunko |
| 2007/0212023 A1 | 9/2007 | Whillock |
| 2007/0294249 A1 | 12/2007 | Feyaerts |
| 2008/0040340 A1 | 2/2008 | Varadarajan et al. |
| 2008/0215985 A1 | 9/2008 | Batchelder et al. |
| 2008/0250447 A1 | 10/2008 | Rowe et al. |
| 2008/0281832 A1 | 11/2008 | Pulver et al. |
| 2009/0030984 A1 | 1/2009 | Chen et al. |
| 2009/0150784 A1 | 6/2009 | Denney et al. |
| 2009/0177959 A1 | 7/2009 | Chakrabarti et al. |
| 2009/0287567 A1 | 11/2009 | Penberthy et al. |
| 2010/0037253 A1 | 2/2010 | Sheehan et al. |
| 2010/0043022 A1 | 2/2010 | Kaftan |
| 2010/0281383 A1 | 11/2010 | Meaney et al. |
| 2010/0287475 A1 | 11/2010 | Van et al. |
| 2010/0305855 A1 | 12/2010 | Dutton et al. |
| 2011/0010612 A1 | 1/2011 | Thorpe et al. |
| 2011/0177775 A1 | 7/2011 | Gupta et al. |
| 2011/0197150 A1 | 8/2011 | Huang |
| 2011/0197224 A1 | 8/2011 | Meijer |
| 2011/0211812 A1 | 9/2011 | Tzoukermann et al. |
| 2011/0217023 A1 | 9/2011 | Haot et al. |
| 2012/0011109 A1 | 1/2012 | Ambwani et al. |

(56) References Cited

U.S. PATENT DOCUMENTS

| | | |
|---|---|---|
| 2012/0042091 A1 | 2/2012 | McCarthy et al. |
| 2012/0099022 A1 | 4/2012 | Sundy et al. |
| 2012/0117459 A1 | 5/2012 | Dehaven et al. |
| 2012/0136965 A1 | 5/2012 | Matz |
| 2012/0254917 A1 | 10/2012 | Burkitt et al. |
| 2012/0284290 A1 | 11/2012 | Keebler et al. |
| 2012/0297409 A1 | 11/2012 | Zaslavsky et al. |
| 2013/0003869 A1 | 1/2013 | Burt |
| 2013/0014141 A1 | 1/2013 | Bhatia et al. |
| 2013/0061154 A1 | 3/2013 | Bennett |
| 2013/0073387 A1 | 3/2013 | Heath |
| 2013/0073632 A1 | 3/2013 | Fedorov et al. |
| 2013/0144723 A1 | 6/2013 | Green et al. |
| 2013/0151687 A1 | 6/2013 | Mooneyham |
| 2013/0166580 A1 | 6/2013 | Maharajh et al. |
| 2013/0198609 A1 | 8/2013 | Mokhtarzada et al. |
| 2013/0254022 A1 | 9/2013 | Rubrecht |
| 2013/0262092 A1 | 10/2013 | Wasick |
| 2013/0340012 A1 | 12/2013 | Johnsson et al. |
| 2014/0019492 A1 | 1/2014 | Woods et al. |
| 2014/0059420 A1 | 2/2014 | Cole et al. |
| 2014/0129520 A1 | 5/2014 | Bhogal et al. |
| 2014/0165095 A1 | 6/2014 | Miller et al. |
| 2014/0188907 A1 | 7/2014 | Benchenaa et al. |
| 2014/0189768 A1 | 7/2014 | Kim |
| 2014/0191054 A1 | 7/2014 | Hingley et al. |
| 2014/0199045 A1 | 7/2014 | Lee et al. |
| 2014/0201126 A1 | 7/2014 | Zadeh et al. |
| 2014/0229818 A1 | 8/2014 | Goswami |
| 2014/0245132 A1 | 8/2014 | Schultz et al. |
| 2014/0316899 A1 | 10/2014 | McGowan et al. |
| 2014/0325328 A1 | 10/2014 | Beadles |
| 2014/0325362 A1 | 10/2014 | Potts et al. |
| 2015/0082349 A1 | 3/2015 | Ishtiaq et al. |
| 2015/0120768 A1 | 4/2015 | Wellen et al. |
| 2015/0135242 A1 | 5/2015 | Riedl et al. |
| 2015/0200944 A1 | 7/2015 | Zhang et al. |
| 2015/0245094 A1 | 8/2015 | Schneider et al. |
| 2015/0358688 A1 | 12/2015 | Kummer |
| 2016/0004820 A1 | 1/2016 | Moore |
| 2016/0173915 A1 | 6/2016 | McCarthy et al. |
| 2017/0063969 A1 | 3/2017 | Franks |
| 2018/0197212 A1 | 7/2018 | Whitman |
| 2021/0136458 A1* | 5/2021 | Carney ............ H04N 21/47202 |

FOREIGN PATENT DOCUMENTS

| | | |
|---|---|---|
| WO | 2015/013411 A1 | 1/2015 |
| WO | 2015/054627 A1 | 4/2015 |

OTHER PUBLICATIONS

Jan Meskens et al, "Gummy for multi-platform user interface designs," AVI '08 Proceedings of the Working Conference on Advanced Visual Interfaces; Napoli, Italy; May 28-30, 2008, ACM, New York, NY, May 28, 2008, pp. 233-240.

"MediaFUSE FX Automated content repurposing and multi-distribution system" Product Data Sheet, Grass Valley, 2011, 8 Pages; Retrieved from the Internet at http://cdn-docs.av-iq.com/pdfs/LPS-4006D-1_MediaFUSE FX.pdf [Cited in related U.S. Appl. No. 15/170,886].

Back et al., "Tags and tagging—Creating meanings, organizing, ad socializing with metadata", ESPOO 2008, VTT Research notes 2449, pp. 94. (Year: 2008).

* cited by examiner

| FIG. 27B | FIG. 27C |
| --- | --- |
| FIG. 27D | FIG. 27E |
| FIG. 27F | FIG. 27G |
| FIG. 27H | FIG. 27I |

FIG. 27A

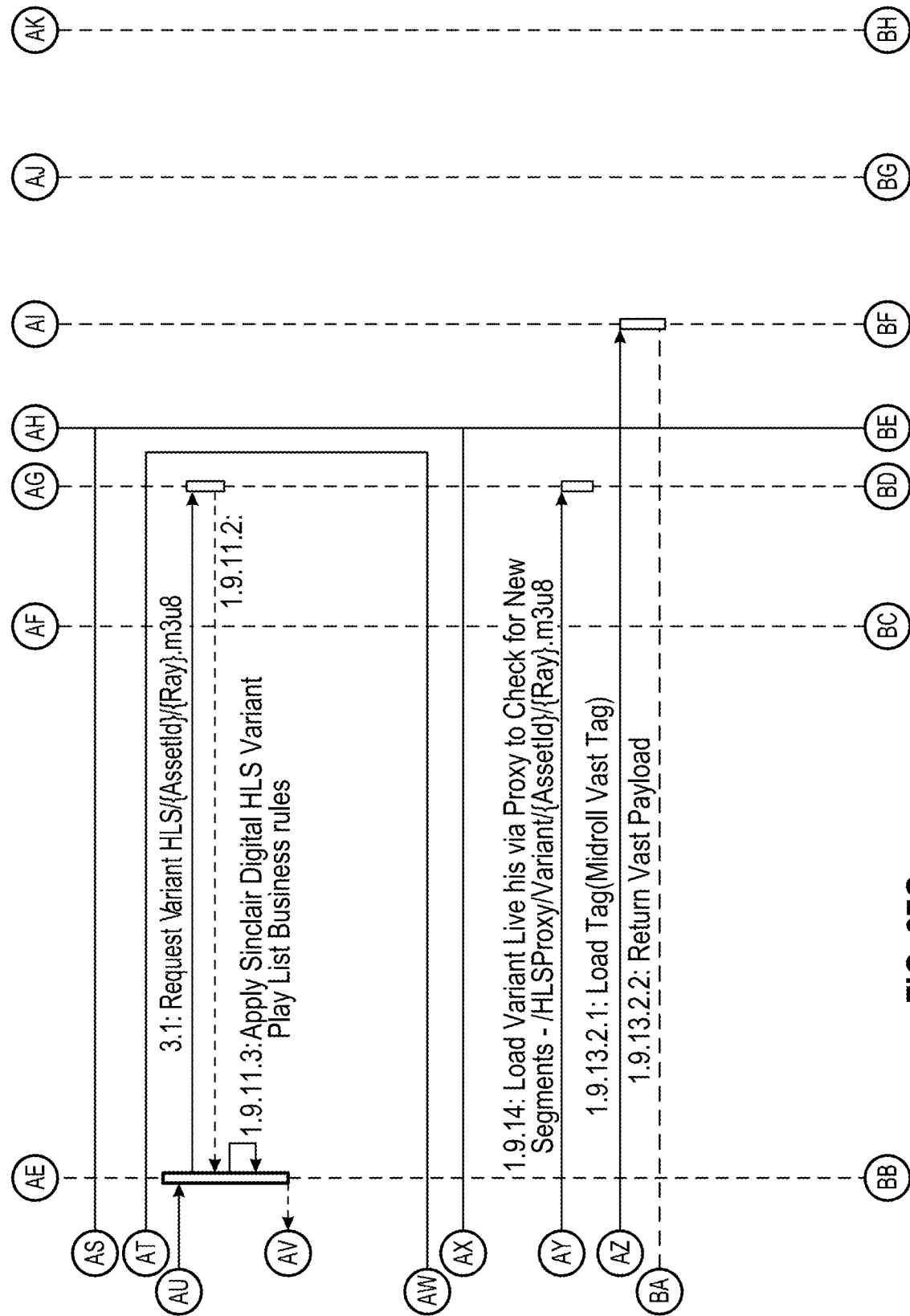

ORGANIZING CONTENT FOR BRANDS IN A CONTENT MANAGEMENT SYSTEM

CROSS-REFERENCE TO RELATED APPLICATIONS

This application is a continuation of U.S. patent application Ser. No. 15/170,886, entitled "Break State Detection in Content Management Systems," filed Jun. 1, 2016, which claims priority to U.S. Provisional Application No. 62/169,502, filed Jun. 1, 2015; and U.S. Provisional Application No. 62/169,505, filed Jun. 1, 2015; and U.S. Provisional Application No. 62/169,506, filed Jun. 1, 2015; and U.S. Provisional Application No. 62/169,507, filed Jun. 1, 2015; and U.S. Provisional Application No. 62/169,518, filed Jun. 1, 2015; and U.S. Provisional Application No. 62/170,050, filed Jun. 2, 2015, the entire contents of each of which are incorporated herein by reference.

FIELD OF THE DISCLOSURE

This disclosure is directed to content management systems and particularly to systems and methods for ingesting, packaging, routing, modifying, and publishing content.

BACKGROUND

Related Art

Content management systems or CMSs, are typically employed to store, organize, manage, and publish content, such as video, images, texts, audio, etc. Current CMSs are utilized for news reporting, to run websites supporting blogs, as data depositories, and for other similar content management applications. CMSs enable users to control content that is presented, for example, on one of a variety of channels such as web pages, via device specific interfaces or operating systems, such as IOS and Android, etc., in an easier way, than for example, coding the presentations manually.

However, current CMSs fail to provide integrated services to enable users to easily configure and customize presentations for a large number of web pages or properties. Current CMSs further fail to provide these services at near-live speeds, for example, in the case of managing a live broadcast such as a news event or story, and thus fail to capture a potentially large consumer base. Current CMSs also do not have the capability to divide live content into segments for publishing for different audiences and in a more directed manner. Related to this deficiency, no known current CMS provides an automatic way to control and manage digital rights of various feeds of content, such that the content can be distributed to properties in near-live time. Current CMSs additionally fail to provide viewership metrics in a useful and integrated way, for example, requiring a user to run another separate program from the CMS to view such metrics and optimize the content presentation. Accordingly, there is a need for a better content management system.

SUMMARY OF FEATURES OF THE DISCLOSURE

The described systems and methods address one or more of the deficiencies noted above with existing content management systems. The digital media integration exchange system or platform (MIX Platform) described herein may provide one or more of the following features.

Integrated System Innovations And Features

The MIX platform can provide a novel integration of live video processing and ingestion, live content and media feed ingestion, ad hoc media uploading and provisioning, property (e.g., website) configuration, content tagging, production, and publishing mechanisms in a uniquely integrated flow or process that supports comprehensive integration with live/linear video production and coverage from any source, large-scale publishing across multiple brands at scale, and set up and control of multi-channel (web, mobile, OTT, native applications, etc.) across a single unified workflow.

The described system enables users to create properties and structures of information organization for a brand (i.e. KOMO News, Hometown Live, etc.) and store these structures in a database that is not directly tied to a specific channel, content, or package.

The described system enables users to create property structure templates and to lock aspects of the settings and hierarchy in order to allow replication of standards of look and feel, organization, and to an extent, content structure across multiple properties using the same structure as a property itself.

The described system can store a full copy of each property, property template, and a known differentiation between each property and its linked property template, allowing templates to be revised and optionally re-applied to all linked properties on a one-by-one, all, or on a part-by-part basis.

The described system supports the automatic discovery of tags on all content (copy, video, audio, etc.) via semantic analysis, interpretation, and cataloging of tags as they are discovered, and can automatically infer tags based on relationships within packages to ensure all content of all kinds have topical tagging without user intervention.

The system supports a layered construct for presentation definition which enables technology agnostic creation of detailed presentation instructions that include simple "Presentation Layouts" that contain no content, instructions, or components, "Presentation Templates" that declare some settings and place some named components and component settings (these do not render without some changes usually), "Presentations" that contain layout instructions, content filters, component placements, and component settings specific to a type of property (section, screen, page, etc.), and "Presentation Instructions" that contain all of the above and the appropriate content to be injected into named components at run-time—all based on the same structure.

The system supports storing presentations outside of the database in files at the Layout, Presentation Template, and Presentation levels, and the generation and storage of known differences between a Presentation and its linked Presentation Template. This enables the full copying of these assets from one environment to another by copying the file structures alone and providing the option of updating presentations based on a common template by updating the template and re-applying differences. This also enables the system to fail at re-applying templates gracefully by leaving the old presentation in place in full and to perform template-to-presentation synchronization offline for performance reasons.

The system also supports routing of content to presentations via named filters that define full Boolean searches driven primarily by content tagging and publish time limits (but not only) wherein named filters are referenced in the presentation or presentation template and may be edited or altered offline without a change to the presentation, effectively altering the publishing process.

The system will provide all configured sections of a brand-level property for targeting in both primary targeting and syndication processes automatically, allowing explicit targeting by a user of a specific brand and location and will store this intent with every user action and save. The system uses the first filter-driven component of each section's mapped default presentation to derive which contextual tags should be implied from an explicit targeting or syndication action and will apply these tags to the package and all content added during package publishing to ensure at least a base level of contextual tagging for all content and ensure placement of content on the desired page.

The described system is able to render previews of sections and content display presentations for all target properties and channels from within the publishing interface in reaction to changes in tagging, targeting, content, and renditions of content before publication and leveraging the same code (or web-based equivalent code) that produces the final audience-side rendering, ensuring 100% fidelity with the actual end result.

The described system leverages the same rendering code to enable visual configuration of presentations (or web-based equivalent code).

Component Structure Innovations and Features

The MIX Platform can support the development of web-based rendering components that are either intended for web-based content rendering or to emulate content rendering on another device (mobile, OTT, and other applications) using a simple file structure and deployment process unique to the platform.

A single directory may house all known rendering components and contains directories for all known component type groupings, containing all named components, containing multiple historical versions of the component, which in turn contain all proprietary files that generate and support generation of the component and a resources folder that contains static files that support the component at run-time after rendering of a presentation.

A compilation and publishing process may enable a local component file structure on a local machine to be compressed, compiled, obfuscated, and deployed to a running MIX Platform to affect changes to presentations across multiple defined properties as needed.

A versioning system that enables some properties to use newer versions of an existing component while others use previously defined versions of components for use in AB testing, incremental rollouts, and rapid rollback (among other uses) wherein the code for all versions past is still present in the deployed structure.

The described system may provide the capability to replicate a deployed component set from one instance of the MIX Platform to another by simply copying the deployment directories from one instance to another.

A separate directory structure for static resources and rendering code at deployment time may enable the renderer to cache and leverage Content Distribution Networks for files that don't drive dynamic rendering of content, all maintained automatically by the compilation and deployment process above.

The described system may provide the capability to configure alternative channel versions of each web component for rendering alternative channel content wherein a directory for each channel mirrors the main component directories and provides alternative component code snippets that either conform to the rendering structure or are simply aggregations of native application code.

Tools built into the services and application may enable the MIX Platform to automatically react to changes in the component file structures at run-time and provide newly published components and component groups immediately for use in web-based presentation building interface for placement and configuration without use of any database tables or relationships at all. This means the system reacts to new code as it is published without database changes, updates, or restarts of the system and changes can take effect immediately as new code is published.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIGS. 13A and 13B show example interfaces for editing and managing a property, according to the principles of the disclosure.

FIG. 16 shows an example interface for editing a presentation, according to the principles of the disclosure.

FIGS. 27A through 27I illustrate an example sequence diagram for break state detection and ad flexing implemented in conjunction with a client device.

DETAILED DESCRIPTION OF THE DISCLOSURE

Figure 1:
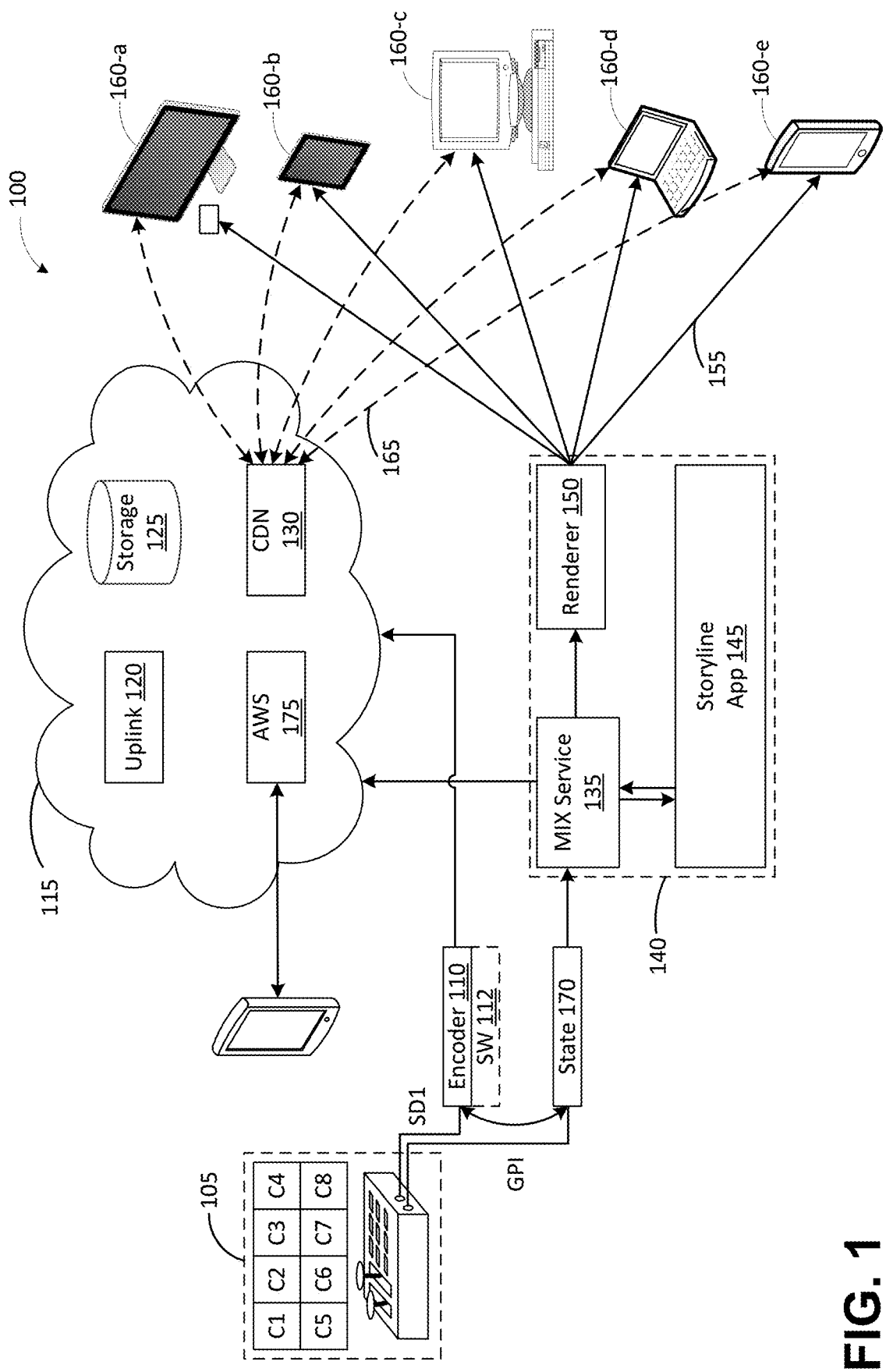
FIG. 1 shows an example digital media integration exchange system, according to the principles of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Aspects of the disclosure may be implemented in any type of computing device or combinations of computing devices, such as, e.g., a desktop computer, personal computer, a laptop/mobile computer, a personal data assistant (PDA), a mobile phone, a tablet computer, a cloud computing device such as a virtual machine or virtual instance, one or more hardware or virtual servers, and the like, with wired/wireless communications capabilities via the communication channels.

1. Digital Media Integration Exchange System Overview

Managing and controlling the seamless production of digital media assets or content and their cross-channel and cross-property distribution across a complex, interactive, digital property network may be enabled by a globally deployed, distributed system capable of unifying diverse technical solutions that are constantly evolving and changing, as described in further detail herein. These solutions include but are not limited to those that enable the seamless and integrated ingestion, processing, archival, manipulation, and packaging of live and previously recorded video content, archived and continuously updating images (e.g., photos and artwork), multi-form structured data (e.g., detailed weather reports, sports scores, and statistical analyses), general formatted text and copy, etc. The described solutions and systems provide for continuous processing, storage, production, packaging, and distribution of content in a simple, flexible, and integrated workflow. This workflow enables editors to visually manipulate user experiences, content packaging, tailoring of content package renditions, representations, and references by channel and interact with content optimization processes at scale. These features are vital to continuously adapting to the needs of an evolving media audience and to ensuring the best integrated experience across web, mobile, social, and over-the-top (OTT) or interactive large (e.g. 10 feet) television experiences, and other electronic presentation devices, formats, etc.

The techniques and systems described herein enable the management of brand-level properties that represent cross-channel content organizations supporting the simple publication of packaged media to specific audiences, assisting audiences and users, via intuitive and integrated interfaces, in the navigation and discovery of new and previously published content, and dictating the visual user experience across web, mobile, OTT, and other interactive digital channels for the same and different brands. The techniques and systems described herein may ensure a consistent brand experience from a brand look and feel, content organization, and interactive experience standpoint and may enable executive producers and editors to manage the configuration of these properties visually across channels, including the integration of live content, thus providing a competitive advantage to each brand. A brand manager can easily, using the described content manipulation and publishing system, visually structure the brand focuses or content franchises, tailor web, mobile, and other experiences visually, preview available content for each area or sub-area, and drive the publishing, preview, and audience experience seamlessly from a single interface. One or more of these features may be provided by a sophisticated user interface and system capable of managing multiple properties across a network, re-using interface components across channels, representing each in a web-based user interface for brand managers and content/media producers, and tailoring the delivery of content to the audience within the configured parameters.

In a large-scale, multi-platform network environment, the production of content encompasses multiple distributed media production facilities, studios, and television distribution platforms for over-the-air and cable and multichannel video programming distributor (MVPD) linear distribution. These characteristics of content production present additional challenges to content publishing systems. The described systems may work seamlessly with the production of video and content for linear distribution, integrate with master control production systems and programming production systems, and enable digital properties to mirror and react to live and pre-produced programming to provide a complimentary content experience. To accomplish this integration, physical wiring, virtualized web services, and process integrations with the natural flow of linear media production that integrate seamlessly into the digital content production flow and the audience experiences are provided. These solutions include but are not limited to providing web-based services that tell digital producers and client systems when programming of a certain type is on-air, in commercial break, being overridden, etc. This process also involves the integration of the broadcast air-chain, closed caption information (as it streams), audio fingerprint and content recognition (e.g., speech recognition), and digital rights management into the digital production process. Innovations in this part of the system streamline the production of digital live simulcast content with television experiences, enable automated categorization, clipping, indexing, and repurposing of content in near real-time, and allow for the routing of digital content from one or more sources into the air chain or into production support systems that appear on-air (i.e., over-the-shoulder displays for news and other programming) as needed.

The described system additionally provides ample services for measuring the consumption of media by both anonymous and registered users based on content placement, time, and contextual analysis. The system measures engagement and builds aggregate profiles across user groups to enable continuous optimization for delivery of digital content to each individual or the optimization of content production (i.e. content bounties or tailoring) based on past performance and content profiling. The integration of the measurement feedback loop into the brand property set-up, advertising configuration, and content production process in short (e.g., less than 30 minutes), medium (intraday), and long-term planning activities within the system provide differentiation to a large scale media company (or a small one) using the platform by helping to increase audience, improve engagement, and reduce the time and cost required to react to shifts in audience behavior, desires, and needs.

2. System Structure

One or more aspects of the described digital media integration exchange system can be implemented on a variety of computing devices or nodes, including multiple nodes geographically distinct from each other. In some aspects, one or more servers (hardware or virtualized instances) may provide the features and functionality described herein. In some aspects, one or more features of the system may be distributed across multiple nodes, including utilizing web and virtual services, such as Amazon Web Services (AWS).

One example implementation of the digital media integration exchange system or MIX platform 100, configured to provide one or more of the described features, is illustrated in FIG. 1. Content of various types, size, etc., may be received or ingested by a master control 105, for example from on-the-air broadcasters (e.g., news channels or broadcasts, or other content broadcasts), or other content sources. In some cases, the content received may be previously recorded content, such as Video-on-Demand (VOD), weather reports, new stories including text and images, etc. The master control 105 may passively receive content, or may actively search for and retrieve content.

The master control 105, which may be implemented in dedicated hardware, software, or a combination thereof, may provide the received or intercepted content to an encoder or encoding system 110, which may then send the content to one or more virtual or cloud based computing resources 115. The encoder 110 may modify, organize, manage, etc., the content in any of a number of ways, as will be described in greater detail below. The encoder 110 may implement software 112 specifically configured to enable the modification of the content, as will also be described in greater detail below. In some aspects, SW 112 may include custom video processing and slicing software (VPSC) capable of transmitting slicing events and accepting MPG4 encoding changes as needed. The VPSC custom software 112 may encode meta-data in existing MPG4 formats or other formats custom to knowing start and end of program and other data. In one example, the content may be received by the encoder 110, over a serial digital interface (SDI), processed by SW 112, and subsequently sent to an one or more computing resources, such as one or more virtual or cloud resources 115. The virtual resources may include an uplink or input component 120, which may receive content and communicate the received content to a content delivery network 130 and/or one or more storage components 125. In some aspects, one or more virtual or cloud components 120, 125, 130, may be managed or implemented by a service, such as AWS 175. One or more virtual components 120, 125, 130 may communicate the content to a Media Integration Exchange (MIX) service 135, for example, which may also be provided by virtual resources, or hardware resources, such as a compute node or server 140, as illustrated.

The MIX service 135 may communicate, configure, and/or provide or host an application, such as the Storyline Application 145, that provides an interface to enable configuring, managing, modifying, and/or publishing content across one or more channels, brands, properties, etc. The application 145 may provide one or more interfaces, such as graphical user interfaces, for managing content, as will be described in greater detail below. The MIX service 135 may communicate with one or more renderers 150 to provide previews and/or publishing of configured content, for example across multiple channels, such as via one or more communication links 155 (e.g., via a wireless network, the web, etc.) to a variety of devices 160 running various operating systems and supporting various formats, languages, etc. The devices 160 may include, for example, one or more set-top boxes 160-*a*, tablets 160-*b*, personal or desktop computers 160-*c*, laptops 160-*d*, and/or mobile devices or smart phones 160-*e*. The MIX service 135 and/or the renderer 150 may provide content configured for the web or internet presentation by mirroring the content for other operating systems, such as Android, IOS, etc.

In some aspects, content may be communicated by the content delivery network 130, for example to/from one or more devices 160, by various communication links 165. In some aspects, the content received from the devices 160 may include live or VOD content, which may include near-live content (e.g., a recording of an event, sound, etc., by the device and subsequently uploaded to a social networking site, for example). In some cases, the content received from devices 160 may be received passively or actively, by one or more requests for content.

In some aspects, the master control 105/SW 112 operating on the encoder 110 may analyze and determine, based on the content, if the content includes live broadcast content, advertisements or secondary content, or is video on demand content. The master control 105 may indicate the results of this determination, for example via one or more signals such as a state or general purpose interface (GPI) signal 170, which may be communicated directly to the MIX service 135, or may be routed to one or more of the virtual components 120, 125, 130. The GPI signal 170 may enable the MIX service 135 to perform various features, such as providing targeted content delivery, indicating when content is live, providing flexible, near real time content with customizable advertisements, etc., the likes of which will be described in greater detail below.

3. System Architecture

Figure 2:
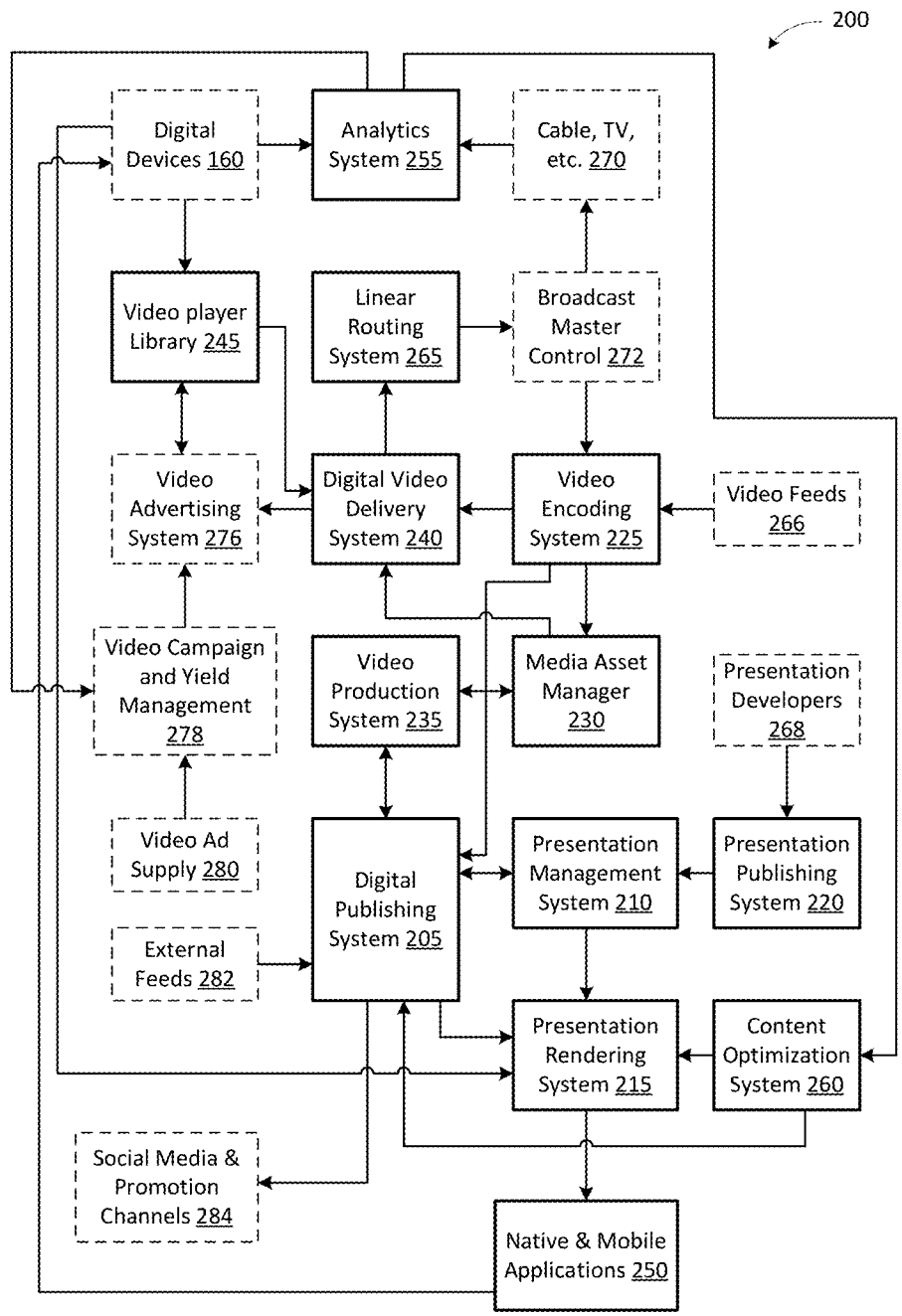
FIG. 2 shows an example system architecture of the digital media integration exchange system of FIG. 1, according to the principles of the disclosure.

The digital media integration exchange system 100 may provide a cloud-based, integrated system for the ingestion, production, packaging, indexing, publication, and optimization of digital media and advertising across digital channels encompassing two-way communication with the broadcast air chain and linear production processes. In the service of providing that integrated system and its subordinate sub-systems, system 100 may deploy a mix of hardware, firmware, and software that equate to physical and virtual appliances that facilitate these processes. The overall system deployment and logical sub-systems 200 are illustrated in FIG. 2. In order to facilitate the process of ingesting, managing, producing, and publishing content across channels and creating and managing the processes, people, and properties involved this process, the software portion of the system (cloud or virtual-based, and/or including hardware elements) provides the following high-level interfaces. The logical sub-systems 200 may be provided across various components of system 100, as will be described below.

The digital publishing system 205 controls all content and routing of content. This HUB of the digital media integration exchange system 100 enables the functionality to find, manage, create, package, publish, and syndicate media packages and alerts across all properties and channels configured using all feeds, media sources, production tools, and integrations enabled through other sub-systems. The digital publishing system 205 also enables workflow and permission management for all functions across the publishing system. In one example, the digital publishing system 205 may be implemented in the MIX service 135 and/or by one or more cloud computing resources 115.

A primary use of the MIX platform 100 is the ongoing production, packaging, and publishing of media assets for audiences across the network of multi-channel digital properties. To this end, the digital publishing system 205 provides multiple ingestion, production, packaging, and publishing solutions and integration points that include managing media and packaging as separate and discrete operations with seamless integrations between them from a systems and a process workflow standpoint. The digital publishing system 205 also provides extensible methods for adding content and media via APIs and through plug-ins that allow automatic and manually triggered ingestion of content.

The presentation management system 210 configures and enables configuration of presentations of content. The presentation management system 210 (also referred to as the property management system 210) enables all cross-channel brands and structures (hierarchies) and the actual cross channel presentations that drive the user experience. Visual interfaces associated with the presentation management system 210 enable administrators to see experiences as they are developed, with content integrated, view performance metrics at multiple levels, and tailored presentations for optimal audience impact across channels. Integrations with the digital publishing system 205 enable seamless publishing and property management activities without a disjoin, e.g., by sharing navigation and interfaces. Integrations with the presentation rendering system 215 ensure that management and actual visualization of presentations for audiences are identical, and integrates with the presentation publishing system 220 to ensure that new capabilities provided by presentation developers 268 work seamlessly in the system 200. These integrations enable display of modifications made to a presentation of content in real time. In one example, the presentation management system 210 and the presentation rendering system 215 may be implemented in the MIX service 135 and/or by one or more cloud computing resources 115.

The presentation rendering system 215 renders content and presentations. This system 215 interfaces with the digital publishing system 205 and the presentation management system 210 to deliver previews and actual views of each presentation to external audiences. The presentation management system 210 is extensible and programmable to provide automatic and visually managed versions of presentations in multiple formats based on URL pattern, for example, and can connect to any digital device 160 via web browser or native application 250. The presentation management system 210 can also provide native code snippets to client applications as needed or custom feeds to drive both behavior and content presentation.

The presentation publishing system 220 provides software development kits (SDKs) and code for publishing presentations. The presentation publishing system 220 enables development of visual layout interpreters or visual media/content display components using a Component SDK and automatically makes them available for inclusion on presentation management activities via simple file upload.

The video encoding system 225, which may be implemented on or by the encoder 110 and/or SW 112, encodes live and on-demand video. This system 225 connects directly to serial digital interface (SDI) video inputs or feeds 266 (or any valid digital video input provided) and encodes and slices video into digital formats for upload to both the live digital video delivery system 240 and the media asset manager 230. Custom firmware and software in this system 225, e.g., SW 112, detect program on-air and break state, help detect program type, and ensures consistent connectivity between the media asset manager 230 and the video delivery system 240. The video encoding system 225, installed at each video production station, also connects into the linear broadcast air-chain, allowing program signaling, automation, and manual production queues to alter digital video encoding and other behavior to flow through to digital channels seamlessly without additional manual intervention.

The media asset manager 230 stores encoded video. The media asset manager 230 provides interfaces for review of stored media both from uploaded sources and live ingestion for direct use as on-demand assets or as raw material for targeted clipping in the video production system 235. The media asset manager 230 can ingest hourly segments of live video from the video encoding system 225 automatically and make on-air programming available immediately every hour for clipping and re-distribution via digital channels. The media asset manager 230 also coordinates the upload of assets from live and external sources to cloud-based storage systems. Producers may access the media asset manager 230 in the digital publishing system 205 via its connection through the video production system 235, enabling integrated upload, search, production, and packaging from any source. The digital publishing system 205 can also ingest feeds from any source and push media into the media asset manager 210 as needed. In some aspects, media assets/content may be stored in storage 125, for example, by the media asset manager 230 and/or the video production and encoding systems 235, 225 implemented in or associated with the MIX service 135.

All media (images, animations, and video), regardless of its ingestion point flows into the media asset management interface and sub-system 230 of the MIX Platform 100. A media library associated with the media asset management system 230 is indexed by topic area, content type, and often ingestion source, providing instant access to certain processes with a single click. Media ingestion via one or more platform APIs from any source will trigger (either explicitly or implicitly) all of the indexing capabilities that help the media asset management system 230 provide a single coherent interface for storing, finding, and using media of all types.

The video production system 235 enables production of video assets. The video production system 235 provides tools and automations capable of altering video length, presentation, and indexing. Visual clipping and modification of video picture size, aspect ratio, and modification of caption and meta-data is all built into and enabled by the video production system 235, which is integrated with the media asset manager 230 for storage and retrieval of binaries and meta-data indexing information and connection to external video sources as required. The video production system 235 can also perform near-real-time video processing and indexing automations of video assets, including automatically tagging video topically via various time-indexed text sources such as transcripts and closed-caption data and automatically segmenting video by program and program segment for re-distribution, which will be described in greater detail below.

The digital video delivery system 240 delivers live and on-demand video, including streaming live video, stored video, and integrates advertising content. The video delivery system 240 proxies connections between the client video player (configuration details of which are stored or accessible via the video player library 245) and the actual streaming video assets (live or on-demand) and integrates directly with the video encoding system 225 for live delivery and with the media asset manager 230 for on-demand video delivery. The digital video delivery system 240 also manages live program on-air and break state, and interfaces with the video production system 235. In some cases, the digital video delivery system 240 a interfaces with the digital publishing system 205, to ensure presentations can react to on-air states as needed to enhance the user experience. The digital video delivery system 240 manages both server-side and client-side mid-stream ad content insertion and dictates video program return signaling via streaming manifest manipulation, simultaneously integrating with client-side player technologies to ensure an optimal video experience for the end user.

The linear routing system 265 routes digital assets to the air-chain.

The video player library 245 displays video and tailors the content presentation experience. The video player library 245 provides a set of native client-side video players across platforms that integrates with the custom digital video delivery system 240 to ensure a continuous and smooth, uninterrupted video experience. Each player buffers programming and advertising and uses server-side signaling (provided by the digital video delivery system proxy 240) to weave seamless streaming content and enhance the user with minimal delay during live programming and programmable breaks for on-demand programs. In some aspects, the video production system 235, the digital video delivery system 240, and/or the video player library 245 may be implemented in the CMS and/or one or more cloud-based computing resources 115.

Native and mobile application 250 customizes experience on various devices 160. Native applications 250 for mobile, smart TV, and set-top-box platforms (including gaming consoles) leverage the video player library 245 to integrate video in a seamless manner. They also integrate with the presentation rendering system 215 to obtain content and configuration data that drive native components to work according to visual representations in the presentation management system 210. This integration of native applications 250 with the presentation rendering system 215 (and by association the presentation publishing system 220 and the presentation management system 210) enables a seamless management and visual manipulation and publishing process that includes multi-platform, multi-screen experiences for a single brand or property, e.g., for a news broadcaster across web, mobile, and set-top-box applications.

The analytics system 255 collects behavioral data based on viewership of published content (which may categorized to provide more tailored data), for example via various metrics such as clicks per minute (CPM). In some aspects, the analytics system 255 may integrate external systems for analytics such as Google's analytics and DFP platforms with internal analytics event detection. Digital devices 160 are fed appropriate event codes via the presentation rendering system 215 to cause native invocation of the analytics system 255, which collects event data specific to the presentation and audience at time of delivery and ensures a near-real-time feedback loop with any of the sub-systems (but particularly the content optimization system 260). The analytics system 255 also supports ingestion and processing of offline data to align with property set up and reports provision through the content optimization system 260 and customization of reports in the digital publishing system 205. New events may be defined and tracked as needed via the internal SDK or through configuration and also via name-value pair passing.

The content optimization system 260 connects content to specific audiences via initiating actions or generating advisements to producers developing presentations of content. The content optimization system 260 performs pattern recognition and learning algorithms (in a pluggable fashion) to ensure that observations and patterns or conditions may be detected to drive behaviors in the presentation rendering system 215 or the digital publishing system 205. Trends and observations are surfaced in reports and inline in presentation management 210, presentation publishing 220, and video production 235 user interfaces to enable visibility into automated publishing changes or override/actions by users during any of these processes. These observations include, but are not limited to the following:

a. Observations of historic performance of ad units
b. Observations of projected sell-through rates for ad units by brand and channel
c. Observations of projected revenue and electronic clicks per minute (eCPM) for ad units by brand and channel
d. Observations of click-through rate (CTR) performance of specific content references and placements
e. Observations of CTR performance of specific contextual tags by brand and audience
f. Observations of Social Sharing activity of specific packages across or within brands and channels In some aspects, the analytics system 255 and/or the content optimization system 260 may be implemented in the MIX service 135 and/or one or more cloud-based computing resources 115.

4. Logical Data Model

Figure 3A:
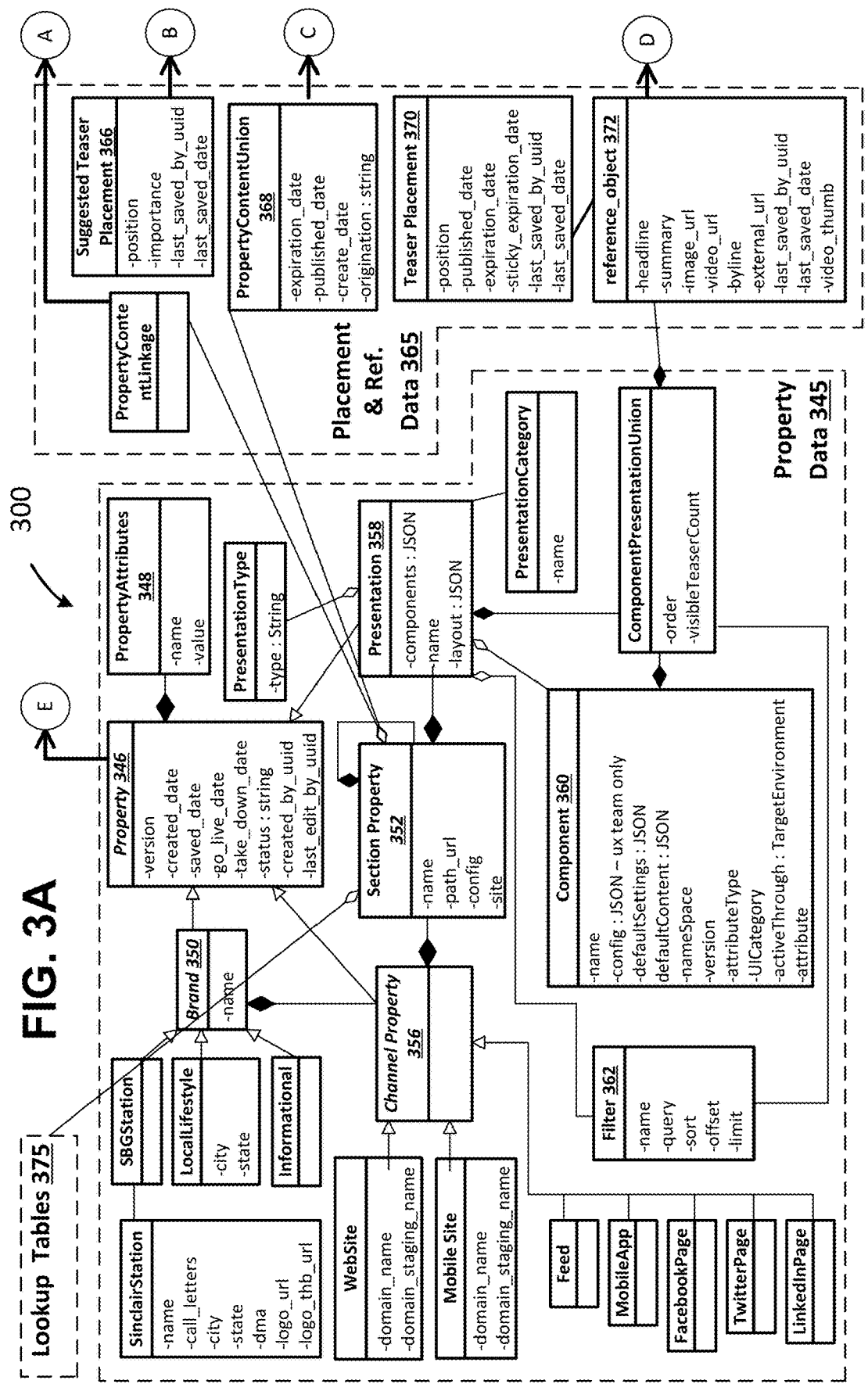
FIGS. 3A, 3B, and 3C show an example data model of the system of FIG. 1, according to the principles of the disclosure.
Figure 3B:
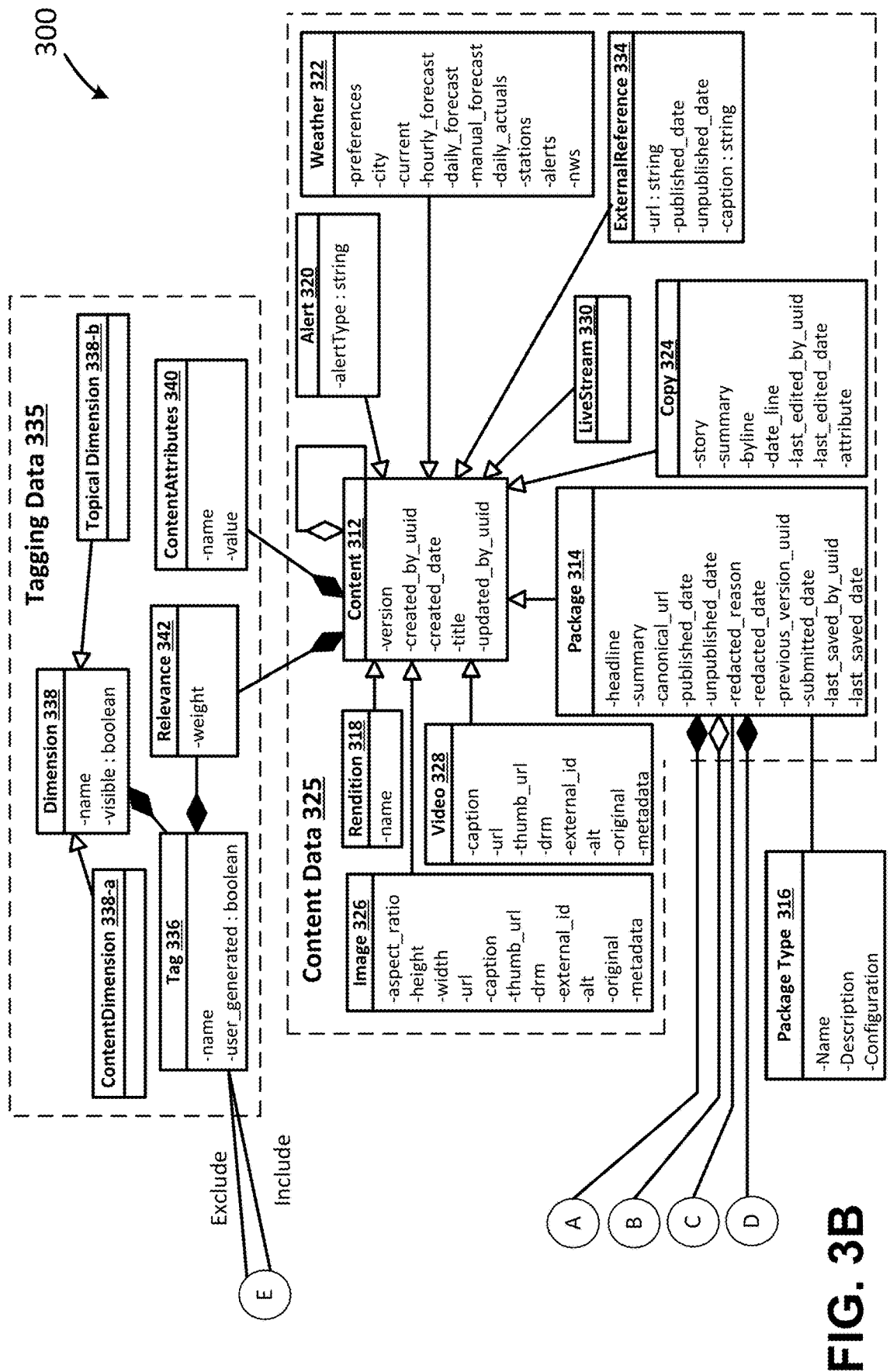
Figure 3C:
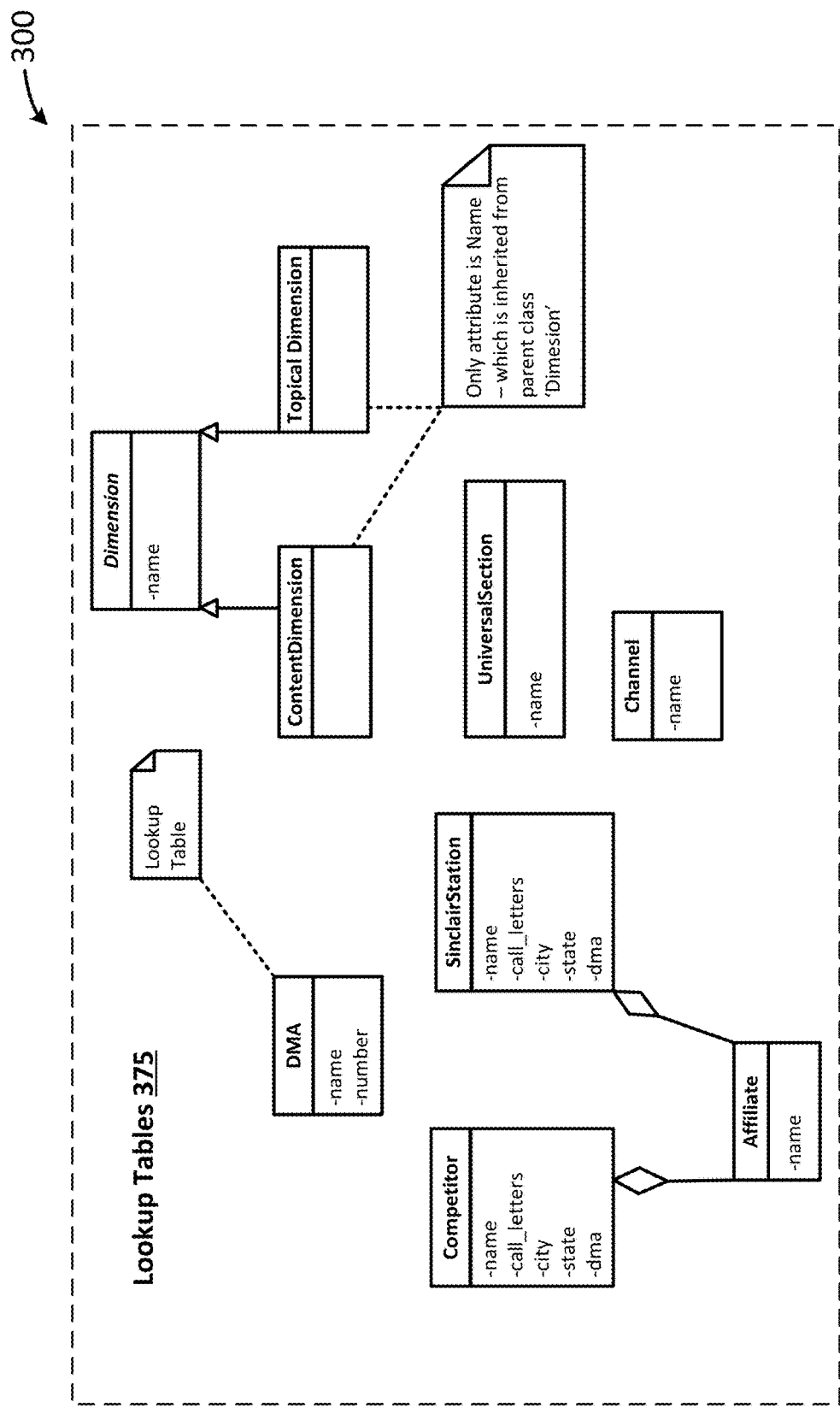

In some aspects, system 100 may be implemented using data model 300, illustrated in FIGS. 3A, 3B, and 3C. It should be appreciated that data model 300 is only given by way of example, and that a variety of different data models and organization schemes are contemplated herein. Data model 300 may include various data tables 305, containing certain pieces of data that are communicated or linked to other data tables 305. The data model 300 may be organized into different sectors, such as content data 310, tagging data 335, property data 345, placement & reference data 365, and look up tables 375, for instance.

In support of the overall system, the logical data model 300 provides normalized, de-normalized, and document-based (flexible) data storage for all core services of the platform 100. Media, wherever stored (e.g., locally on server 140 or with cloud-based resources 115, such as storage 125), is referenced in the logical data model 300 as an addressable, package ready, and distributable asset. This enables all media assets of any kind to be mixed and treated the same by the system 100, wherever the actual ownership lies. The data model 300 also marries property set-up, media categorization, rendition support, and hierarchical rendering structures (maps of how properties are navigated and how content is organized as separate but related structures), content and media tagging and categorization, and channel and content renditions with specific attributes mapped loosely to channels. The feed architecture leverages this flexible data model to enable the MIX Platform 100 to ingest and consume any syndication format, normalize content in real-time, and provide a uniform interface to content for repackaging, repurposing, and cross-channel syndication as needed.

4a. Content Data

Content data 325 may be used to refer to and include various data tables associated with content, including rendition, image, video, alert, weather, external references, package, copy, external reference, and content information. Content data 325 may include various pieces of information, data, package, media, including external references to documents that might be processed, cataloged, indexed, packaged, produced, and then shown to users of the web application or an audience-facing channel (web site, mobile app, OTT device, etc.) that inherits basic cataloging features and indexing features through content. Content table 312 may be the hub of and link to all other data generally referred to as content data 325. Content table 312 may include live streams that are currently in progress, for example, before the live stream or broadcast is finished. System 100 supports infinite content type definitions that include formatted and non-structured data (such as defined with weather) and registered content editor panels for each type of content. Adding a new panel with the correct mapping attaches the editor panel to that content type and makes the panel available to the package editor for package types that include the new content type. Content table 312 may have many versions based on saving or publishing or both, and the MIX Platform 100 can store when and by whom each content version was created and modified for auditing purposes. All packages 314 and content inherit versioning behavior appropriately in this way.

Any type of content stored in content table 312 can store name and value pairs as one or more content attributes 340, associated with tagging data 335, that represent single values or entire document structures (JSON, XML, etc.) on the fly to support complex information storage that is not pre-defined. This enables individual packages 314 to define variables that power presentations on a one-off or small batch basis or even entire documents without having to alter the overarching content structure.

In one example, if a story that has a sports score inside of it is published, the system 100 can receive inputs or selections to create an attribute called "sports-score" and add XML that contains the score on-the-fly, for example, from a user via one or more interfaces. Subsequently, a component can be configured, for example via inputs received from a producer, that detects the presence of that name-value pair and renders a box score using the XML data. This process can be performed in a relatively quick manner (e.g., a few minutes) and then re-used again and again without requiring definition of a new content type.

Packages 314 are what are displayed, for example to editors via an editing interface, in the MIX Platform 100 for producing sets of content for publishing. Packages 314 are also content and may be indexed and searched independently, and are the core type of content that can be manipulated when publishing operations are performed. Packages 314 use a default package editor in the system 100 by default, but new configured package editors (such as for weather) may be configured and mapped to packages of a specific type. Packages 314 may use or not use portions of the package meta-data in the package editor as well and may enable and disable features of package publishing via configuration of the package editor. This feature enables new types of packages 314 to be customized and deployed rapidly with customized publishing processes.

Package type 316, which is linked to package 314, defines an allowed collection of content types to serve specific needs. The configuration of a package type 316 defines what a search and list screen can and should do, where in the system 100 lists of these packages 314 should reside (e.g., which screen), what portions of the publishing process and targeting process should be enabled, what types of content and in what numbers (e.g., one, many, specific numbers, etc.), and which editors can and should be used when producing the package 314. The MIX Platform 100 reacts to configured package types 316 and makes them available as part of the seamless publishing workflow as they are developed.

Content 312 and packages 314 may support multiple renditions 318. Renditions 318 are copies of any type of content 312 (or a package 314) with specific attributes. When content is delivered to the renderer, such as renderer 150, all possible renditions of that content are made available to the renderer 150 when it renders the presentation.

The presentation will select, based on channel, which renditions 318 are most appropriate for the audience and channel as needed (e.g., performed during component development). In one example, the MIX Platform 100 may automatically create renditions 318 of images at different aspect ratios and resolutions upon upload or reference. New aspect ratios and resolutions are configurable. By default, there are three of each based on industry best practices, but this set is easily configurable.

In one example, one or more image production tools (e.g., interfaces) may be provided to enable modification of a package 314 or content 312, and may be used to create and modify one or more renditions 318 of content 312 or package 314. The one or more image production tools may link and display all aspect ratios and allow crops and focal points to affect all renditions 318 simultaneously while the user watches. These production tools are built into the publishing and packaging process along with image manipulation tools so that a producer does not have to leave or exit the package editing process to alter the image. A producer may optionally un-link the rendition production tools to tailor a given rendition 318 specifically via the production tools and cropping. All of these links and results persist (e.g., are stored) when a package is closed and are saved per-package. Renditions 318 are always linked to the original image and the original rendition 318 is saved in an unaltered format or state, to ensure no degradation of the original content occurs as users manipulate the image or other content.

The MIX Platform 100 enables save and publish hooks to be associated with various content types (e.g., as interceptors in the service level code) to automatically produce renditions 318 of content 312 and packages 314. Registering a new interceptor will automatically ensure the renditions 318 are produced on save, modification, or publication (depending on configuration). The MIX Platform 100 may detect and show any renditions 318 of the package 314 in the appropriate interfaces and allow production and manipulation of those renditions 318 as needed. If renditions 318 trigger the inclusion of content 312 on other properties, a preview may display the content 312 showing up on those channels (or simulate them) directly from the publishing/preview functionality.

Alerts 320, which are linked to content 312, define short update content targeted to a specific brand property 350 and not specific section properties 352 (e.g., areas of a brand). A package 314 containing an alert is considered an alert package and tailors targeting to the brand level 350 instead of to a specific section 352. In some aspects, brand-level targeting may inform the MIX Platform 100 to make a package 314 available at render time to all renders targeted by the brand automatically. Typically, each channel render makes its own decision how to implement or respond to this instruction.

The MIX Platform 100 may connect alerts 320 and alert packages to multiple output channels optionally (and can add more) including brand-configured SMS, social media accounts, mobile push notifications, and MIX Platform internal notifications. Alerts 320 may also be automatically included as part of a package 314 by default, allowing any story, image gallery, weather report, sports score (any package), to also trigger a brand-level alert that automatically links back to the initiated story. This linked behavior may be performed during package creation, after publication, or as a link-back after a stand-alone alert gets created with the same affect. Additionally, the MIX Platform 100 ensures that all LIVE alerts for a given brand are visible, navigable, and controllable from any one alert at all times since timing and breadth of alerts in the presentation is so important. For example, web sites may display multiple alerts in the header using scrolling, but the order and number can affect how many people see them. This is critical to the publishing process and differentiating from a production standpoint.

Weather data 322, which is linked to content data 312, contains structured data that includes detailed information about temperature, air pressure, and an unlimited set of other data regarding the weather in a specific zip code or geographic location. This data may be stored in a de-normalized format that allows any number of attributes to be configured and stored over time without necessary code changes. Packages 314 of type weather include this content type and allow for the weather forecast edit panel to appear in the package editor for manipulating this data.

Copy 324, which is linked to content data 312, represents formatted or non-formatted text attached to any package 314.

Image 326, which is linked to content data 312, represents stored images stored at any URL for inclusion in packages 314 during publication. Users can search and filter for image assets either as part of selecting media for inclusion in a package 314 or from the media interface itself.

Video 328, which is linked to content data 312, includes stored digital video files available at some URL for inclusion in a package 314. Video also appears in the media management interface both outside and inside of package editing tools. Users can search and filter for video assets either as part of selecting media for inclusion in a package 314 or from the media interface itself Live Stream 330, which is linked to content data 312, includes one or more live video sources available for inclusion in a package 314 at a specific live streaming URL. Live streams 330 are either persistent or scheduled to begin and end. Referencing live streams 330 as content allows them to be included as part of a package 314 and promoted across properties as needed. The system 100 automatically discovers live streams 330 as they are registered in the infrastructure and makes them available for routing in this way. The system 100 also automatically aggregates live streams 330 under properties based on configuration conventions that match brand-level property attributes to detected attributes on the live stream 330. This means that within moments of a live stream 330 appearing in the system 100 via physical configuration, it automatically becomes available and editable in the system for production and routing. Stated another way, by treating live streams 330 as editable and packagable content, live streams 330 can be received by system 100 and published at various properties, configured, etc., in various ways in near real time.

An external reference 334, which may be linked to content data 312, may include a link to external media on the internet not owned, controlled, or associated with the MIX Platform 100 directly.

4b. Tagging Data

Tagging data 335 may include or be associated with various information used to tag content with key words, phrases, or other identifiers. A tag 336 is a simple, categorized (dimension below) topic that content may pertain to. The process of tagging content, which will be described in greater detail below, enables storing, searching, and directing content to specific locations/properties for publishing.

The dimension data table 338, which is linked to each tag 336, declares a type for tags 336 to allow them to fit into specific sets, e.g., a tag category. Examples of dimensions 338 may include a person, place, event, topic, category, franchise, source, etc. In some aspects, dimension 338 may be linked to two separate tables, content dimension 338-*a* including a content-based category of classification, and topical dimension 338-*b* including a topic-based category or classification.

The relevance data structure 342 links tags 336 to content 312 at the package 314 and individual content item level with a weight. This enables the MIX Platform 100 to measure how related content is to a given tag (person, place, event, or topic). These relationships between content 312 and tagging data 335 are the primary driver of content discovery and filters that place content on display presentations. Tag relevance intersections between packages enable automatic calculation of relationships between packages for suggested content and related content. Tag relevances may be calculated based on the output of generalized tag detection services and stored in the tag and relevance data structures 336, 342. Tag relevances may also be overridden manually by users or re-calculated by internal processes in an ad-hoc post processing manner.

4c. Property Data

Property data 345 may include and be used to refer to data that is associated with a location for delivery of content, such as a web page, web site with multiple pages, and so on. A property 346 is the highest-level construct that designates an owned location capable of distributing or delivering content to an audience. Any conceptual place where media may be displayed is considered a property. Some or all types of property may be stored (and the relationship to child properties) in a single table that mixes relational and document based data in a way that is highly flexible with limited changes required to the data model. Property data may also be persisted solely as XML, JSON, or other document format stored either in a relational database as a large field, in a specialized no-SQL database, or in an organized file system without any material change to the system in general.

Property attributes 348, which are linked to each entry of a property 346, include name-value pairs that are a mix of pre-defined and ad-hoc information stored for the property 346. Storing the property attributes 348 separate from the property entry 346 enables the MIX Platform 100 to support multiple types of properties 346 quickly via configuration without adding new data constructs. In one example, this may be done using simple name-value key pairs (e-mail=bob@domain.com), or complete JSON or XML documents (or any other documents) that define complex data structures.

A property 346 may begin with or be pre-configured with property of type "Brand" 350 that defines the name of the content distributor. To an extent, brands 350 can be nested within each other (e.g., Sinclair Network which owns KOMO News and WBFF 45), but primarily each brand 350 starts with at least a web property and domain URL (which may be required for the renderer 150 to recognize the brand 350 when various devices ask for content and presentations). Other than name and production URL, other fields in a brand 350 are based on the type of brand during property setup. Brands 350 can actually represent multiple channels (web, mobile, OTT, etc.) each that mirror the section (or content focus/area) structure of the brand 350 on a specific known channel.

A section property 352 may be a property directly under a brand 350 or another section that defines an area of focus for the brand 350 (e.g., news, sports, popular, featured videos) or a way content or media is organized for consumption or distribution. Essentially, a section dictates the information architecture for the brand 350 at large across channels. Sections 352 have a primary presentation 358 that may instruct how content 312 should be routed and organized within a brand 350 and that the renderer 150 will use to build an actual presentation per channel.

A channel represents a way of communicating with the audience that is widely accepted. Known channels are set up in the MIX Platform 100 so that each brand 350 can tailor the experience to each channel but keep certain aspects of the brand consistent. Channel properties 356 may provide channel-specific overrides to the brand structure. A brand 350 will set up a list of sections 352. Every section property 352 and presentation 358 may have a channel property 356 that overrides behavior, provides an alternative presentation, or eliminates section properties for the given channel. This ability to conditionally override behavior on a per-channel basis lets each channel either re-use the section hierarchy from the brand 350, remove sections 352, consolidate sections 352, or provide channel-specific presentations for the content 312 on each brand 350. This hierarchical connection between the primary brand property 346 and the channel property 356 enables brand-level decisions to cascade across channels (the web site, mobile app, OTT app, etc.) by default based on the presentation rendering rules built into the renderer for each channel. Overrides can be done opportunistically on a per-section 352 or presentation 358 or channel (or all three) basis to tailor the experience, but is not needed unless a sub-optimal experience occurs on the channel.

A presentation 358 represents either a type of content display, a default behavior, or a section display for a brand 350. A presentation 358 may represent a page in a web site. Each presentation 358 belongs to or is associated with a section property 352 (either the root or a sub node) and defines the visual details for a property node. The "layout" property defines the presentation 358 and provides all instructions to the renderer 150 for actually providing the user experience. The presentation data structure 358 currently uses a well-defined JSON structure (although the format could easily change to any other format), is stored in the database and in a file structure, and defines or links to the following information:

1. The presentation template, if any, that this presentation is based upon.
2. The complete overall column and container layout intended for the presentation.
   a. This format supports responsive rendering in a columnar grid or not.
   b. It declares columns and containers with constraints as needed
   c. The format is open to wide interpretation based on rendering plug-ins by channel.
3. The list of named components 360 and placement inside the layout.
   a. This references the actual component code the renderer should use.
4. The list of named filters 362 for each component 360 that shows reference objects.
5. The set of component settings for each component 360 for customization purposes A component 360 may include a set of code or instructions and a reference to that code for use in presentations 358. Components 360 in the MIX Platform 100 may reference code stored in the designated platform file system or remote storage. In some aspects, a component structure 360 and/or a filter 362 may not be tied or directly linked to a presentation 358 in the data model 300, as each presentation 358 may be associated with an object (e.g., a JSON object) that has instantiations of filters 362 & component 360. In some aspects, a component 360 may also reference alternative code for any channel in any language via adding variable code structures that mirror those in base web components 360 in a parallel file structure for the channel or device involved or targeted.

A filter 362 may include a named and configured complex search for packages 314 that includes a full-Boolean nested query that covers all meta-data, associated tags, and attributes of the package 314. Filters 362 are configured primarily in the query attribute with some additional fields, but can also be saved/accessed from advanced searches in the MIX Platform 100. In some aspects, advanced search queries on packages 314 via the services and the accompanying JSON document (JSON not required) are identical to the stored filter parameters 362 that power content routing to components 360. This allows named filters 362 to be created based on searches in the MIX Platform package search (showing an administrator what content is typically available) and then used to generate or power a component 360 placed on section presentation 358, for example, associated with a section property 352. This flexibility enhances the implementation and capability of the system 100 to enable filtering content in an integrated way and via one or more integrated interfaces. Named filters 362 may also be re-used across many properties 346 and or in many sections 352 (e.g., trending stories, popular stories, national news, etc.) when the filter is configured to apply to multiple sections 352.

4d. Placement & Reference Data

Placement and reference data 365 may include and be used to refer to data that is associated with references/teasers of content 312. The suggested teaser placement data structure 366 may indicate the preferred priority and placement of a package 314 on a target (primary or secondary syndicated) property 346 (usually a section 352). The system 100 may use publish data and suggested placement precedence to decide the actual order of reference objects 372 generated during publication processes.

A property content union 368 may include a representation (in some aspects, internal only representation) of all valid brands 350 and sections 352 based on publishing for known packages 314. The MIX Platform 100 may use the property content union data table 368 to prevent rendering of stories on properties 346 that should not be present, for example, based on restrictions or limitations associated with a package 314, such as an expiration date and/or time, etc. Many other large-scale content systems that cover more than one property at more than one URL may allow articles to render anywhere on any property and section simply by appending the article ID or the story title from a different URL. This is problematic from a content permission standpoint as it can lead to stories that violate source licensing considerations. In some aspects, during the publishing process (see Reference Object 372 below), the MIX Platform 100 reconciles intended and allowed section 352 and brand-level 350 mappings from all filters 362 (based on targeting and syndication) and maps them dynamically into this table.

The teaser placement structure 370 may include the actual placement of a reference object 372 on a specific component 360 of a specific presentation 358. This relationship is constantly updated as new packages 314 show up for publication.

A reference object 372 represents a specific reference to a piece of content 312 or package 314 that is both linked to that content explicitly and de-normalized for presentation in a specific context or property 346. The MIX Platform 100 enables reference objects 372 to be created and linked to any property 346 at any level. In one example, a reference object 372 may be mapped to a brand-level section property 352, and marked for display as a teaser across channels (web, mobile, etc.), with the intent of leading audiences to discover the content 312. Reference objects 372 may be easily added to include external links to external content not inside or associated with the MIX Platform 100, and/or tailored by context. By default, reference objects 372 may be created in response to filter 362 configurations that identify packages 314 for inclusion in sections 352. These queries run as agents asynchronously, discover new packages 314 as they are saved, and copy key fields from the package 314 and content 312 to automatically create multiple teasers based on meta-data, targeting, and tagging. In some examples, tagging may be the driving input in the creation of multiple teasers.

The MIX Platform 100 may also generate reference objects 372 in asynchronous processes that find packages 314 in other ways using agents. These agents may run, find a package 314, and create lists of reference objects 372 on a set interval to drive content discovery. This enables the content discovery rendering to be relatively un-intelligent and to simply obey what it finds in the list of reference objects 372 without other inputs. The configuration and use of reference objects 372 also enables a completely flexible reference object generation scheme wherein any process, using any mechanism, may find content 312 and introduce reference objects 372 into the appropriate buckets automatically without any impact (or potentially minimal) on rendering. These processes and their results are also reflected during presentation building (preview components as they are added to presentations) and content placement and preview (preview of renders during publishing and editorial teaser management), as will be described in greater detail below.

Other important aspects of the data model 300 include the globally unique identifier (GUID) data keys for all rows across objects, allowing for mobility of data and meta-data across environments with ease and the blend of structured, indexed unstructured, and document-based data across the data model.

FIG. 3C illustrates a more detailed example of the lookup tables 375 shown in FIG. 3A. Look up tables 375 may contain linked data as to ownership, location, name, and affiliation, for example, of various stations, broadcasters, etc. This information may be used to verify permissions to publish certain content on properties associated with various stations, broadcasters, etc., through a digital rights system, which will be described in greater detail below.

Subsequent sections of this application provide detailed descriptions of individual portions of the system data model 300, which may leverage MySQL or be portable to any database structure or format, and the actual behavior of the sub-systems involved.

5. System Processes

5a. Content Packaging, Presentation, and Targeting

Figure 4:
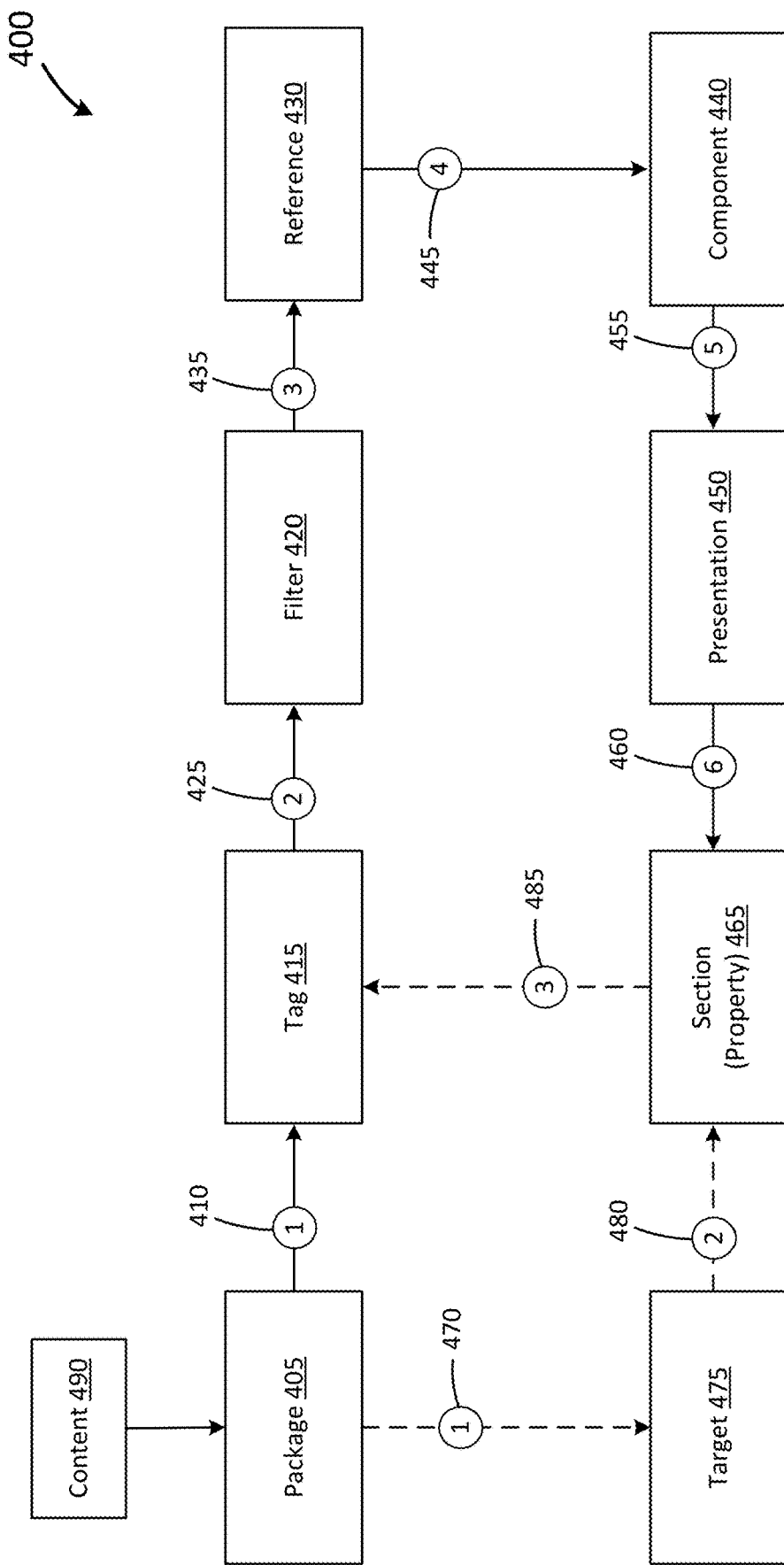
FIG. 4 shows a block diagram of an example process for packaging content and associating the packaged content with a section or property, according to the principles of the disclosure.

FIG. 4 illustrates an example flow diagram of process 400 of how various data is organized and how content 490, which may be an example of or be accessed from content data structure 312, is directed to a specific section or property 465. Process 400 may be implemented by system 100 according to logical system 200 and/or data model 300. In some aspects, process 400 may be implemented by the digital publishing system 205, and/or other systems described in reference to FIG. 2.

Content 490 may be bundled or associated into a package 405, for example, by a broadcaster or encoder 110/SW 112, or by the digital publishing system 205, which may be implemented across one or more virtual resources 115, and/or MIX service 135. The package 405 may include one or more types of content 490, content from different sources, and so on, including, for example a copy, images, video, etc., grouped together for the purpose of publishing the content 490. The package 405 may include some or all of the data associated with a package 314 as described above in reference to FIGS. 3A, 3B, and 3C. For example, the package 405 may include video received from one or more video feeds 266, encoded by the video encoding system 225, accessed by the media asset manager 230, and/or modified or produced by the video production system 235. In one specific example, the package 405 may include a news story, a staff bio, a weather forecast, etc., or combinations thereof.

The package 405 may be associated at 410 with one or more tags 415, which may include key words, phrases, etc., associated with one or more characterizations of or associated with the content 490 of package 405. The tags 415 may also include a source of the content 490, a news station or broadcaster associated with the content 490, etc. For example, the tag(s) 415 may include "News" and "the names of one or more stations the news content 490 is associated with. Associating the package 405 with one or more tags 415 at operation 410 may include linking package data 314 with one or more data structures of tagging data 335, as described above in reference to FIGS. 3A, 3B, and 3C.

One or more filters 420, for example, associated with a section or property 460 such as a webpage, or a component associated with a page, may select one or more packages 405 for presentation based on the tag(s) 415 associated with each package 405 at 425. For example, a local news page component 440, such as a top or lead component, may search for packages 405 associated with tags 415 "news" and a certain broadcast station or news reporting station. One or more filters 420 may include the data stored in one or more filter data structures 362, and may be configured to select content based on comparisons of tags 415 associated with a package 405.

Upon receiving filtered packages 405, selected by one or more filters 420 at operation 425, a reference or teaser 430 may be generated at operation 435, for example for a specific location on the page. In one example, a reference 430 may include the headline, summary, teaser image, and a URL or page address to enable editors to tailor the teaser to a particular application or placement. A reference 430 may include some or all of the data associated with placement and reference data 365. Each reference 430 may be ordered and self-contained, such that each reference 430 has or is associated with content 490, URLs, and sort orders associated with a presentation. At the time of publishing, each reference 430 may inherit settings from the associated package 405. Each reference 430 may be independently adjustable or configurable in relation to the underlying package 405, such that a producer may configure custom external links, tailored teasers, and perform other editorial changes, including reordering the content of a package 405 such as to make the reference 430 simpler, shorter, etc.

Next, the reference 430 and/or package 405 may be directed to one or more components 440 at operation 445. Each of the one or more components 440 may include a piece of code or other instructions, associated with a page, property, section, etc., that is configured to render various types of content 490, including the content of package 405 and in some aspects, content of the reference 430. An example of a component 440 may include a TOP NEWS box on a home page of a website, the header, etc. Each component 440 may be associated with a presentation 450 at operation 455, which may include a collection of one or more components 440 and instructions for building a document. Each presentation 450 may further be associated with a section or property 465, such as an area of focus for a property of specific URL/different page, at operation 460. A component 440 may include some or all data associated with component data structure 360. A presentation 450 may include some or all data associated with component data structure 360. A property 460 may include some or all data associated with property data structures 345 and/or 346.

Additionally or alternatively, each package 405 may be mapped to a target 475 at operation 470 and further to a section 465 at operation 480. In some aspects, the package 405 may additionally be associated with one or more tags 415 at operation 485, for example, to enable the content 490 to be distributed to other properties, channels, etc. In some aspects, operation 485 may include determining content and/or tags 415 of that content associated with the section 465 that the package 405 was originally targeted to. Based on commonalities between the content 490 associated with property 465, tags 415 may be automatically (e.g., without direct user input) generated at operation 485. In one example, the package 405 may be mapped to a target 475, such as the LOCAL NEWS and the system 100 will automatically tag the package 405 with tags 415 "News" and the name of the local news station. In this way, packages 405 may be associated and directed to components 440, formed into presentations 450, and directed to sections or properties 465, with configured teasers or references 430 in an integrated, effective and efficient manner.

5b. Content Rendering

Figure 5:
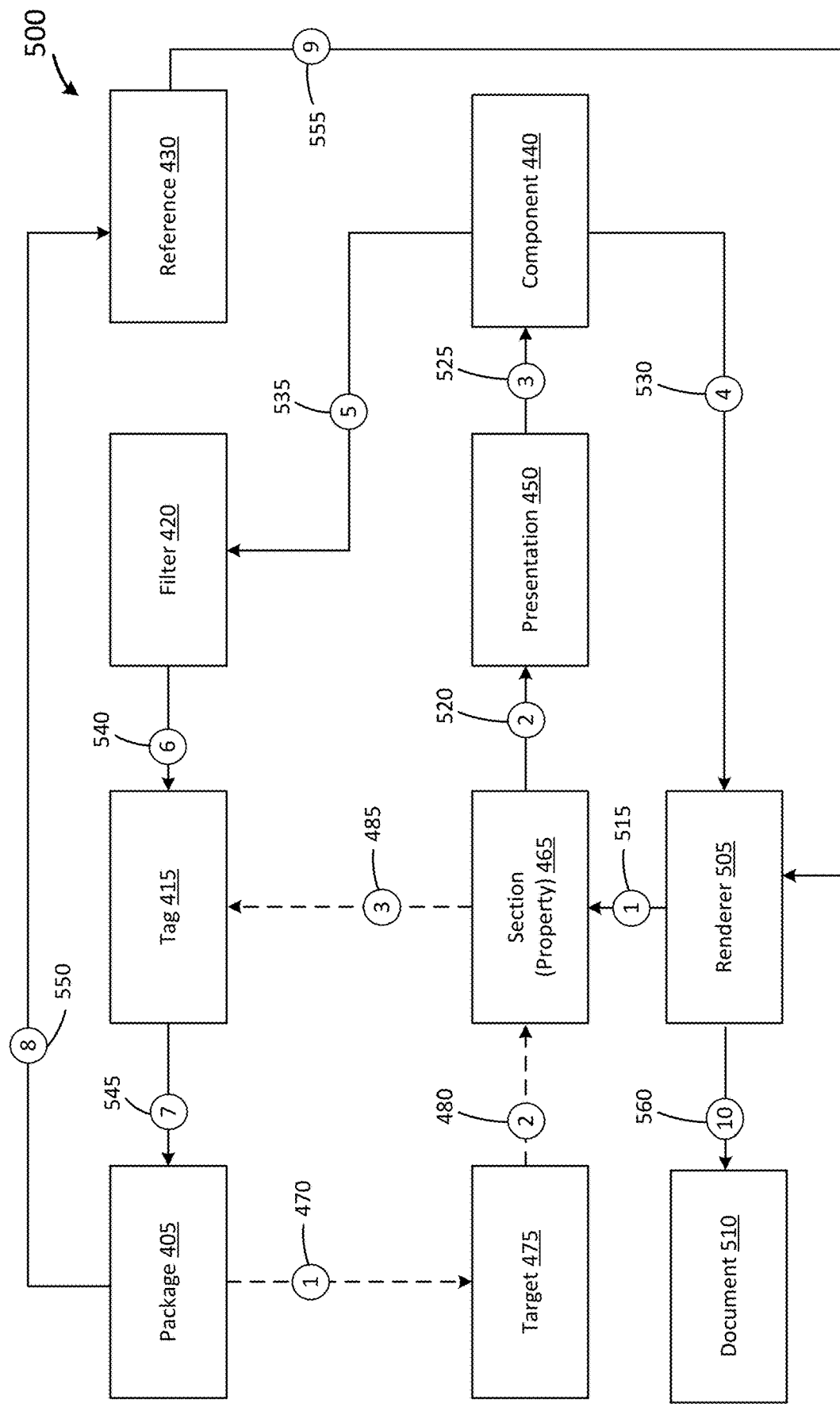
FIG. 5 shows a block diagram of an example process for rendering a package associated with a section, according to the principles of the disclosure.

FIG. 5 is an example flow diagram illustrating an example process 500 of how packages 405 are rendered on sections or properties 465 in the form of presentations 450. Process 500 may incorporate one or more aspects of process 400 described above and may be implemented by system 100 according to logical system 200 and/or data model 300. In some aspects, process 500 may be implemented by the presentation rendering system 215 and/or the digital publishing system 205, and/or other systems described in reference to FIG. 2

The renderer 505, which may be an example of or implemented by renderer 150, may first, at operation 515, map a URL to a section 465. Next, one or more presentations 450 may be found at operation 520, for example by the section 465 based on configured criteria, by the renderer 505 based on certain instructions or criteria, etc. Once the presentation is found, the renderer 505 may iterate through searching components 440 based on data associated with the presentation 450, and fetch code associated with at least one component at operation 530. Some or all of operations 515-530 may be repeated for each section 465, presentation 450, or component 440, as needed until the section 465 or presentation 450 is completely fulfilled.

Each selected component 440 may apply one or more filters 420 at operation 535 and find packages 405, containing content 490, at operation 540. Each component 440 may be configured with certain filters 420, for example, for presenting certain content 490 associated with a presentation 450 and/or section/property 465. The component 440 may read the package 405 at operation 545 for references 430. At operation 550, the component 440 may generate one or more references/teasers, such as one or more headlines, summaries, images, URL (e.g., derived and overrideable), and/or sort orders. Next, the one or more references 430 may be added to the presentation at operation 555. Upon retrieval of packages 405 to fill out each component 440 and each presentation 450 associated with a section or property 465, the renderer 505 may render the document 510 at operation 560. In some aspects, the renderer 505 may render portions of a document 510 at different times, such as while additional content/packages 405 are being retrieved.

Process 500 may, in some aspects, include a package 405 being mapped to one or more targets 475 at operation 470, subsequently directed to one or more sections 465 at operation 480, and associated with one or more tags 415 at operation 485, as described above. This sub-process may interface with the rendering process 500, such that newly added packages 405 may be rendered based on tags 415 associated with the package 405 via targeting at operations 470, 480, and 485. In some aspects, targeting property sections 465 may infer tags 415 automatically based on tags in the primary filter of the default presentation 450 for that section. The renderer 505 may use those tags to automatically route packages 405 to new or replaced sections 465 based on those tags allowing targets 475 to disappear without truly orphaning packages.

5c. Content Presentation

Figure 6:
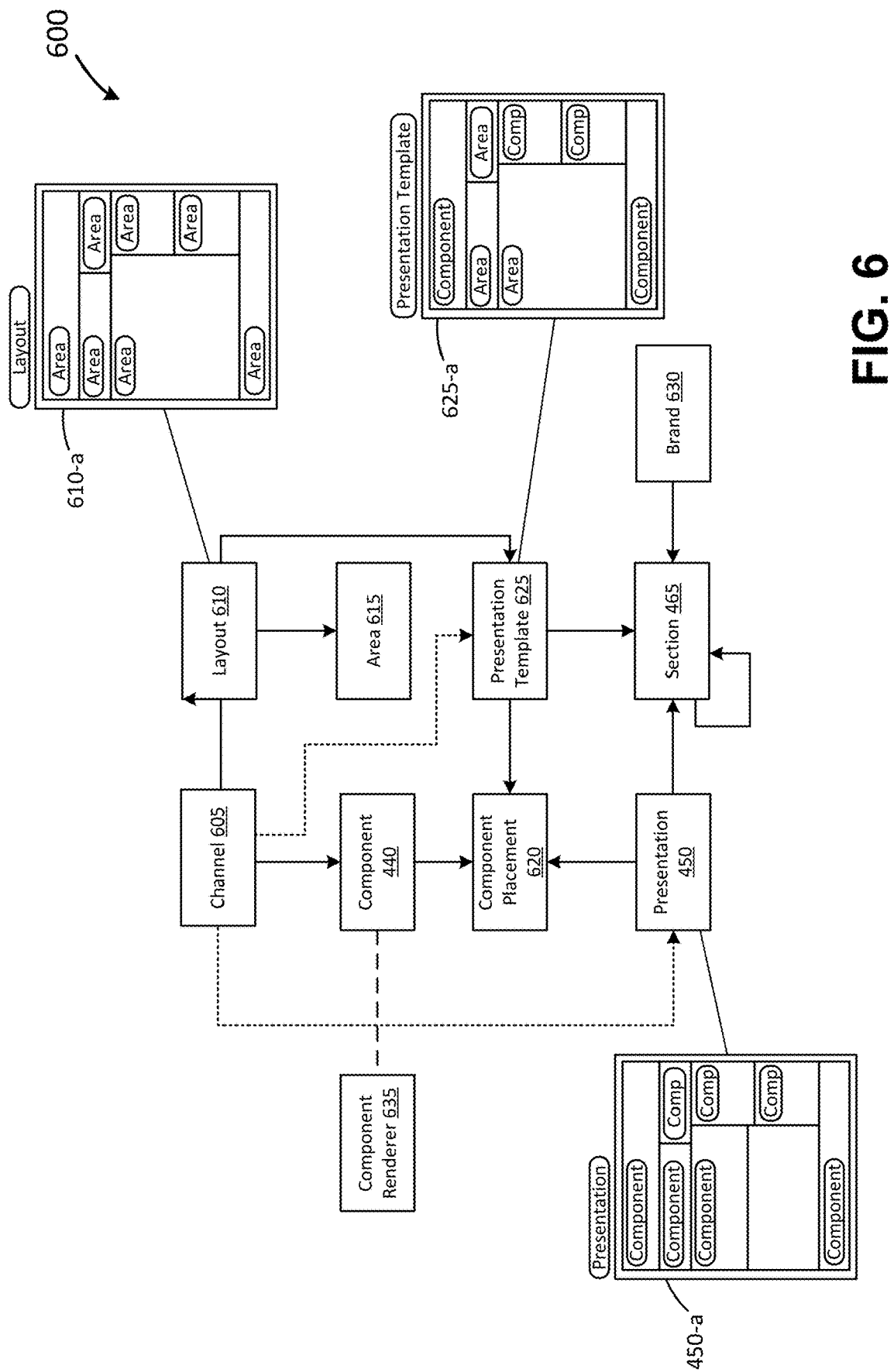
FIG. 6 shows a block diagram of an example system for configuring a presentation of content, according to the principles of the disclosure.

With reference to FIG. 6, an example system 600 for configuring a presentation of content 490 is shown. System 600 may incorporate one or more aspects of processes 400 and/or 500 described above and may be implemented by system 100 according to logical system 200 and/or data model 300.

A channel 605 may define or include a format or technology, such as the web, IOS, Android, OTT, social networking formats, and the like, suitable for publishing content 490. Each channel 605 may be associated with a channel-specific layout 610, which may include an empty visual arrangement, for example, configurable to present one or more separate instances of content 490/packages 405. A visual representation or presentation of a layout 610 is illustrated as layout 610-a, which includes various sizes and shapes of areas 615. An area 615 may define a space that is suitable for placing one or more components 440. As described above, a component 440 may include a set of instructions defining or enabling a web-ready visualization of data. Each component 440 may be linked to or associated with a component renderer 635, which may include one or more aspects of renderer 505 and/or 150. Each component renderer 635 may include or provide upon rendering, a channel specific visualization, such as for a web or iOS application. A component 440 may be associated with one or more component placements 620 in a presentation 450. Each component placement defines an instance of a component 440 in an area 615 of a presentation 450, with a specific configuration. Multiple components 440 are shown in areas 615 (e.g., associated with a component placement 620) of a layout 610 as presentation 450-a. A presentation 450, as described previously, may be channel-specific, based on a template 625, for a specific section 465 in a brand 630. A template or presentation template 625 may include a partial or macro-enabled presentation, such as example presentation template 625-a. A section 465 may include a content focus area for a brand (e.g., hierarchical). A brand 630 may include a web site, mobile web site, mobile app, social media pages, or any number of channel-specific presentations.

6. Component-Centric Approach to Content Management

6a. Component

In the service of supporting open content rendering that is both compatible with any client technology, including HTML5-based web browsers on various devices 160 (e.g., desktop computers and mobile devices, native mobile applications, and native Smart TV and/or set-top-box applications), the MIX Platform 100 may provide an open software development kit (SDK) for screen layout 610, selection of individual screen content, and media display component creation, such as components 440.

Figure 8:
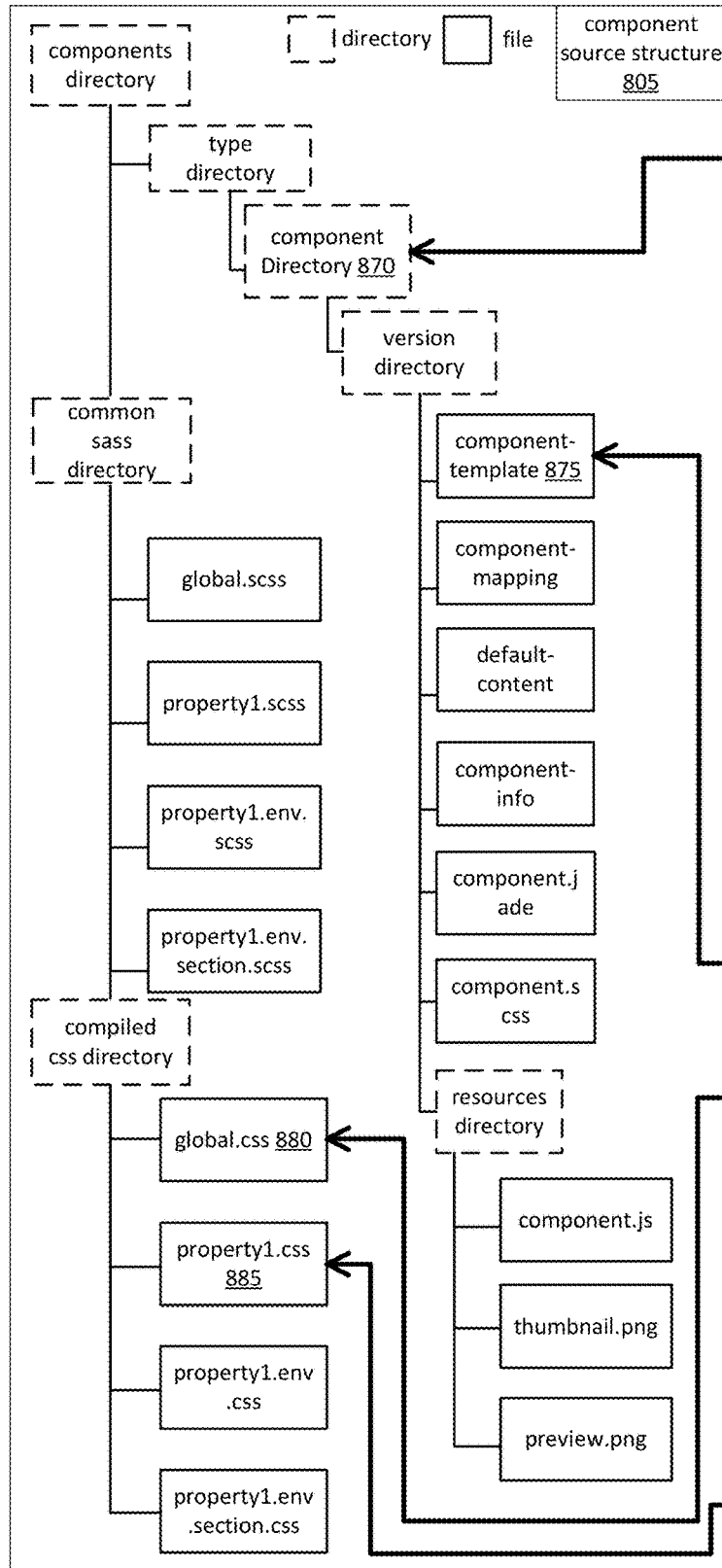
FIG. 8 shows a flow block diagram of an example process for creating a component with resulting effects on specific data structures of the component, according to the principles of the disclosure.
Figure 8:
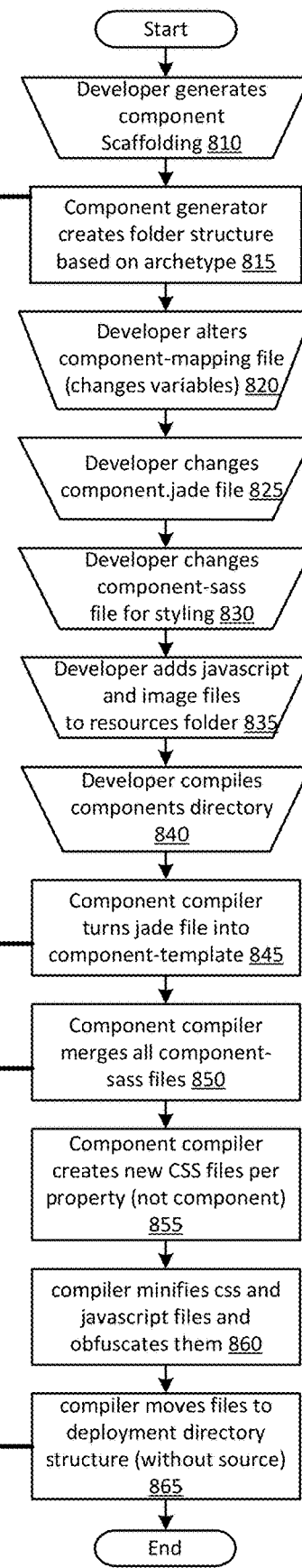

Individual pieces of code or instructions for each component 440 enable the HTML5 based rendering of each component 440 along with target content. These components 440 are driven by custom CSS, scripting resource files, and a template file that inherit data context from the rendering engine automatically. Developing and publishing components 440 involves first building the target presentation, e.g., a static web page with example content and then translating each individual portion of the presentation into a reusable rendering component 440 for HTML5. A process 800 for creating a component 440 and the resulting effects on specific data structures (e.g., the component data structure illustrated in FIG. 3A) of the component 440 is illustrated in FIG. 8, which will be described in greater detail below. Component code is used to incorporate content and information, render the target visualizations at client render time, render previews during publishing, and render content-enabled previews during visual presentation management (see below). The component SDK may also incorporate a technology agnostic format for declaring responsive page layouts that can support any client device based on a plug-in interpreter for the target client experience, to include feeds to third-party frameworks or applications as needed.

Visual components using the SDK are organized as files in a designated folder structure in a registered remote file store, such as component data structure 360. For the purposes of rendering itself, each component may consists of the following files in the following folder structure:

| | |
|---|---|
| /components | The root directory for all components on the remote file store |
| /type-directory | The type or category of component (shows up in the presentation builder, i.e. "Navigation") |
| /component-name | The name of the specific component (i.e. Default Header) |
| /version | The version name of this component (i.e. v1.0) - all files and resource folders live here |
| component-template | This file provides the actual renderable instructions with included variables |
| component-mapping | This file maps global context data in the SDK to local variables the template file references |
| defaultContent | This file provides structured default content for testing components without real data |
| other files and folders | Any un-defined files and folders are passed through as resources for the renderer to use (the renderer ignores other files at render time, but publishing processes recognize others to affect the above) |
| component.scss | This file provides SASS information to style the component and ends up in global CSS |
| component.jade | This file is interpreted into the actual rendering template file above at publish time (the component publishing process ignores these other files, but presentation builder uses them) |
| thumbnail.png | An image for use in presentation builder to represent the component visually (small) |
| preview.png | A pixel-for-pixel rendition of the component showing what it usually looks like inline |

FIG. 8 illustrates a flow block diagram of an example process 800 for creating a component 440 and the resulting effects on specific data structures (e.g., the component data structure illustrated in FIG. 3A) of the component 440. Process 800 may incorporate or touch on one or more aspects of processes 400, 500, 700 and/or 800 and/or system 600 described above and may be implemented by system 100 according to logical system 200 and/or data model 300.

In some aspects, the component data structure 360 may be represented and/or implemented by the component source structure 802. Structure 802 may include various directories and files that define a component 440 or component template. For the sake of brevity, only the most relevant files and directories will be described here in relation to process 800.

Process 800 may begin with a component scaffolding being generated at operation 810, for example responsive to inputs received from a developer. A component generator, for example as part of the presentation management system, 210, may create a folder structure 870 based on the archetype of the component 440, such as based on content or other information associated with the configuration of the component 440. Next, one or more variables, for example associated with a component-mapping file, may be changed (e.g., from default values) at operation 820, for example, responsive to inputs received from a developer. One or more other component files may be changed at operations 825 and 830, also responsive to inputs received from a developer or user. Next image files and javascript may be added to the component 440, e.g., to the resource folder, at operation 835, for example, responsive to inputs received from a developer. The developer may instruct the system 210 to compile the components directory at operation 840. The component compiler (which may also be implemented as part of the presentation management system 210), may then create a component template file 875, for example, by converting the jade file, at operation 845.

The component compiler may then merge all component-.sass files at operation 850, into a global.css file 880. The component compiler may create a new CSS file for each property to be associated with the component 440 at operation 855. The component compiler may also minify css and javascript files and obfuscate them at operation 860. Finally, the compiler may move the files to a deployment directory structure, such as a property1.css file 885.

Figure 9:
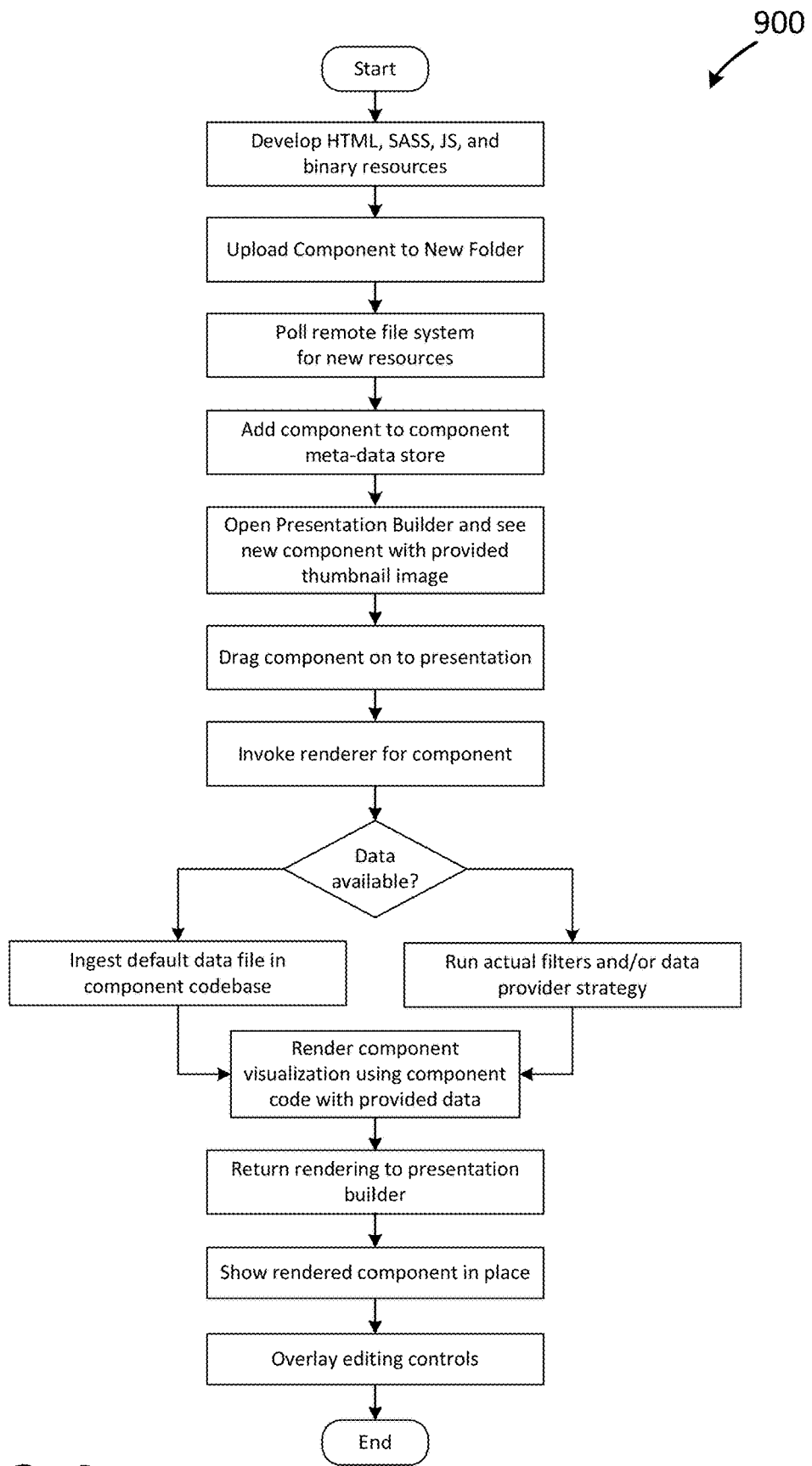
FIG. 9 shows a flow diagram of an example process of configuring a component and previewing content rendered by the component, according to the principles of the disclosure.

FIG. 9 illustrates an example process 900 of uploading a component 440 and generating a preview of content rendered by the component 440. Process 900 may incorporate or touch on one or more aspects of processes 400, 500, and/or 700 and/or system 600 described above and may be implemented by system 100 according to logical system 200 and/or data model 300. In one aspect, process 900 may generate a preview of the component 440 by rendering the component 440 with actual, real-time or configured content. In the case that no such content is available, however, the renderer may still render the component 440 with default data, for example, to enable meaningful previewing of the rendered component 440 before final placement/publishing. The default data file may be tailored, such that multiple default data files are created to render a closer approximation to the type of real content that is configured to be rendered by a component 440.

Figure 10A:
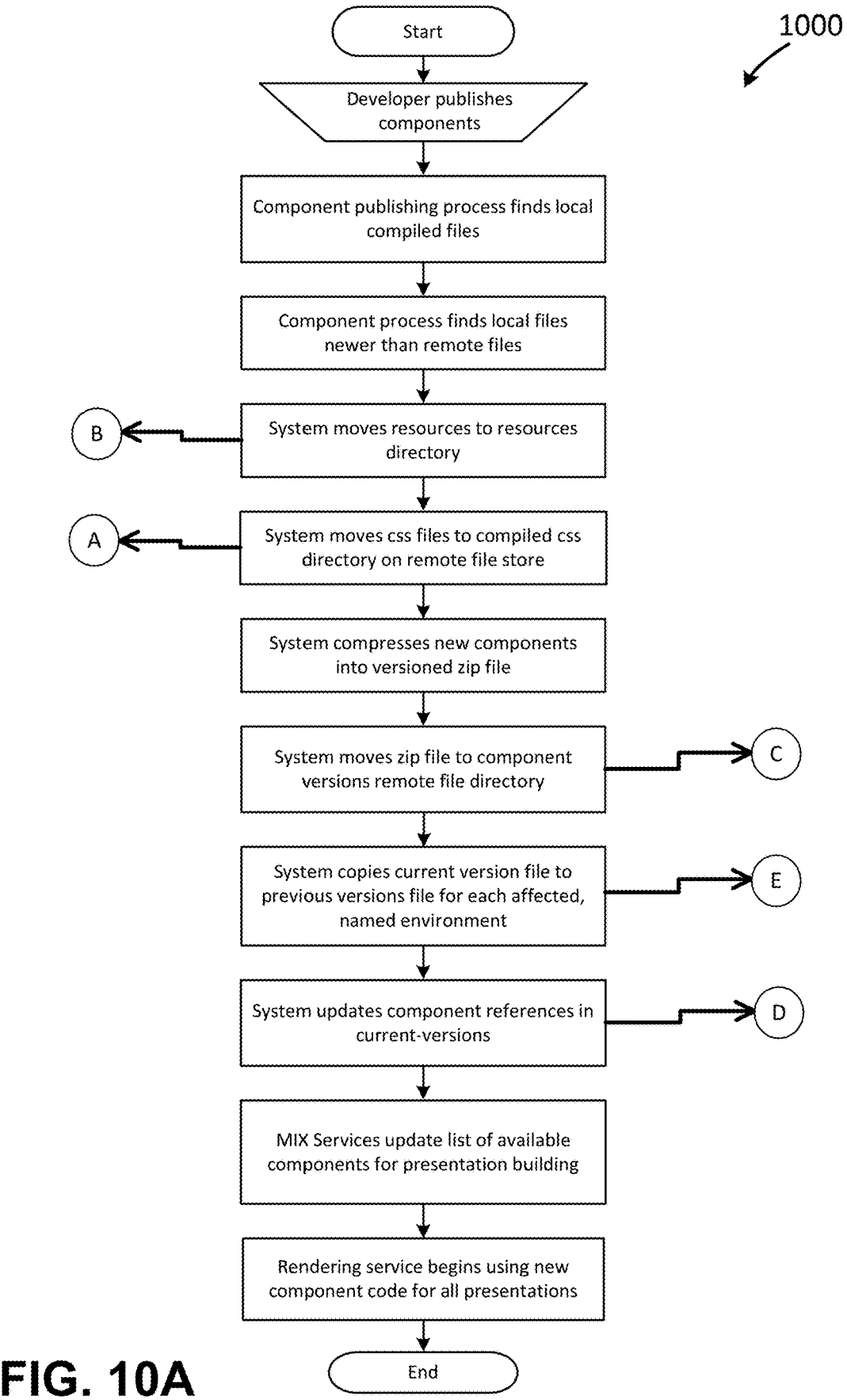
FIGS. 10A, 10B, and 10C show a flow block diagram of an example process for publishing a component and the associated interactions with assets of the component, according to the principles of the disclosure.
Figure 10B:
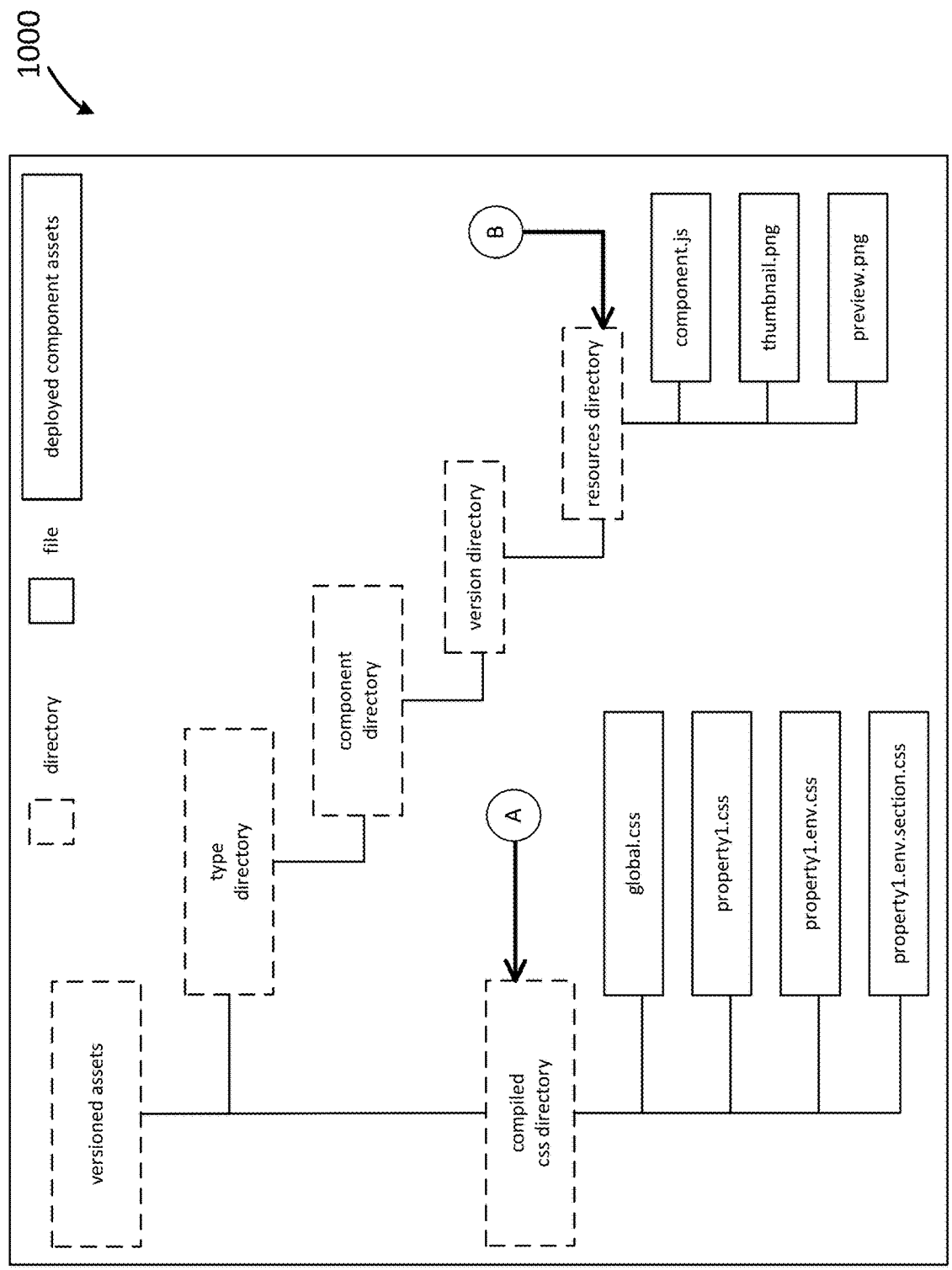
Figure 10C:
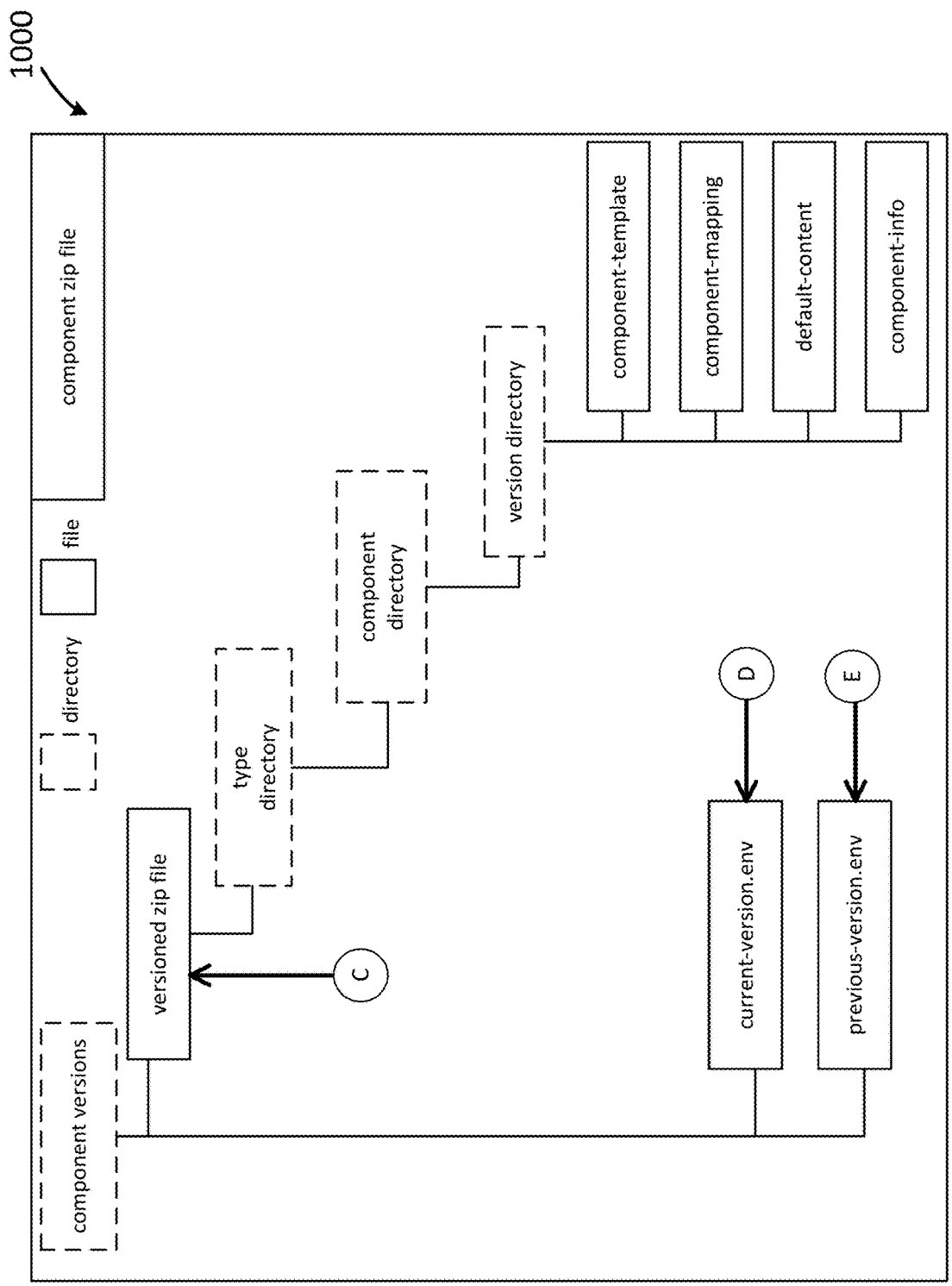

FIGS. 10A, 10B, and 10C illustrate a flow block diagram of an example process 1000 for publishing a component 440 and the associated interactions with data or assets of the component 440. Process 1000 may incorporate or touch on one or more aspects of processes 400, 500, 700, 800 and/or 900 and/or system 600 described above and may be implemented by system 100 according to logical system 200 and/or data model 300.

6b. Visual Presentation Management Via Components

Managing presentations 450 across channels occurs visually via the presentation management system 210 that may overlay the presentation rendering system 215. Components 440 developed using the SDK enable the HTML5-based renderer, which may be part of the presentation rendering system 215, to produce exact or very close approximations of the rendered experience, with appropriate content 490, as presentations 450 are built. The presentation managing system 210 inspects the rendered page and interacts with the presentation rendering system 215 and service-level endpoints to ensure the visual editing experience is a parity visual experience that adds editing capabilities and disables interactive capabilities that might interfere with the visual management of the interface.

Figure 16:
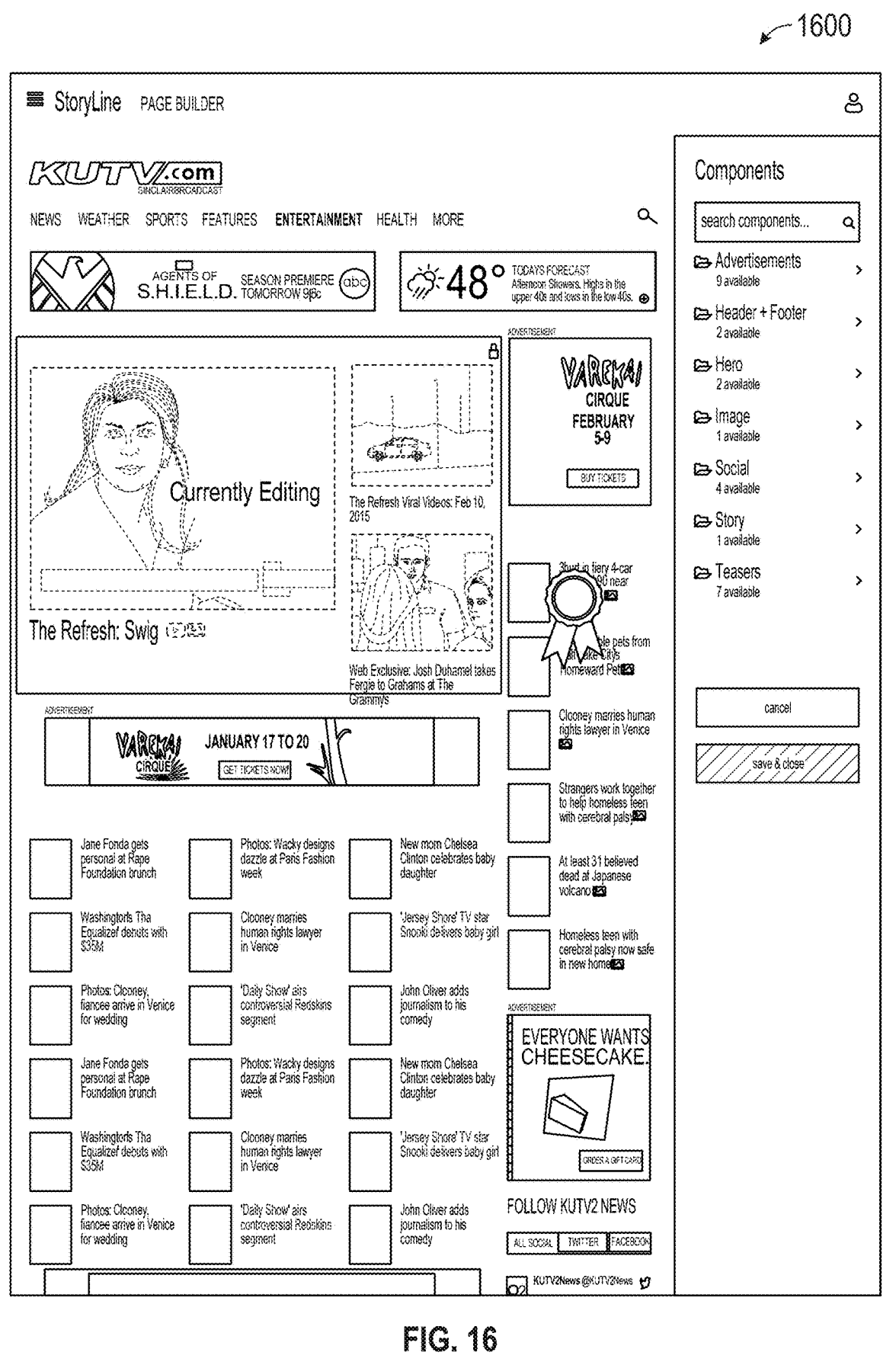

The presentation management system or presentation builder 210, via the component publishing process, may discover published components 440 directly from the remote file store (e.g., component data structure 360) and the directory structure 805, enabling interfaces and code management processes (of any kind) to drive how the presentation management system 210 responds to code changes. A user interface (UI) or graphical user interface (GUI) for configuration of components 440, such as interface 1600 illustrated in FIG. 16 or interface 1700 illustrated in FIG. 17 and described in greater detail below, may react to changes in the structure of the presentation code.

The basic presentation builder interface 1600 may show all categories of published components 440 in the browsing interface on the right-hand side of the rendered presentation. This and the search interface leverage indexed lists of the presentation component directory structure at level 1. Navigating into the folders will display, visually, the set of available components by category with their intended thumbnails, names, and potentially their larger visual preview images (described above) to allow the administrator to see the potential visual impact of the component prior to placing it.

Figure 7:
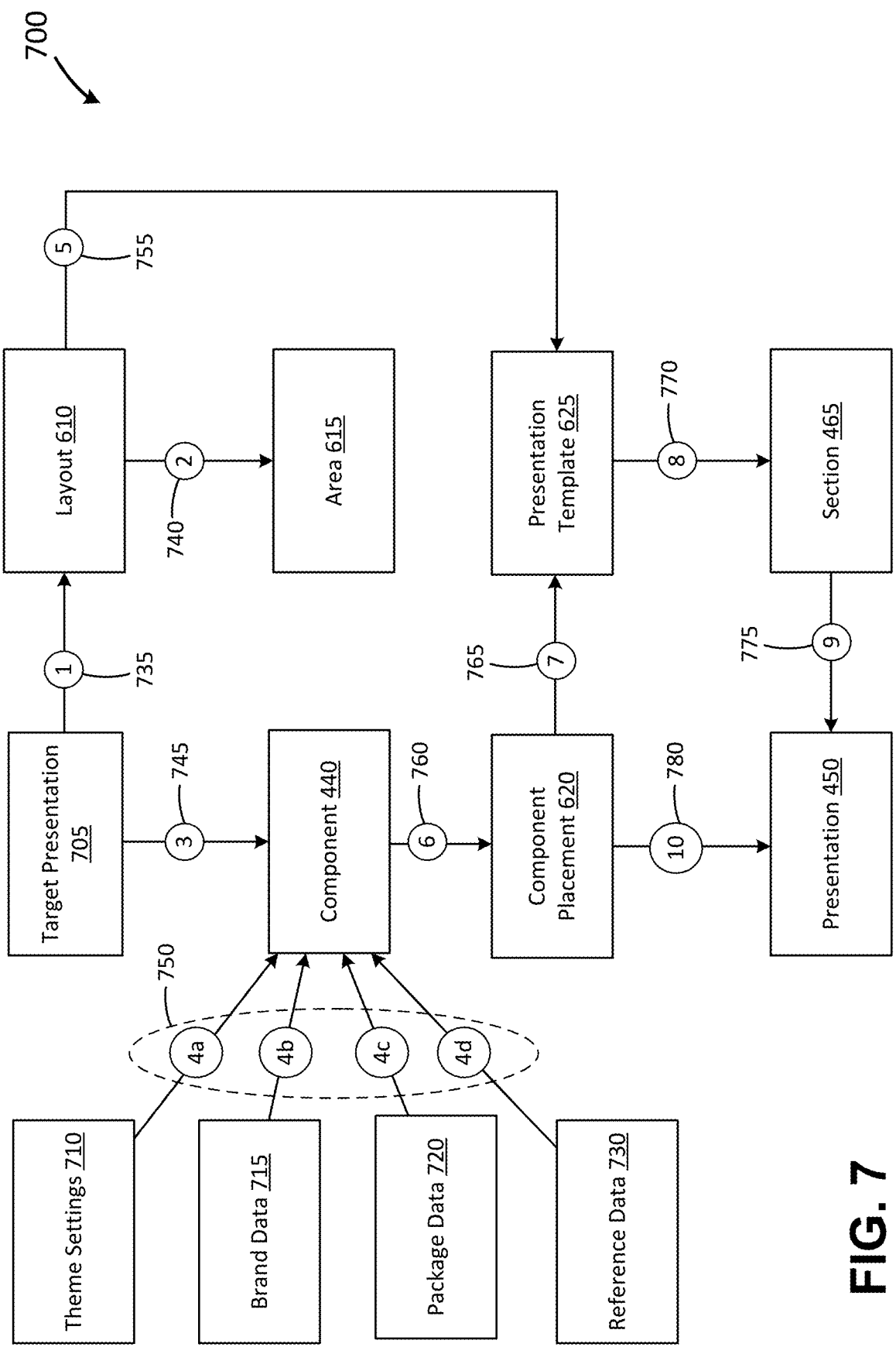
FIG. 7 shows a block diagram of an example process for building a presentation of content via configuring a component, according to the principles of the disclosure.

FIG. 7 illustrates an example process 700 for building or configuring a presentation 450 including one or more components 440. Process 700 may incorporate one or more aspects of processes 400 and/or 500 and/or system 600 described above and may be implemented by system 100 according to logical system 200 and/or data model 300.

A presentation 450 may be configured according to process 700, for example, via one or more user interfaces provided by the MIX service 135 and/or Application 145. Process 700 may begin by extracting a layout 610 from a target presentation 705 at operation 735. Next, one or more areas 615 may be configured or created at operation 740, for placement of one or more components 440. Next, one or more components 440 may be extracted for association with the target presentation 705 at operation 745. The one or more components 440 may each be tailored using a software development kit (SDK) provided by system 100. The SDK may enable embedding of various settings and data into the component 440 at operation 750. This may further include embedding theme settings 710, embedding navigation, brand-level data 715, embedding package data 720, and/or embedding reference/teaser data 725. Some or all of the data embedded using the SDK may be associated with one or more data tables (with a similar or the same naming convention) as described above in reference to FIGS. 3A, 3B, and 3C.

Process 700 may continue to operation 755, where a presentation template 625 may be created from the layout 610 (which may be empty). The configured component(s) 440 may be placed in the layout areas 615 of layout 610 at operation 760. Next, the component placement(s) 620 may be configured for the presentation template 625 at operation 765. The presentation template 625 may then be associated with a section 465 at operation 770, and a presentation 450 automatically created (according to the template 625 and including components 440) at operation 775. To finish the configuration of presentation 450, each component placement 620 may be tailored for the section 465.

Figure 15:
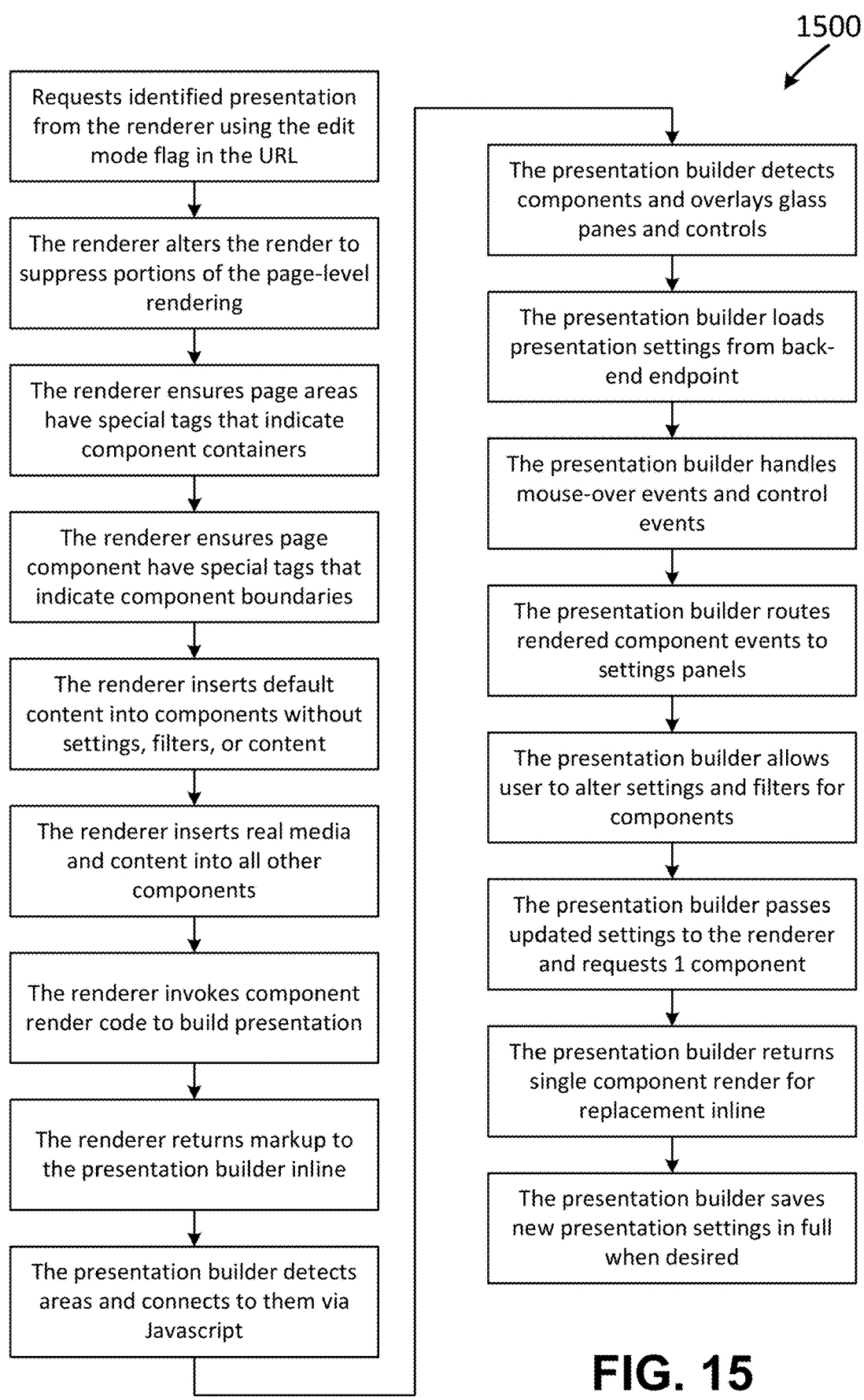
FIG. 15 shows a flow block diagram of an example process for configuring a presentation, according to the principles of the disclosure.

FIG. 15 shows a flow block diagram of an example process 1500 for configuring and rendering a presentation 450 from a template.

Once a presentation 450 is inside of the presentation builder, the system 210 may support three manipulations of the presentation 450, all of which may be performed without persisting the presentation:

1. Administrators may select and place a new component 440 into an existing container in the presentation 450
   a. In this case, the renderer will return a temporary render for an individual component 440 for placement
2. Administrators may alter the configuration of an existing component 440 and change its render
   a. In this case, the renderer will return a temporary render for an individual component 440 for placement
3. Administrators may move an existing component 440 to a new location in the presentation 450
   a. In this case, the presentation builder will do all the work client-side with no interaction 7. Brand and Property Management The brand and property management sub-system 210 is the primary vehicle for creating and managing media organization structures and user experiences designed to deliver specific types of media and content to specific audiences. The system 210 supports a software development kit (SDK) for the creation of channel-specific (web, mobile, OTT, and any other channel technology) and mirrored web-only (to power the visual editing capabilities) rendering components, such as components 440, 635, and visual layouts that include data and brand visual configuration integrations. The setup of a brand-level property, such as 630, enables a web site to have or be associated with a hierarchical URL structure, connect to social media outlets and mobile applications specific to the brand 630 and enables brand managers to select pre-constructed visual templates, visually manipulate them, and create, user, and configure presentations for each specific area of each web site, mobile application, etc. from a single user interface (described below).

The property management system 210 is built in such a way that layout and component code may be re-used across properties 630, 465 or property templates or presentation templates 625 from a central location. In addition, entire layout, component, and configuration set-ups for a presentation 450 may be saved as a presentation template 625 for re-use within a single brand or across brands. When a presentation template 625 is applied to a specific property or section 465 (for instance a specific URL page of a web site) the presentation 450 may inherit all settings from the template 465, automatically making certain substitutions (based on configurable conventions) in the configuration and content routing set up (these behaviors are programmable and flexible), and becomes wholly independent of the template 625. This enables differentiation of a specific presentation 450 from the template 625 from which it was built and from other presentations 450 built from the same template 625.

Across brands 630, the brand theme settings, such as one or more themes 1135 (in some cases built from one or more theme templates 1130) including fonts, brand logos, style guides (all manageable visually through the brand management interface) also alter the appearance of like presentations 450. Presentation templates 625 may also have "locked" configurations and components 440 that may not be changed by an individual site 630 or presentation 450 (limiting the visual editing interface at brand management time). In some aspects, changes to shared components 440 or shared presentation templates 625 can cascade update presentations 450 and brands 630 across the network to introduce new or correct undesired functionality at scale quickly and requiring minimal input form a user, for example.

In addition to presentation templates 625, the property management system 210 provides the notion of a brand template 1120, including a full structure of sections 465 and pre-configured presentations 450 for a specific type of digital property 630 (i.e. a news property). This feature enables the new property interface or wizard to instantly create a fully functional new operating brand 630 based on a template quickly and efficiently (e.g., as quickly as Microsoft Word or a like word processing program can create a new document based on a document template). Similar to the presentation 450/presentation template 625 relationship, brand property 630 configurations are wholly independent but still related to an associated brand template 1120, allowing each brand 630 to differentiate itself structurally from the next but retaining the ability to lock certain aspects of a brand type and to cascade release new functions and/or sections 465 to like brands 630 in a single step when desired.

Figure 11A:
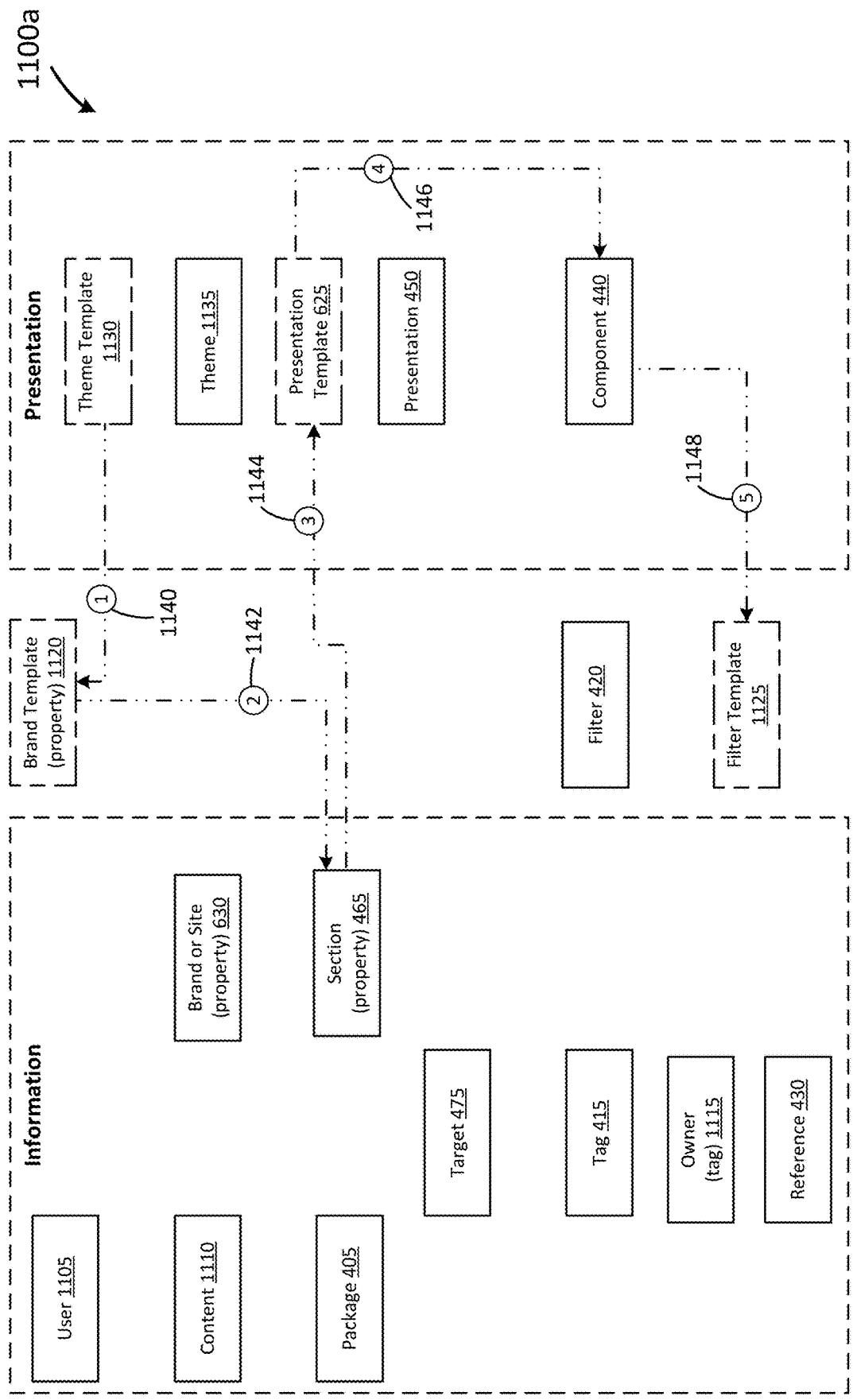
FIGS. 11A, 11B, and 11C show block diagrams of example processes for setting up a brand template, configuring a brand or site, and publishing content, according to the principles of the disclosure.
Figure 11B:
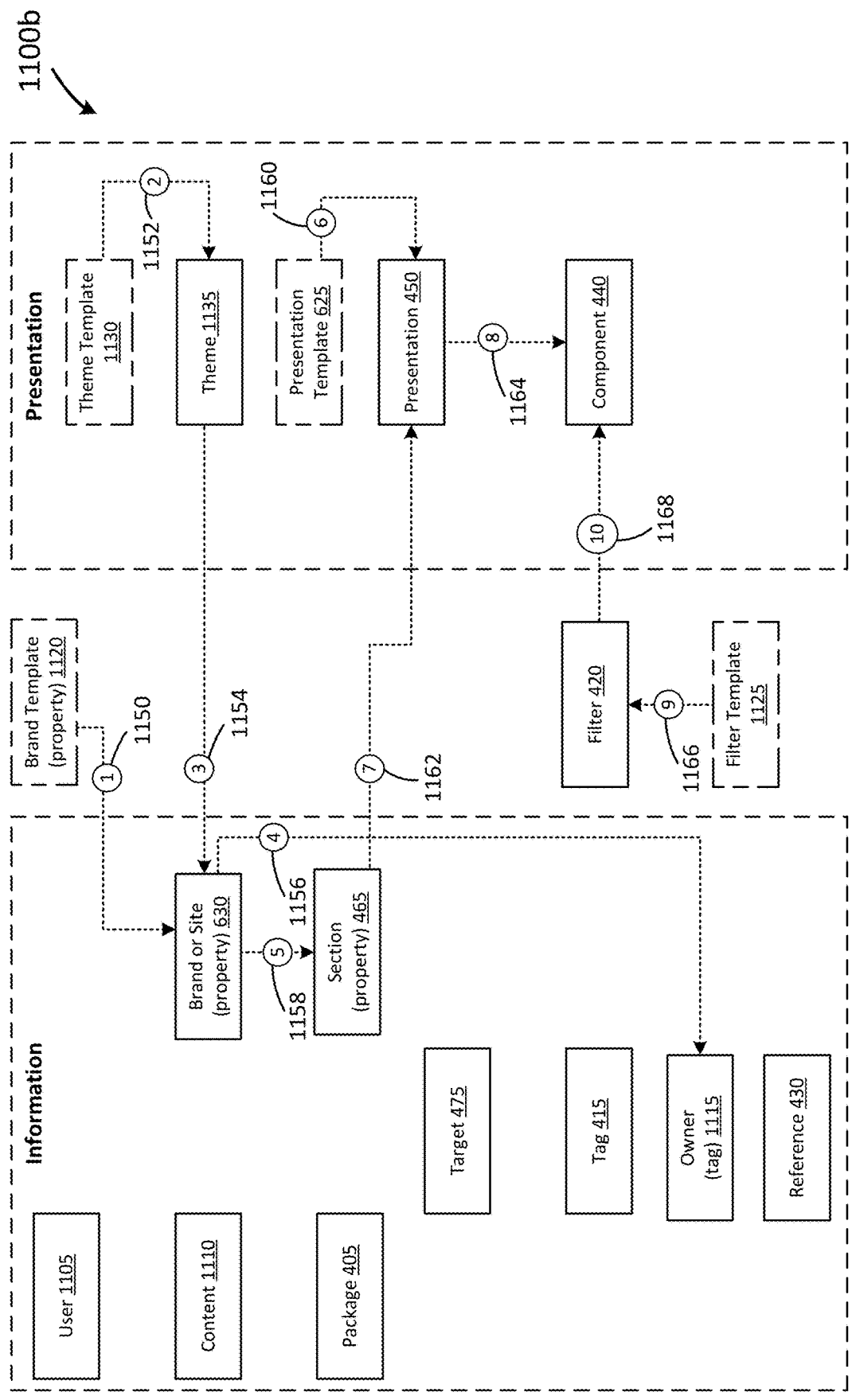
Figure 11C:
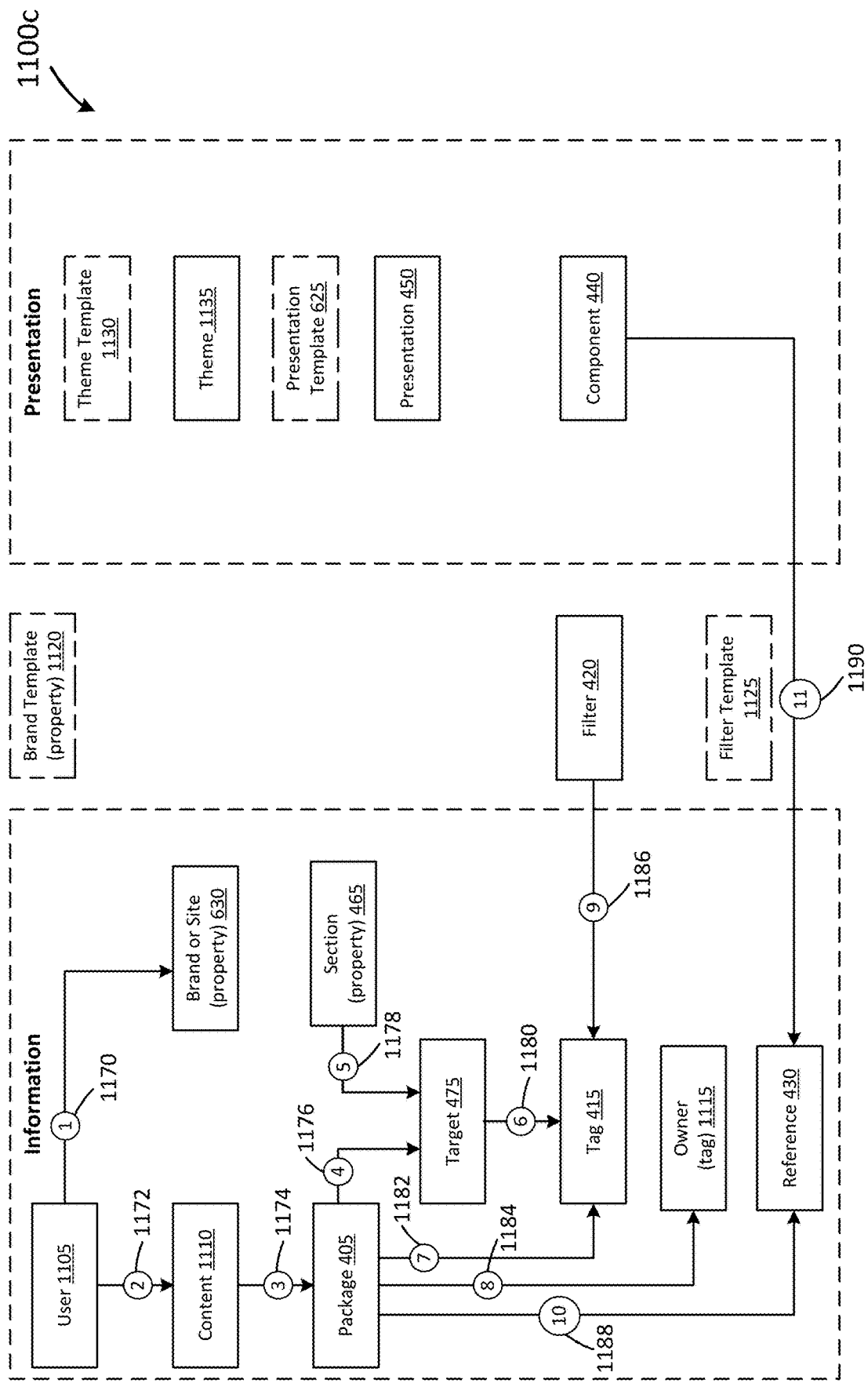

FIGS. 11A, 11B, and 11C show block diagrams of example processes 1100a, 1100b, and 1100c for setting up a brand template, configuring a brand or site, and publishing content, respectively. Processes 1100a, 1100b, and 1100c may incorporate or touch on one or more aspects of processes 400, 500, 700, 800, 900 and/or 1000 and/or system 600 described above and may be implemented by aspects of system 100, such as by the property management system 210, or other components of the logical system 200, in coordination with data model 300.

A brand template 1102, which may include a template for a news page or property, lifestyle site, etc., may be configured by process 1100a. Process 1100a may incorporate processes performed by system 100, for example in response to inputs received by a user of system 100, for example via one or more computing devices via application 145. A brand template 1120, or theme template 1130, once configured, may be saved to enable recreation of the template with a one click entry or minimal entries by a user, for example.

Process 1100a may begin with a user entering information to create a brand and/or theme template 1120, 1130 at operation 1140. In some aspects, not all setting configured in the brand or theme template 1120, 1130 will be valid for all instances of publishing or presentation of the template 1120, 1130 to sites 630, such as URLs. As a result, the sites 630 presenting the templates 1120, 1130 may inherit defaults, and override some configuration details to format or fit the template 1120, 1130 to the individual site 630. Next, a hierarchy of sections/properties 465 may be added to the brand template 1120 at operation 1142. In some aspects, the each site 630 added to the brand template 1120 may inherit some settings/configurations of the brand template 1120 and override others. In some aspects, one or more sections 465 may be locked in a specific place or area 615 of the brand template 1120, to restrict editing of that section 465, for example.

Next, each section 465 associated with the brand template 1120 may be associated with a presentation template 625 at operation 1144. The one or more presentation templates 625 may each be associated with one or more components 440, which may be added and configured at operation 1146. In some cases, the brand template 1120 may enable selection of locking one or more components in a certain area 615 of a presentation 450/presentation template 625. Next, one or more filter templates 1125 and/or filters 420 may be added to one or more of the components 440 at operation 1148. A site 630, upon receiving the brand template 1120 may adapt and/or override some components 440/filters 420/filter templates 1125 associated with the brand template 1120, for example, formatting the template 1120 to fit certain characteristics or limitations of the site 630 (e.g., area, space, aspect ratio, resolution, etc.).

Process 1100b may be used to create a new brand or site 630, and may be driven by operations of system 100 in response to inputs received from a user of system 100, for example via one or more computing devices via application 145. Process 1100b may begin with a new brand 630 begin created from a brand template 1120 at operation 1150. In some aspects, the brand template 1120 may have been configured according to process 1100a described above. The brand 630 may be automatically configured based on the selected configuration of the brand template 1120, with minimal user input and/or effort. In some aspects, some settings may be additional defined for the brand 630, such as associating a URL with the brand 630. A theme structure 1135 may additionally be created for association with the brand 630 at operation 1154. In some aspects, the theme 1135 may inherit settings from a theme template 1130 at operation 1152, such as basic images, colors etc. as default settings of the template 1130. It should be appreciated that any of a number of settings of the theme 1135 (e.g., inherited from the theme template 1130) may be overridden, for example, to create a custom brand or site 630 with little user input required.

Process 1100b may continue at operation 1156, where ownership may be designated/controlled for the brand or site 630. Operation 1156 may include associating or tagging one or more owners 1115 with the brand or site 630, thus enabling control of what content and from what sources is published on the brand 630. Sections 465 and/or pages may be copied at operation 1158 and associated with or placed in the brand or site 630. Each section may be configured by copying or selecting one or more presentation templates 625 at operation 1160 and then customizing the presentation 450 from the template 625 at operation 1162 for placement in the section 465. Additionally, in the process of configuring each presentation 450, one or more components 440 may be mapped to the presentation 450 at operation 1164. In some cases, one or more components 440 may be locked in a presentation, such that modification of that particular component is not enabled (e.g., to ensure brand control and/o consistency). Each component 440 may be associated or configured with one or more filters 420 at operation 1168, for example to control the type of content that is rendered by each component 440. Selection of one or more filters 420 for a component 440 may be performed by selecting and/or adapting a filter template 1125 at operation 1166.

In one example, content 1110 may be published to one or more properties or sections 465 via process 1100c. The one or more sections 465 may have been created or configured via process 1100b and in some cases also via process 1100a. Process 1100ac may incorporate processes performed by system 100, for example in response to inputs received by a user of system 100, for example via one or more computing devices via application 145.

Process 1100c may begin with a user 1105 requesting access/permission to one or more sites 630, for example, for the purpose of publishing and/or editing content, at operation 1170. Once granted access to one or more sites or brands 630 (e.g., upon entry of and subsequent validation of user credentials such as username and password), a user may select and add various types, lengths, etc. of content 1110 at operation 1172. The content 1110 may be packaged for publication at operation 1174 into one or more packages 405. Each package 405 may be associated with at least one primary target 475 at operation 1176. Each target 475 may map explicitly to one or more sections 465 at operation 1178. Each target 475 may imply one or more tags 415 from the section 465 settings at operation 1180, and each package 405 may then be mapped or associated with those tags 415 at operation 1182. In some aspects, additional tags 415 may be added to a package 405, for example by a user.

Each package 405 and the content 1105 associated therewith, may be associated with one or more owners 1115 at operation 1184, for example to specify/restrict where the content 1110 can be published, such according to syndication rules and permissions. In some aspects, if content 1110 is restricted from being published at certain sites 630, the system 100 may provide one or more warnings and/or may prohibit publishing of the content in or on the restricted site(s) 630. One or more filters 420 may find packages 405 based on tags 415 associated with the package 405 at operation 1186. The one or more filters 420 may be associated with other components 440, other presentations 450, other sections 465, and//or other brands or sites 630, such that the filters 420 may direct the package 405 to be published in other, non-targeted locations. In some cases, these other locations for publishing may be associated with the same brand 630 as the user 1105 or may share access rights with the user 1105 or brand 630.

Subsequently, one or more references 430 may be generated for a package 405 at operation 1188. Each generated reference may be associated with the package 405. The one or more references 430 may then be tied or linked to specific components 440 at operation 1190. In some aspects, each reference 430 may be custom tailored for each section 465, for example via inputs received from a producer.

7a. Visual Property Structure Control

Property setup/configuration and structure control is the first part of an integrated process that enables content consolidation, syndication, and integration. Creation of properties 630, or sections 465 from known property templates or presentation templates 625, customization of the structure and presentation structures (see Visual Presentation Management section below) creates a hub of known topical areas for coverage that eventually connect to the de-coupled tagging and contextual analysis infrastructure (via targeting) allowing implicit control of content and publishing and enabling content optimization. Property creation may be implemented by the property management system 210 in coordination with various structures of data model 300. Property creation may begin with basic information set up, and may also include configuration of a full property map based on the template sections, presentation set up, and filter and configurations from the template. Property configuration may be completed by enabling the user to customize the entire information structure (barring locks at the property template level).

During the creation of a new property 630, 465, the system 210 may take in a property or brand name, a basic logo representation and other configurable (at the template level) information. Important to the setup is the production URL (and the derived staging URL) where the web-based version (if applicable) will render. Once a user provides basic information to the system 210 about the template (e.g., presentation template 625) and general settings for the digital brand (e.g., 630), the information or site tree structure is created automatically, applying all default presentation templates and locking certain aspects of the continued set up.

Figure 12:
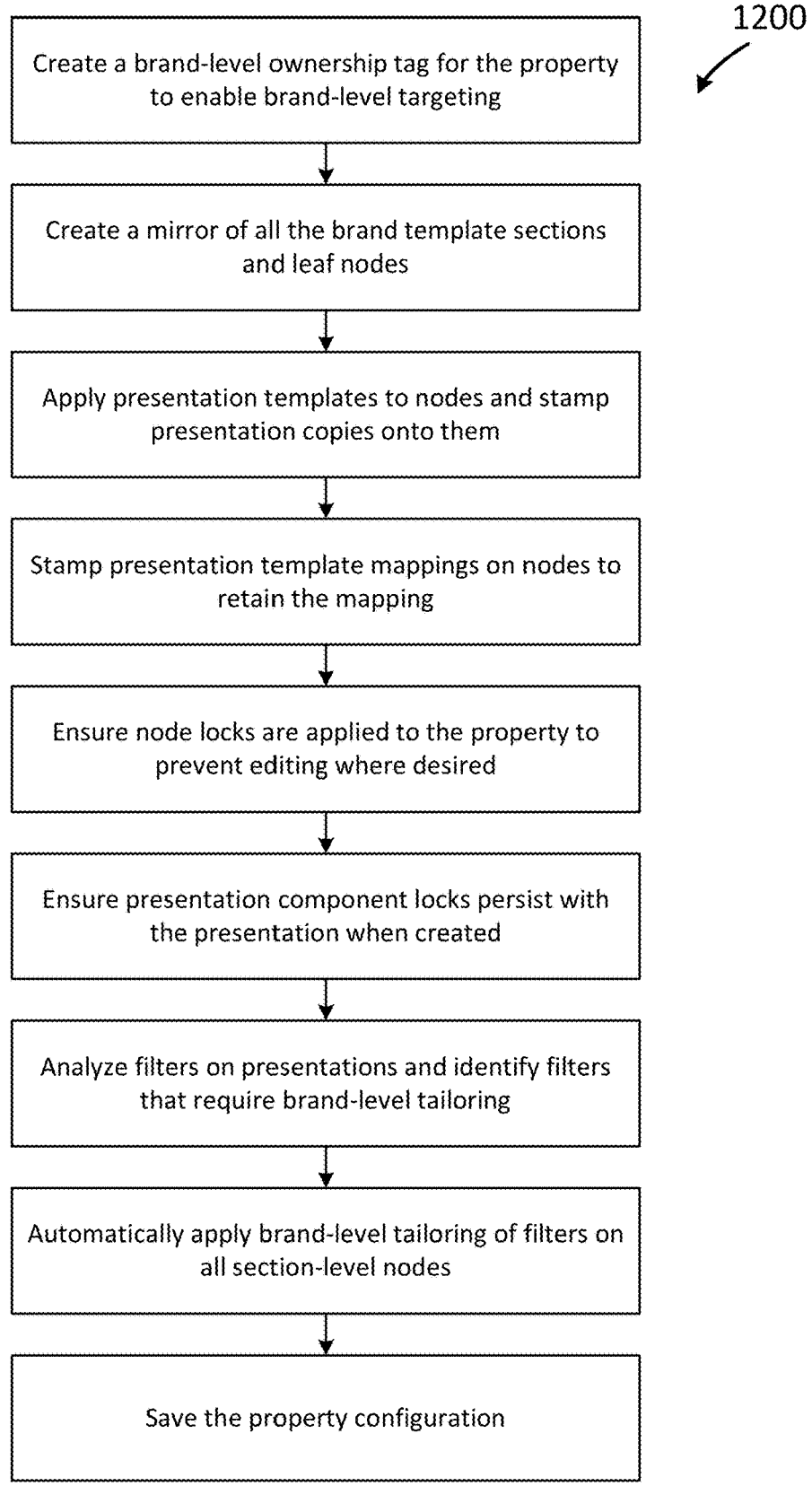
FIG. 12 shows a flow block diagram of an example process for creating a brand-level property, according to the principles of the disclosure.

FIG. 12 shows a flow block diagram of another example process 1200 for creating a brand-level property, such as a brand property 630. Process 1200 may incorporate or touch on one or more aspects of processes 400, 500, 700, 800, 900 and/or 1000 and/or system 600 described above and may be implemented by aspects of system 100, such as by the property management system 210, or other components of the logical system 200, in coordination with data model 300.

Figure 13A:
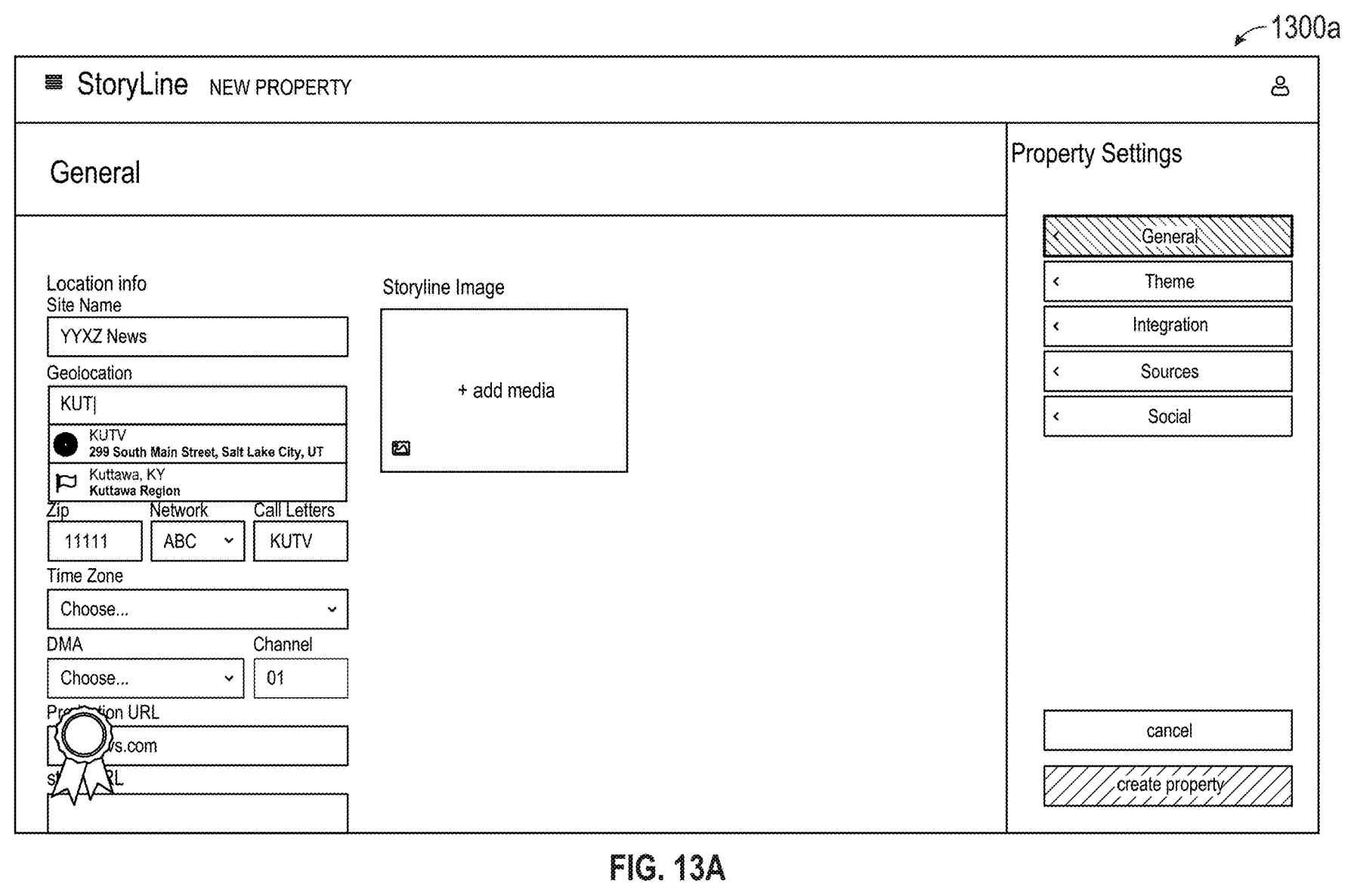
Figure 13B:
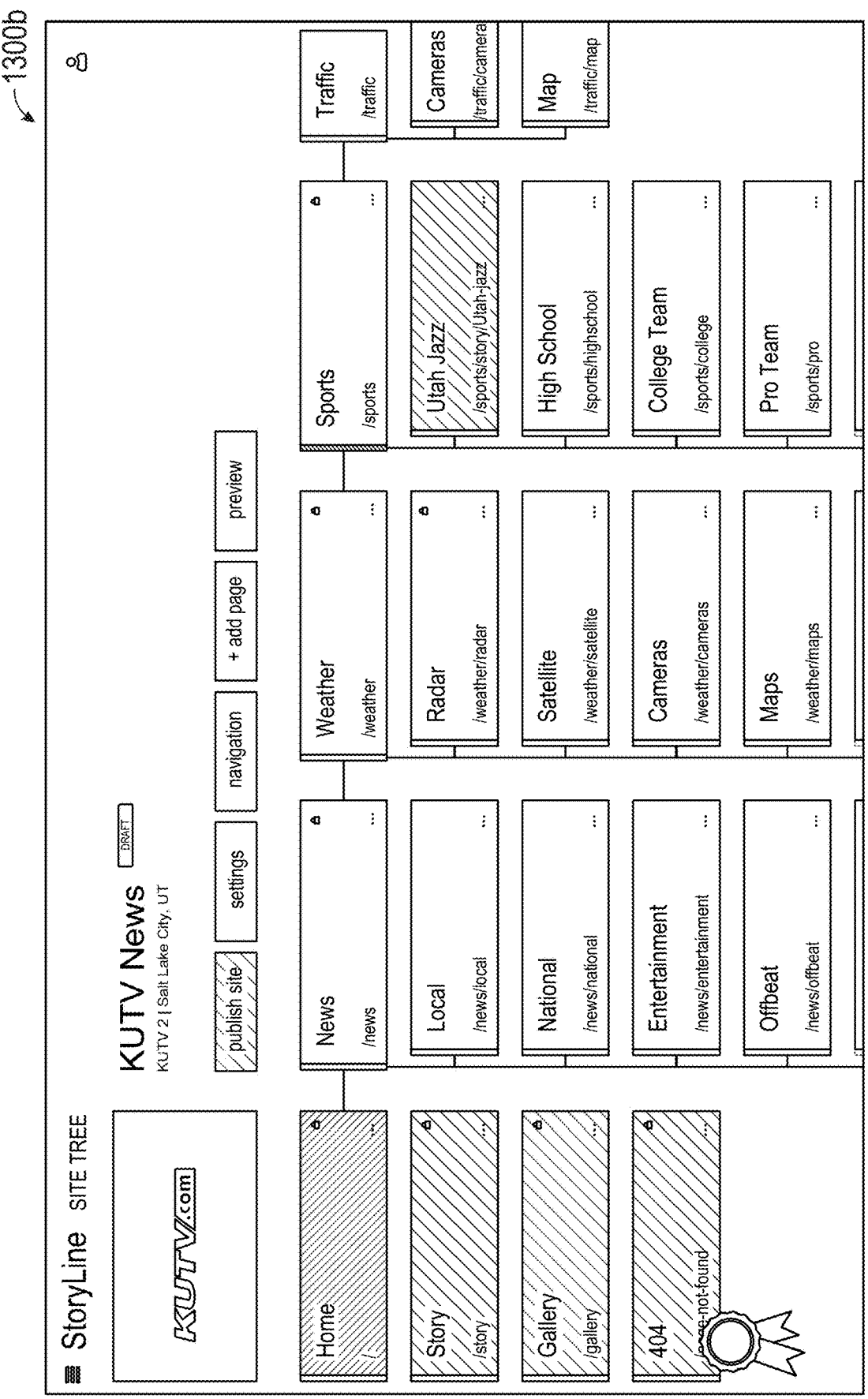

FIG. 13A shows an example interface 1300a for editing a property, while FIG. 13B shows an example interface 1300b for managing a property.

7b. Visual Theme Configuration

Figure 14:
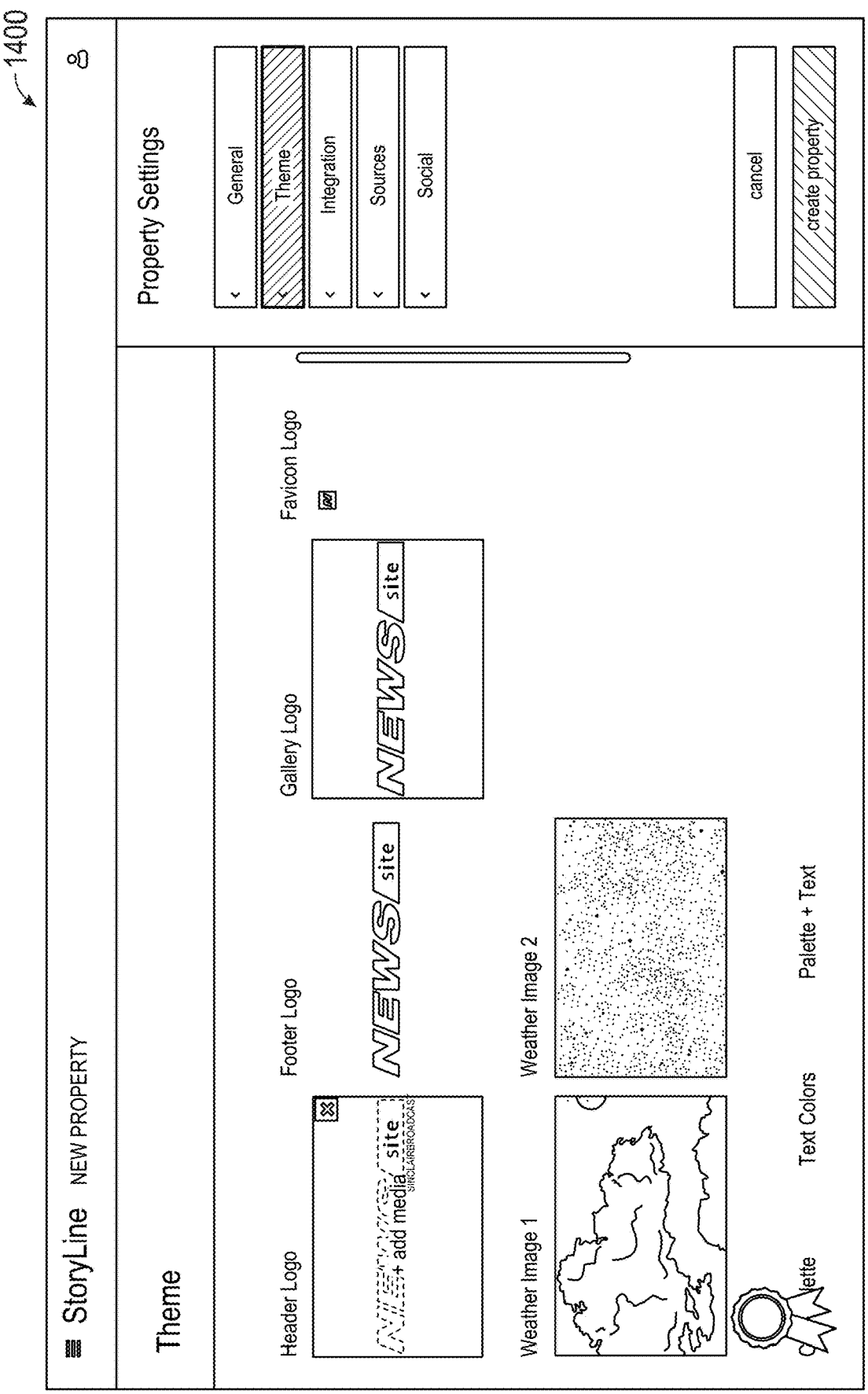
FIG. 14 shows an example interface for and configuring a theme, according to the principles of the disclosure.

In some aspects, the brand and property management system 210 may provide a visual theme editor that enables a brand administrator or other user to visually control the style guide for a brand and immediately preview the theme in action. An example theme editing interface 1400 is illustrated in FIG. 14. Changes to or configuration of the brand-level theme settings, such as to a theme 1135 or a theme template 1135, may include configuration of logo imagery, color selection, and font-styles. These settings may be received, for example from a user, and the system 210 may display the changes on the property 465/brand 630 as they are entered (e.g., visually alongside examples in the visual style guide for the brand 630, generating a visual preview of each property 465 as the brand 630 is tailored). Theme changes are connected to property wide preview functionality that may be identical or near-identical to the property or presentation rendering system 215, and/or presentation publishing system 220. New theme settings may be added at the theme 1135 or theme template 1130 level and may then become addressable in the layout (e.g., 610) and component SDK and visually editable in the theme builder interface 1400. This integration between the component SDK, the theme manager interface 1400, the presentation management service or builder 210, the presentation rendering service 215, and the presentation publishing system 220 system (all of which share the presentation rendering system as a common mediator) provide an efficient and intuitive platform for building presentations of content and customizing for various properties or websites.

During property creation, the theme 1135 may be bootstrapped from the template 1130 as described above and can be changed visually with small style-guide based previews. These borrow from actual SDK-based rendering components (e.g., 440, 635) that leverage the target theme elements and have been flagged during development as representative of certain key elements of the theme 1135. Developers can define new areas of a theme 1135 for configurability by declaring them in the SDK or through the one or more user interfaces, such as interfaces 1300a, 1300b, and/or 1400, which may be provided by the MIX service 135 implementing the above described sub-systems of logical system 200. The continued round-trip relationship between the development, publishing, rendering, previewing, and visual management aspects of the system 100 enable the system 100 to support a more seamless brand management and publishing experience.

8. Mix Platform Application Interface

Figure 17:
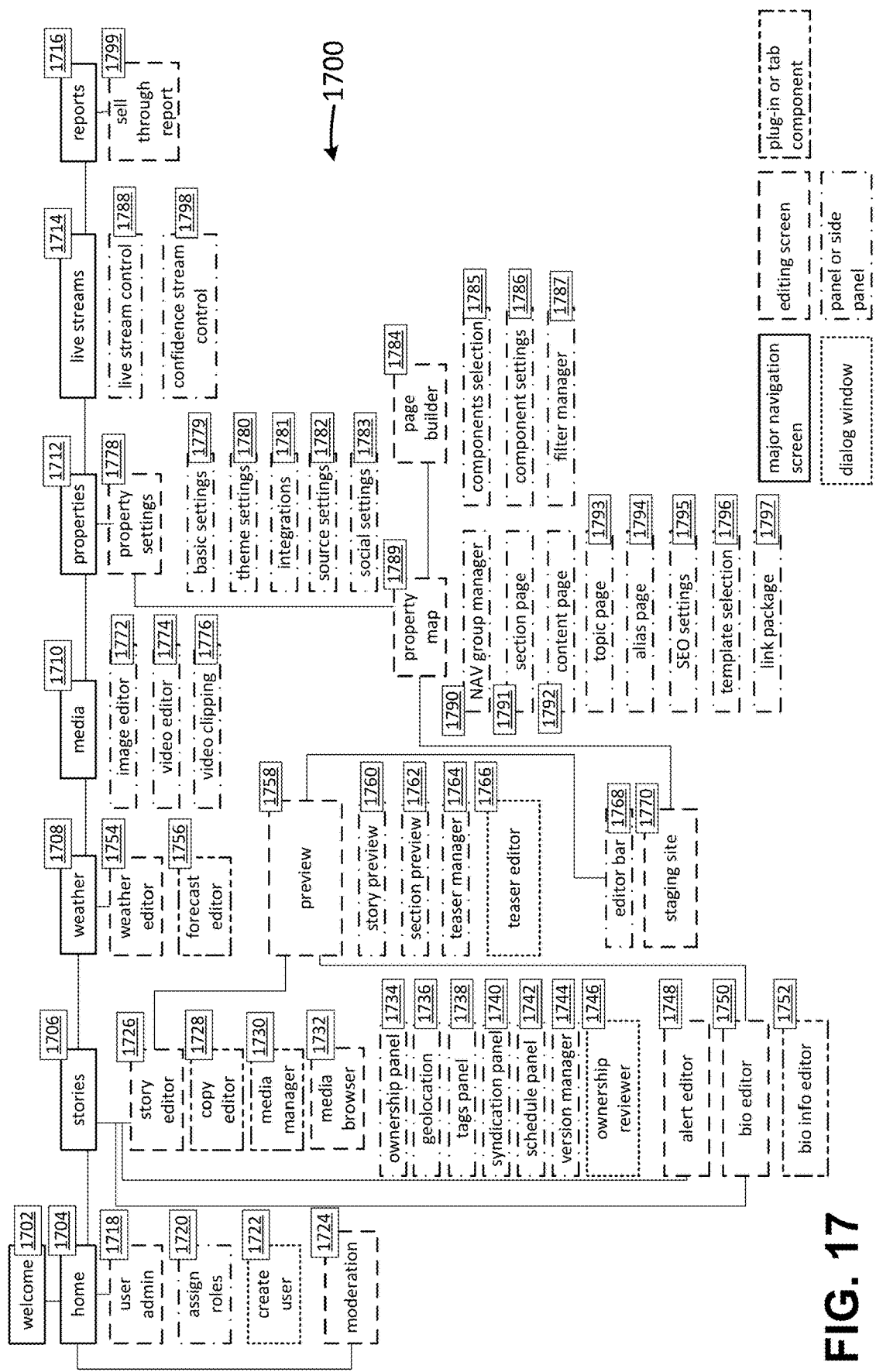
FIG. 17 shows a block diagram of an example interface for editing and publishing content, according to the principles of the disclosure.

FIG. 17 shows a block diagram of an example interface 1700 for editing and publishing content. Interface 1700 may provide general flexibility and extensibility as configured property types, media types, and feeds grow. The captured map or interface 1700, which is an example implementation, illustrates a method for enabling publishing and property management in an integrated process as described. It should be appreciated that interface 1700 may be provided by, for example, by the MIX service 135 of FIG. 1, and/or may be more specifically provided by the one or more sub-systems of system 200, such as the presentation management system 210, the presentation publishing system 220, and/or other aspects of system 200. Many of the features described above may be provided by, through, or in association with interface 1700. Different components or aspects of interface 1700, which may include navigation screens, editing screens, plug-in or tab components, dialog windows, and panel or side-panel visualizations, will be described below in the hierarchical order.

The following blocks or components may be expressed in interface 1700 as major navigation screens, for example, and may all be accessible from a home screen, page, or interface 1704: the stories screen 1706, the weather screen 1708, the media screen 1710, the properties screen 1712, the live streams screen 1714, and the reports screen 1716. The welcome block 1702 may enable both login and registration capabilities for new users, for example. Upon entry and validation of credentials, a user may be directed to the home screen 1704. The home screen 1704 may houses common actions and custom common actions for individuals and groups, for example, saved or associated with a specific user account. The stories screen 1706 may house all packaged content of various types and provides searches, filters, and sorts. The weather screen 1708 may include a custom package management provider tied to a properties and data feeds. The media screen 1710 may houses all images and video and provides searches, filters, sorts, etc. The properties screen 1712 may lists all existing brand properties and allows creation, searching, and editing of the properties. The live streams screen 1714 may list bundles of live running video by brand including one-off live feeds. The reports screen 1716 may provide access to analytics across properties and content.

The home screen 1704 may provide access to a user admin editing screen 1718, which may integrate with Lightweight Directory Access Protocol (LDAP) and enable user creation and role management, for example, including access to various portions of system 100. Also accessible from the home screen 1704 is a create user dialogue window 1722 that enables a new user to be defined and roles to be assigned (e.g., providing similar functionality as same as assign roles panel 1720). A moderation editing screen 1724, also accessible from the home screen 1704, may enables workflow of many sorts across the system including UGC, comments, and publishing to be viewed, edited, etc.

The stories screen 1706 may provide access to a story editor screen 1726, which may be the default visual package editor that integrates media attachments. From the story editor 1726, an ownership panel 1734 may be accessible, which enables editors to view and specify package sources (e.g., with some set automatically). Also accessible from the editor 1726, a geolocation panel 1736 may specify the area of impact for a content package for use in geo-fencing. The story editor 1726 may similarly provide a tags panel 1738 that may show automatically derived and manually managed contextual tags for package indexing. The story editor 1726 may also provide a schedule panel 1742 that enables allow a package to be published and expired within a time limit. A media browser screen 1732, also accessible from the stories screen 1706, may enable advanced searching and attachment of media to any package from an asset repository. An alert editor screen 1748, also accessible from the stories screen 1706, may provide for creation of property-wide alerts, which may be stand-alone or as part of the package publication process. The bio editor screen 1750 may use custom package panels to support a custom biography package type (repeatable). The bio editor screen may also provide a bio info editor plug-in that enables custom biographical information to attach to a biography package (extensible).

In some aspects, a syndication panel 1740, also accessible from the stories screen 1706, may enable advanced searching and selection of sections across properties for publishing activities.

A similarly accessed ownership panel 1734 may provide a reviewer the ability to enforces rights management before publication and enables overrides, for example, to control the routing of content to various properties. A version manager panel 1744 may show package content versions over time and enable reversions to previous states.

The weather screen or page 1708 may provide access to a variety of editing tools for weather based presentations. For example, a weather editor screen 1754 may provide a custom package editor tailored to support forecast data and galleries. A forecast editor plug-in 1756 may provide a visual daily forecast editor for managing ingested weather feed data manually.

A preview screen 1758, which may be accessible from the story editor 1726 and/or the bio editor 1750, may display multiple packages and section displays in-line with publishing processes or property management. A story preview panel 1760 may display a package as it will render and enable switching between multiple properties as applicable. A section preview panel 1762 may display promotion of a package as it will appear across multiple properties as applicable. A teaser manager panel 1764 may enable adding a reference or tailoring references in-line with a visual preview of the associated presentation. A staging site screen 1770, which may be accessible from the preview screen or component 1758, or from the property map screen or component 1789, may enable traversal of properties in the process of being created but not published. An editor bar 1768, which may also be accessible or viewable from the preview screen 1758, may enable producers to initiate editing actions from the live or staging property when logged in.

The media screen 1710 may provide screens or interfaces for editing images 1772, video 1774, and for video clipping 1776. The image editor 1772 may enable alteration of images and renditions of images for various channels during publishing. The video editor 1774 may enable viewing, editing meta-data, and poster frame selection during publishing. The video clipping editor 1776 may enable integrated video clip creation and alteration during publishing.

The properties screen 1712 may link to various other screens and interfaces for managing and configuring presentation of content of one or more properties at one time. For example, a property settings screen 1778 may be accessible from the properties interface 1712, and may provide for creation and editing of property settings based on brand template. These features may be further provided for by: a basic settings panel 1779 that manages URLs, brand name, icon, and configurable, requires settings by brand type at the high level; a theme settings panel 1780 that shows a visual preview of colors, logos, and other brand-level style guides for editing; an integrations panel 1781 that enables configurable integration points with external services like metrics and mobile applications; a source settings panel 1782 that provides white-listing and black-listing of content sources and definition of new sources as needed; and/or a social settings panel 1783 that connects the property with external social media channels as needed (configurable by brand template).

The property settings screen 1778 may also link to the property map screen 1789, which may provide for visually display and management of property structures and creation of presentations. These features may be further provided for by: a section page panel 1791 that enables configuration of a unique, usually discover-based destination or topic area for the brand; a content page panel 1792 that enables configuration of a type of package display presentation for the brand; a topic page panel 1793 that enables configuration of a presentation that dynamically discovers content based on passed in tag or tag; a alias page panel 1794 that enables configuration of a destination that points to another location inside or outside the brand; a SEO settings panel 1795 that enables alteration of the SEO settings for a given section for web-based presentations; a template selection panel 1796 that can be configured to apply a pre-defined (but sometimes partial) presentation to a property node; a link package panel 1797 that enables configuration specific package content to link to sections for display at run-time as needed; and a navigation (NAV) group manager panel 1790 that enables admins to organize property sections into specific sets for navigating properties.

The property map screen 1789 may also link to a page or presentation builder screen 1784, which provides visual editing of presentations and templates with metrics and content. The page builder screen 1784 may link to the following panels: a component selection panel 1785 that shows all published SDK components for the property channel; a component settings panel 1786 that enables admins to alter visual components easily (reacts to component code dynamically); and a filter manager panel 1787 that enables admins to alter content displayed in specific components in-line with visual preview.

The live stream screen 1714 may provide control and selection interfaces to better enable a user to manage live streaming content in the MIX platform 100. Form the live screen 1714, a live stream control panel 1788 may be accessible that enables selection, monitoring, and on/off switching of live streams by brand. A confidence stream control panel 1798 may provide viewing of constant live feed separate from approved content in 1788.

The reports screen 1716 may provide for viewing of metrics and analytics associated with performance of properties relating to viewership, CPM, CTR, etc., gathered by system 100, for example on a package, component, and other granularities. The report interface 1716 may provide access to metrics concerning secondary content or advertising, such as revenue generated by properties, etc. In one aspect, a sell through report screen 1799 accessible from the reports interface 1716, may provide a custom report showing advertising sell through rate reporting by property or property group.

It should be appreciated that interface 1700 is only given by way of example. Other configurations and implementations of a visual interface for managing and publishing content and digital media are contemplated herein.

9. Mix Platform Example Operation

Figure 18A:
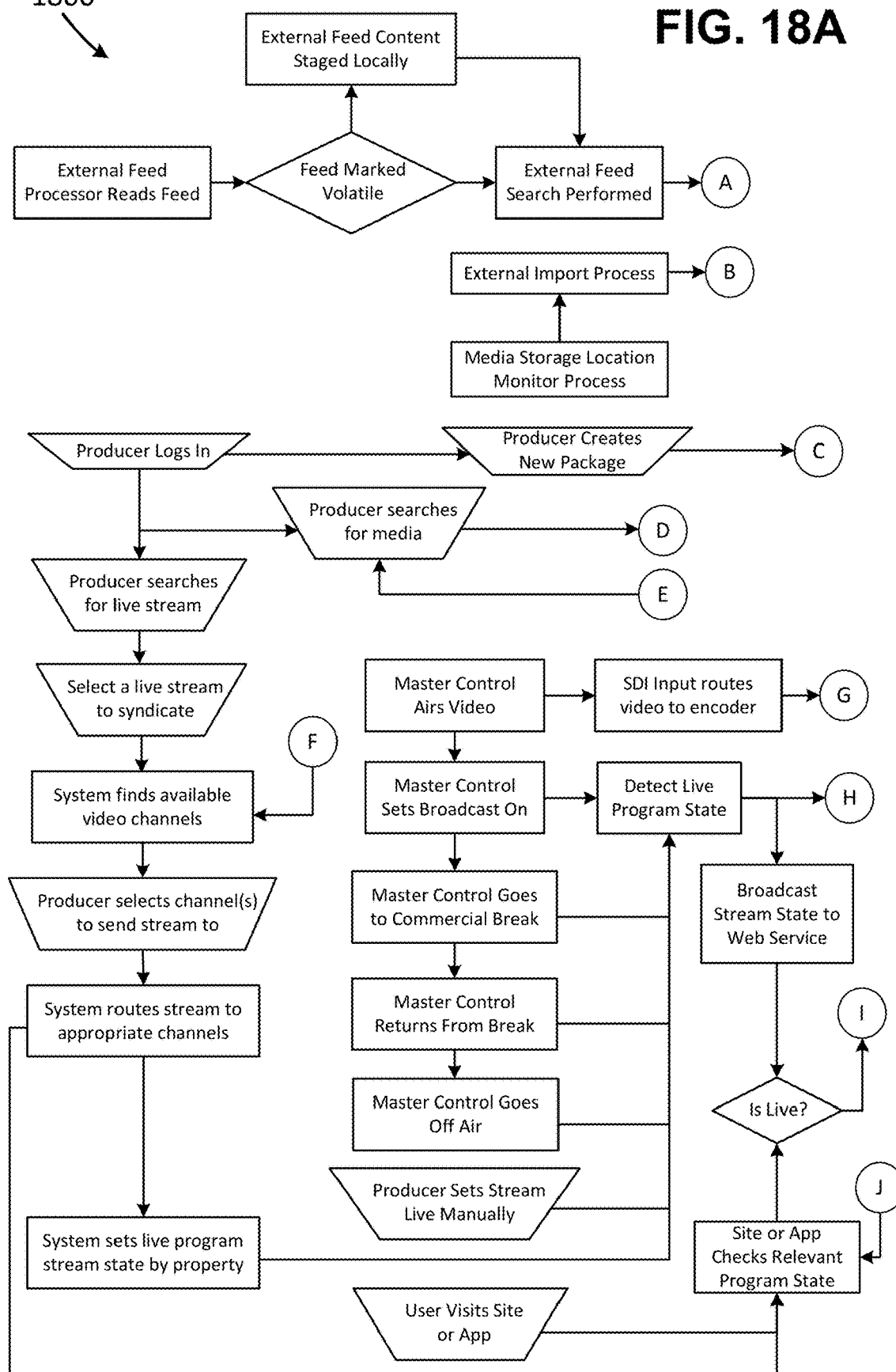
FIGS. 18A and 18B show a flow block diagram of an example end to end operation of the digital media integration exchange system of FIG. 1, according to the principles of the disclosure.
Figure 18B:
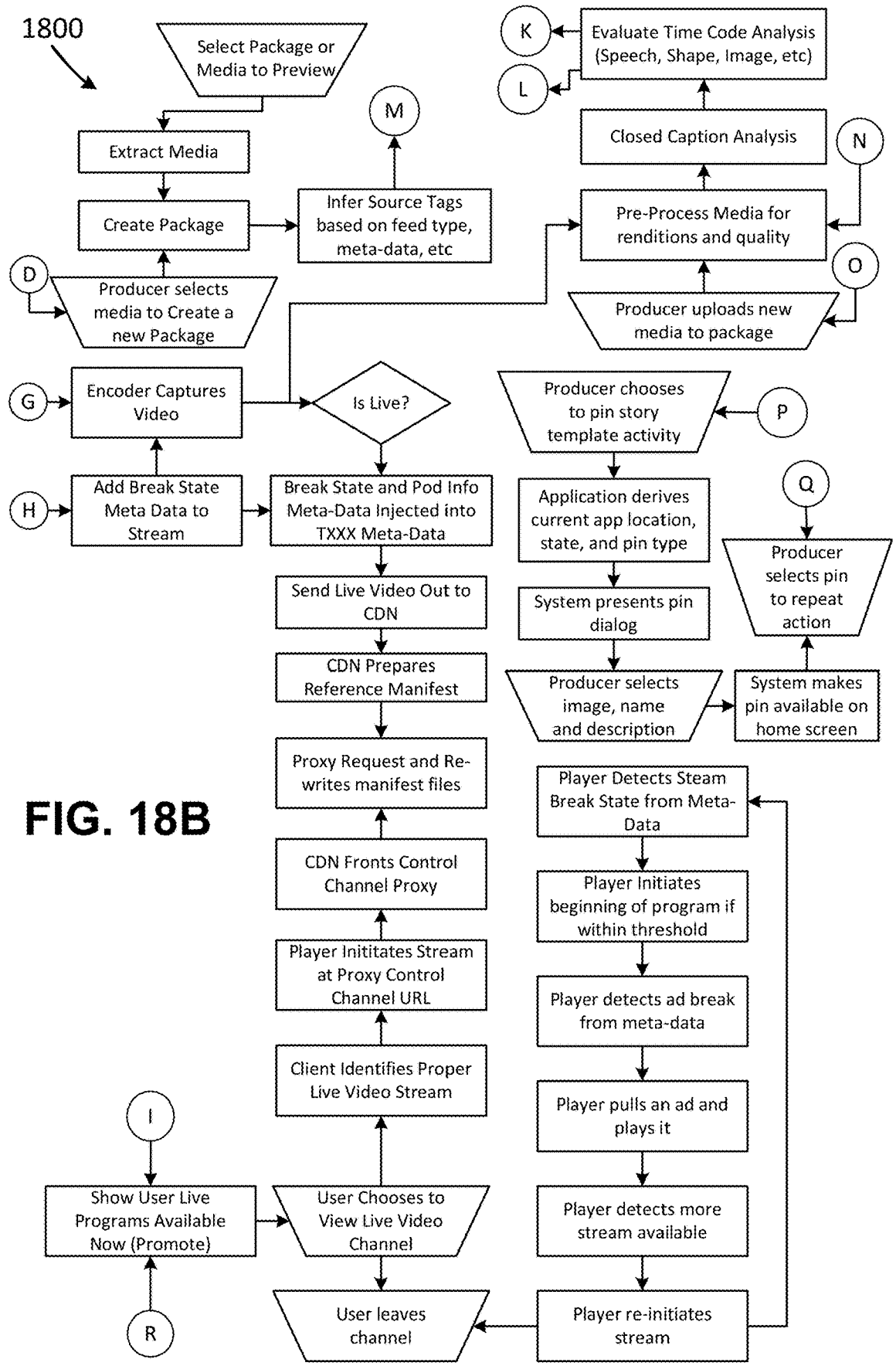

FIG. 18 shows a flow block diagram of an example end to end operation 1800 of the digital media integration exchange system 100 of FIG. 1.

Certain embodiments of the content management or digital media integration exchange system 100 and methods are described above with reference to methods, apparatus (systems), and computer program products that can be implemented by computer program instructions. These computer program instructions can be provided to a processor of a general purpose computer, special purpose computer, mobile computing device, server, virtual server, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices such as, for example, a combination of a DSP and a microprocessor, a plurality of microprocessors, one or more microprocessors in conjunction with a DSP core, or any other such configuration.

The blocks of the methods and algorithms described in connection with the disclosure can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a computer terminal. In the alternative, the processor and the storage medium can reside as discrete components in a computer terminal.

Depending on the embodiment, certain acts, events, or functions of any of the system and methods or processes described herein can be performed in a different sequence, can be added, merged, or left out altogether (e.g., not all described acts or events are necessary for the practice of the method). Moreover, in certain embodiments, acts or events can be performed concurrently such as, for example, through multi-threaded processing, interrupt processing, or multiple processors or processor cores, rather than sequentially. Moreover, in certain embodiments, acts or events can be performed on alternate tiers within the architecture. As descried herein, a deal may also be referred to as a deal proposal, with both terms indicating a deal being submitted by, for example a deal creator or vendor, in a deal promotion platform or system. Furthermore, as described herein, a package or a deal package may both describe a bundle of two or more deals.

Figure 19:
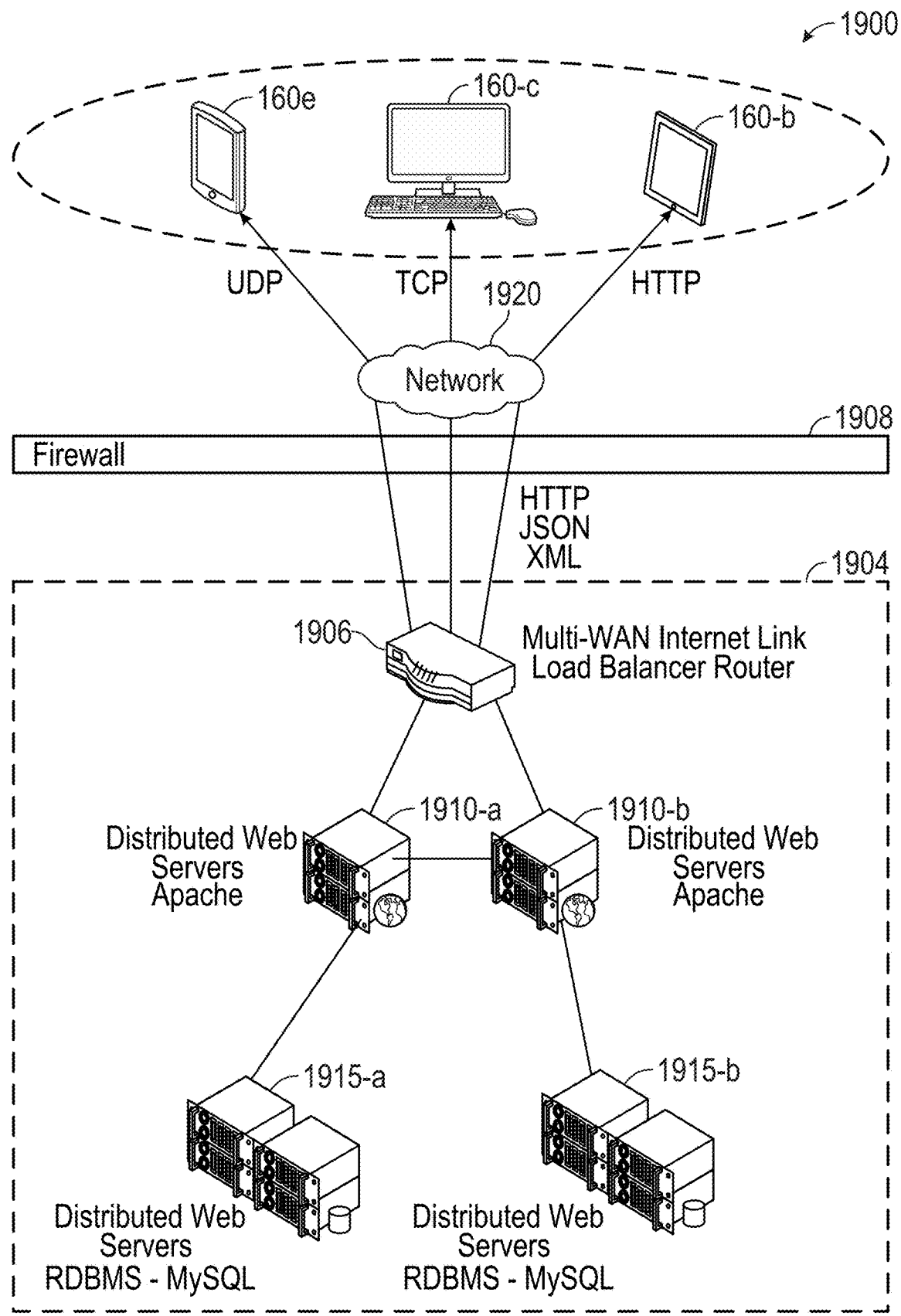
FIG. 19 illustrates an example computer network or similar digital processing environment 1900 in which one or more aspects of the digital media integration exchange system of FIG. 1 may be implemented, according to the principles of the disclosure.

With reference now to FIG. 19, a computer network or similar digital processing environment 1900 in which the MIX platform 100 and associated processes disclosed can be implemented. The MIX platform 100 and various processes described herein can also run on different architectures that include a LAN, WAN, stand-alone PC, stand-alone mobile device, a stand-alone, clustered, or networked mini or mainframe computers, etc.

FIG. 19 is representative of many specific computing arrangements that can support the system and method disclosed. In one embodiment, the software implementing the deal promotion system runs in the Linux® environment on an i686 architecture. In another embodiment, the software is implemented to run in other environments, such as Windows®, UNIX®, and to run on any hardware having enough power to support timely operation of software such as that identified in FIG. 19. In some implementations of the MIX platform, a Linux® distribution, such as, for example, Ubunutu®, is deployed on one or more server computers 104. In an alternate embodiment, one or more computers are deployed as virtual instances rather than physical computers.

A load balancing router 1906 can distribute traffic inside a firewall 1908 to and from distributed web servers 1910-a, 1910-b. In some deployments, these webservers 1910-a, 1910-b are distributed instances of an Apache web server. The distributed web servers 1910-a, 1910-b are communicatively coupled to computers/servers 1915-a, 1915-b hosting one or more persistent data stores. The data stores 1915-a, 1915-b can be distributed relational databases such as, for example, MySQL® storing primary and derivative data generated by the MIX platform 100/MIX service 135. The distributed database servers 1915-a and 1915-b may also communicate with each other via one or more database communication protocols. In addition, or alternatively, the distributed database servers 115 may host XML databases, object oriented databases, NoSQL database, and the like.

Client devices 160 can connect to a remote server infrastructure 1904 via a network 1920 over one or more communication protocols. All computers can pass information as unstructured data, structured files, structured data streams such as, for example, XML, structured data objects such as, for example, JSON objects, and/or structured messages. Client devices 160 may communicate over various protocols such as, for example, UDP, TCP/IP and/or HTTP. In some cases, Client devices 160 may communicate via a wireless connection with the network 1920.

In some embodiments, the wireless connection between one or more client devices 160 and the network 1920 (e.g., communication links 155, 165, and/or the medium upon which the GPI or state signals 170 and/or media/content is delivered from the master control 105 to virtual resources 115 and server 140) may implement or be part of a system that implements CDMA, TDMA, FDMA, OFDMA, SC-FDMA, and/or other wireless communication technologies. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2).

Client devices 160 and server computers 1904 provide processing, storage, and input/output devices executing application programs. Client computers 1902 can also be linked through communications network 1920 to other computing devices, including other client devices 160 and server computers 1904. In some embodiments, server computers 1915-a, 1915-b host and execute software implementing centralized persistent data storage and retrieval. The network 1920 can be a local area network and/or a wide area network that is part of a remote access network, a global network (e.g., the Internet), a worldwide collection of computers, and/or gateways that currently use respective protocols (TCP/IP, UDP, etc.) to communicate with one another. Multiple client devices 160 may each execute and operate instances of the applications accessing the deal promotion platform or system.

As described above, those of skill in the art will recognize that many of the components discussed as separate units may be combined into one unit and an individual unit may be split into several different units. Further, the various functions could be contained in one computer or distributed over several networked computers and/or devices. The identified components may be upgraded and replaced as associated technology improves and advances are made in computing technology.

Figure 20:
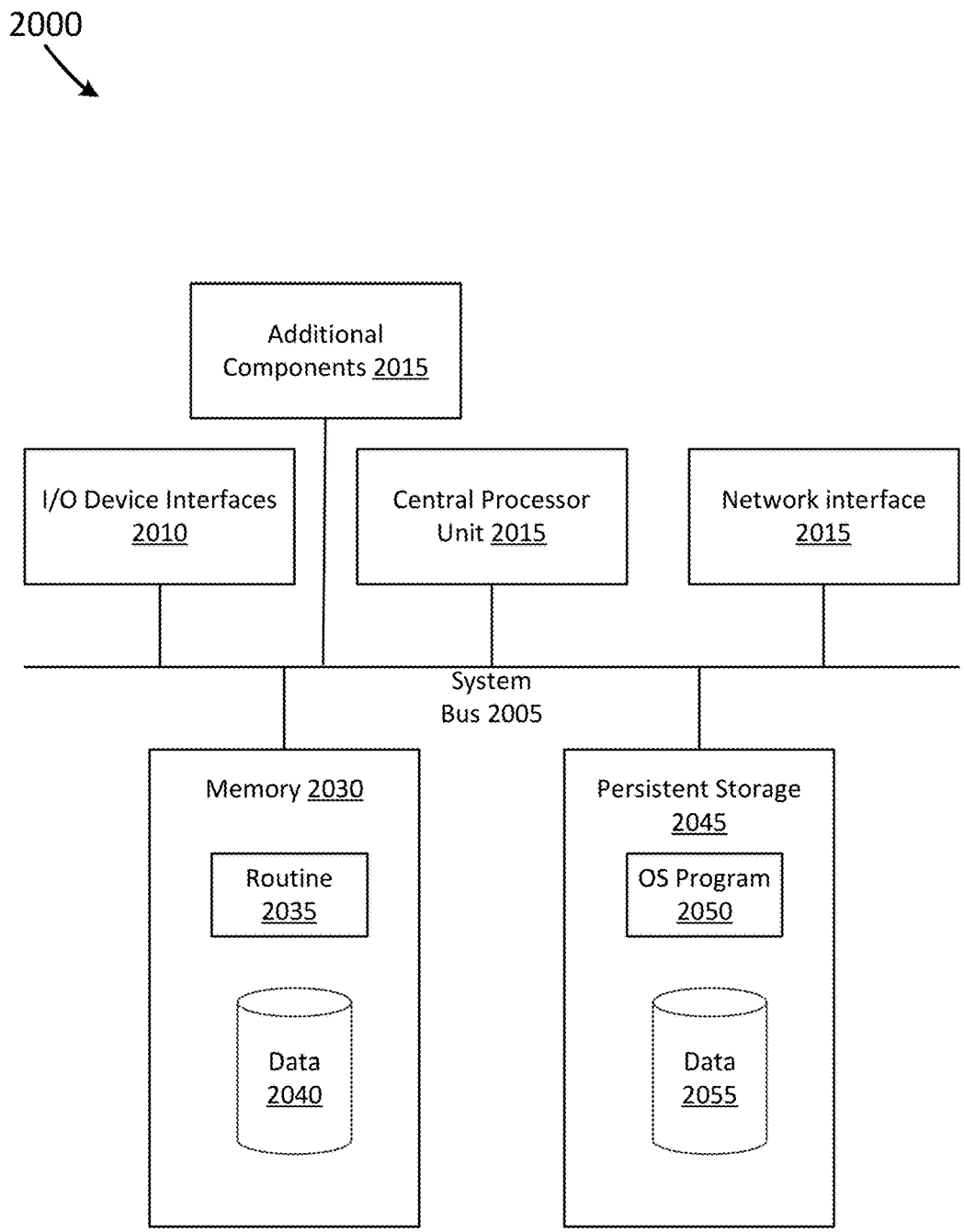
FIG. 20 illustrates a block diagram 2000 of the internal structure of a computing device in which one or more aspects of the digital media integration exchange system of FIG. 1 may be implemented, according to the principles of the disclosure.

FIG. 20 illustrates a single computing instance or node 2000, which may be or include aspects of one or more client devices 160, servers 140, encoder 110, or may support virtual resources 115. Each component of the node 2000 is connected to a system bus 2005, providing a set of hardware lines used for data transfer among the components of a computer or processing system. Also connected to the bus 2005 are additional components 2010 such as additional memory storage, digital processors, network adapters, and I/O devices. The bus 2005 is essentially a shared conduit connecting different elements of a computer system (e.g., processor, disk storage, memory, input/output ports, network ports, etc.) and enabling transfer of information between the elements. An I/O device interface 2015 is attached to system bus 2005 in order to connect various input and output devices (e.g., keyboard, mouse, touch-screens, displays, printers, speakers, etc.), for example to receive inputs into system 100. A network interface 2025 allows the computer to connect to various other devices attached to a network (e.g., system 100 of FIG. 1). A memory 2030 provides volatile storage for computer software instructions 2035 and data 2040 used to implement methods employed by the system disclosed herein. Disk or persistent storage 2045 provides non-volatile storage for computer software instructions 2050 and data 2055 used to implement an embodiment of the present disclosure. A central processor unit 2020 is also attached to system bus 2005 and provides for the execution of computer instructions.

In one embodiment, the processor routines 2035 and 2050 are a computer program product, including a computer readable medium (e.g., a removable storage medium such as one or more flash drives, DVDROM's, CD-ROM's, diskettes, tapes, etc.) that provides at least a portion of the software instructions for the system. A computer program product that combines routines 2035 and data 2040 may be installed by any suitable software installation procedure, as is well known in the art. In another embodiment, at least a portion of the software instructions may also be downloaded over a cable, communication, and/or wireless connection.

10. State Detection

Figure 21A:
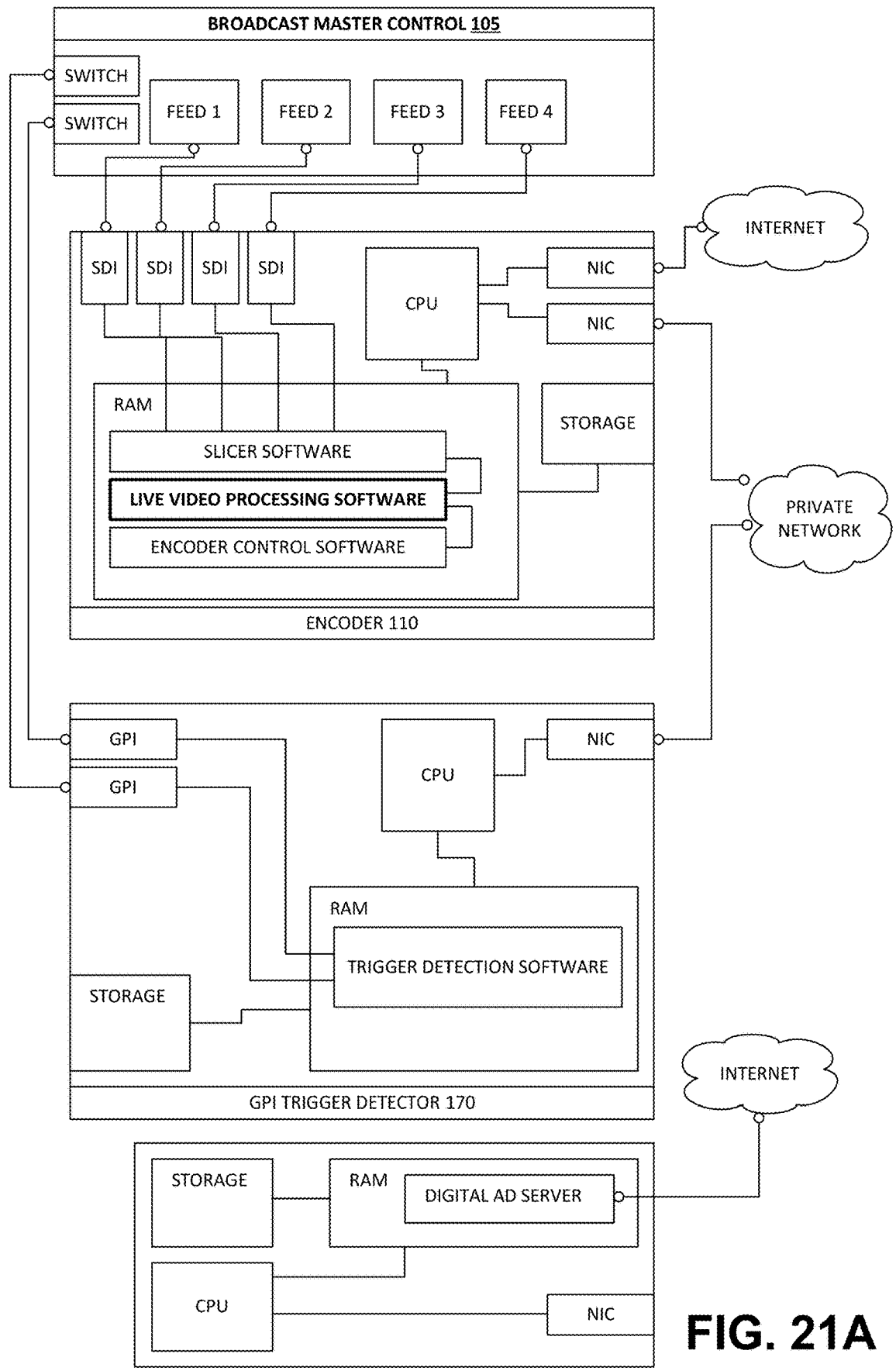
FIG. 21A illustrates one aspect of a broadcast master control according to the disclosure.

FIG. 21A illustrates the broadcast master control 105, which may receive and/or search for various content. The broadcast master control 105 may be implemented in any combination of hardware and/or software and may provide content to the encoder 110. The encoder 110 may determine characteristics about the content and may be part of a video encoding system 225 which may include slicer software, live video processing software, encoder control software, and the like. The video encoding system 225 may also include a storage unit such as memory, a processor, and RAM to store on-board software and the like. The video encoding system 225 may connect to the internet and/or a private network via a network interface controller (NIC) such as a network adapter.

The video encoding system 225 may connect to one or more SDI inputs and/or feeds for uploads and transmissions. Various feeds on the broadcast master control 105 may correspond to one or more SDI inputs. The broadcast master control 105 may also have one or more switches to connect to one or more general purpose interfaces (GPIs) on the GPI trigger detector 170.

The GPI trigger detector 170 may have a storage unit or memory, trigger detection software, RAM, one or more processors, and one or more NICs. The broadcast master control 105 may communicate, to the GPI trigger detector 170, the types of content received. A digital ad server supported by RAM may also connect to the internet to provide and receive digital advertisements which may be stored on a storage unit such as memory or a server. The digital ad server may be supported by one or more processors and one or more NICs.

Figure 21B:
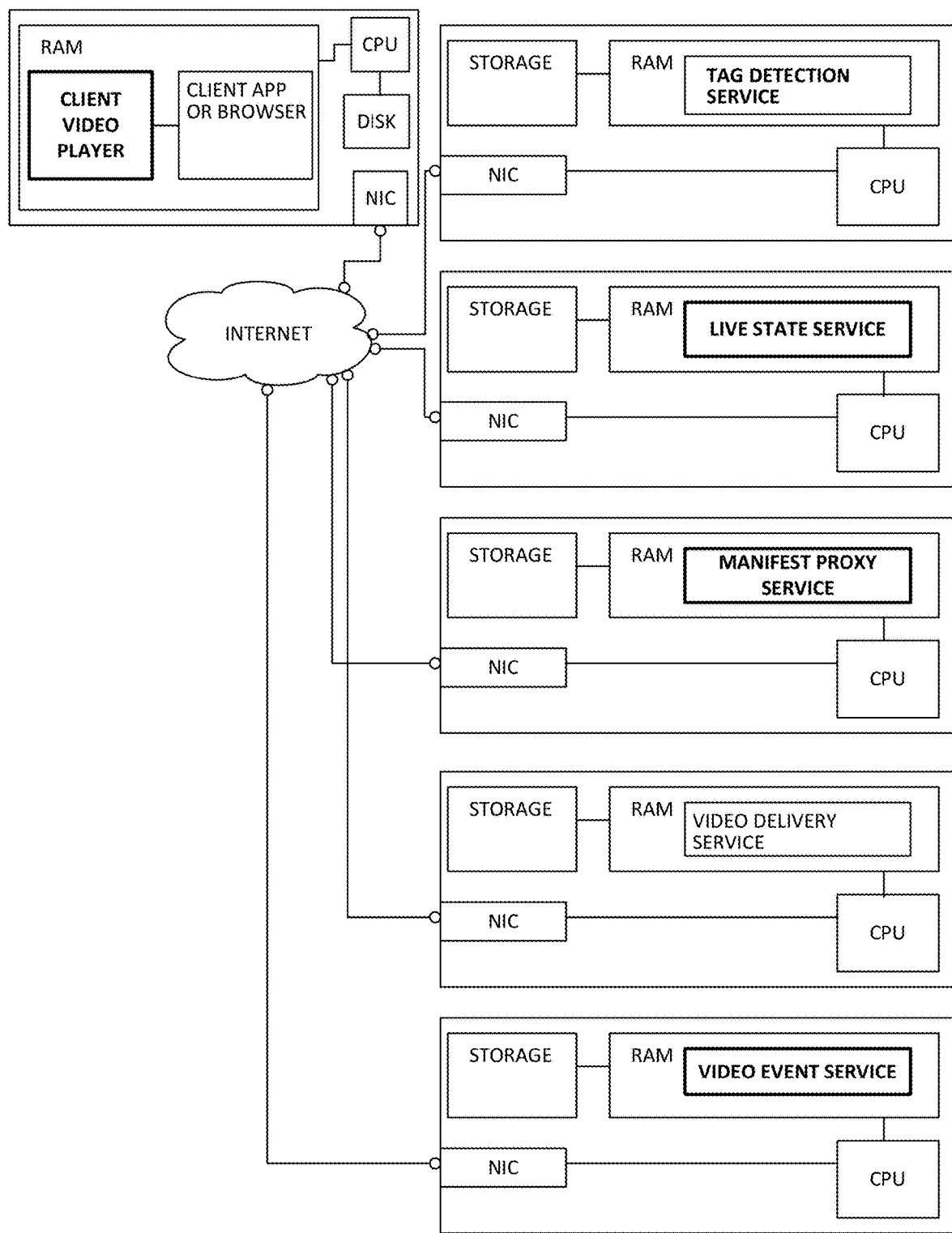
FIG. 21B illustrates one aspect of a client video player and its relationship to various services according to the disclosure.

FIG. 21B illustrates the client video player and its relationship to various services. The client video player may be supported by RAM, a client application or browser, a processor, a memory, and one or more NICs to connect to the internet.

The various services may also connect to the internet, and those various services include tag detection service, live state service, manifest proxy service, video delivery service, video event service, and the like. Each service may be supported by storage such as memory, RAM, one or more processors, and one or more NICs to connect the service to the internet. The various services may allow a user to control and manage digital rights of the content based on methods of tracking, providing proxies, controlling the delivery of content, detecting on-air programming and break states, providing encoding services, tracking and providing event data, and the like.

Figure 22:
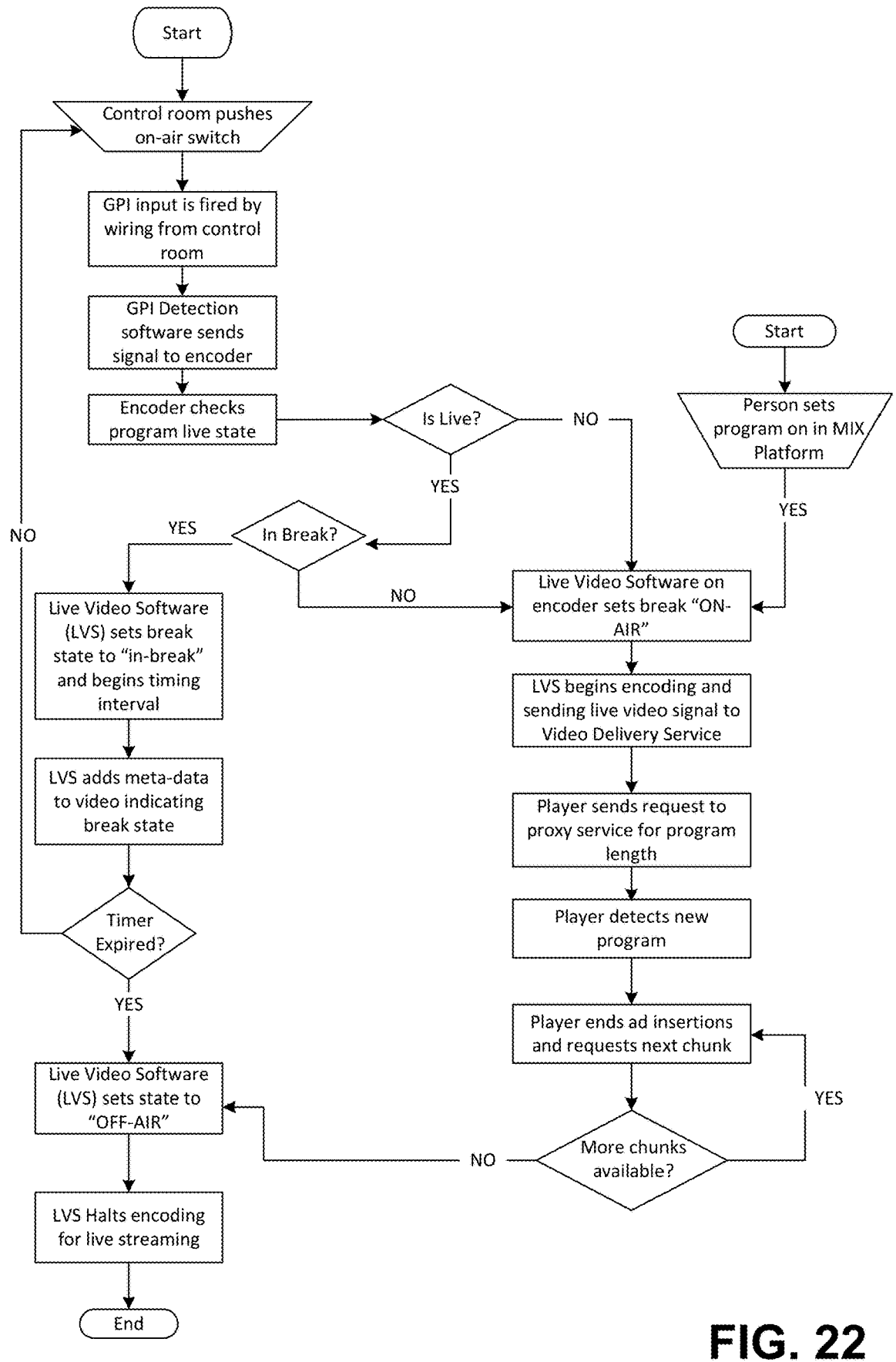
FIG. 22 illustrates one aspect of an encoding process according to the disclosure.

FIG. 22 illustrates an encoding process. The encoding process may use the services from FIG. 21B. A person may set a program in the MIX Platform 100. Once the program has been set, live video software on the encoder 110 may set a break "On Air." Live video software on the video encoding system 225 may begin encoding the video and sending live video signal to a video delivery service. A video player may send a request to the proxy service to provide the program length. The video player may then detect a new program for live stream context, and may then end ad insertions and request the next chunk. If more chunks are available, the player may continue the step of ending ad insertions and requesting the next chunk.

A control room may push an on-air switch. After the on-air switch has been pushed, a GPI input is fired by wiring from the control room. This GPI input may be alternatively fired via broadcast master control 272 automation software. The GPI trigger detection software may send a signal to the encoder 110 to check for the program live state. If the encoder 110 does not detect that the program is live, the live video software on the encoder 110 may set the break to "on-air." If the encoder 110 determines that the program is live, then the encoder 110 determines whether the live program is in a break. If the program is not in a break, the process returns to the step where the video software on the encoder 110 sets the break "on-air."

If the encoder 110 determines that the live program is in break, the live video software sets the break state to "in-break" and begins a timing interval. The live video software may accordingly add meta-data to the video to indicate the break state. If the timing interval has not expired, the process returns to the control room to push the on-air switch indicating a return to the current program. If the timing interval has expired, however, the live video software sets the state to "off-air." Likewise, if there are no more chunks available, the live video software sets the state to "off-air." Once the state has been set to off-air, the live video software halts encoding for live streaming and marks the program as completed for consumption as an VOD asset in the MIX Platform 100.

Figure 23:
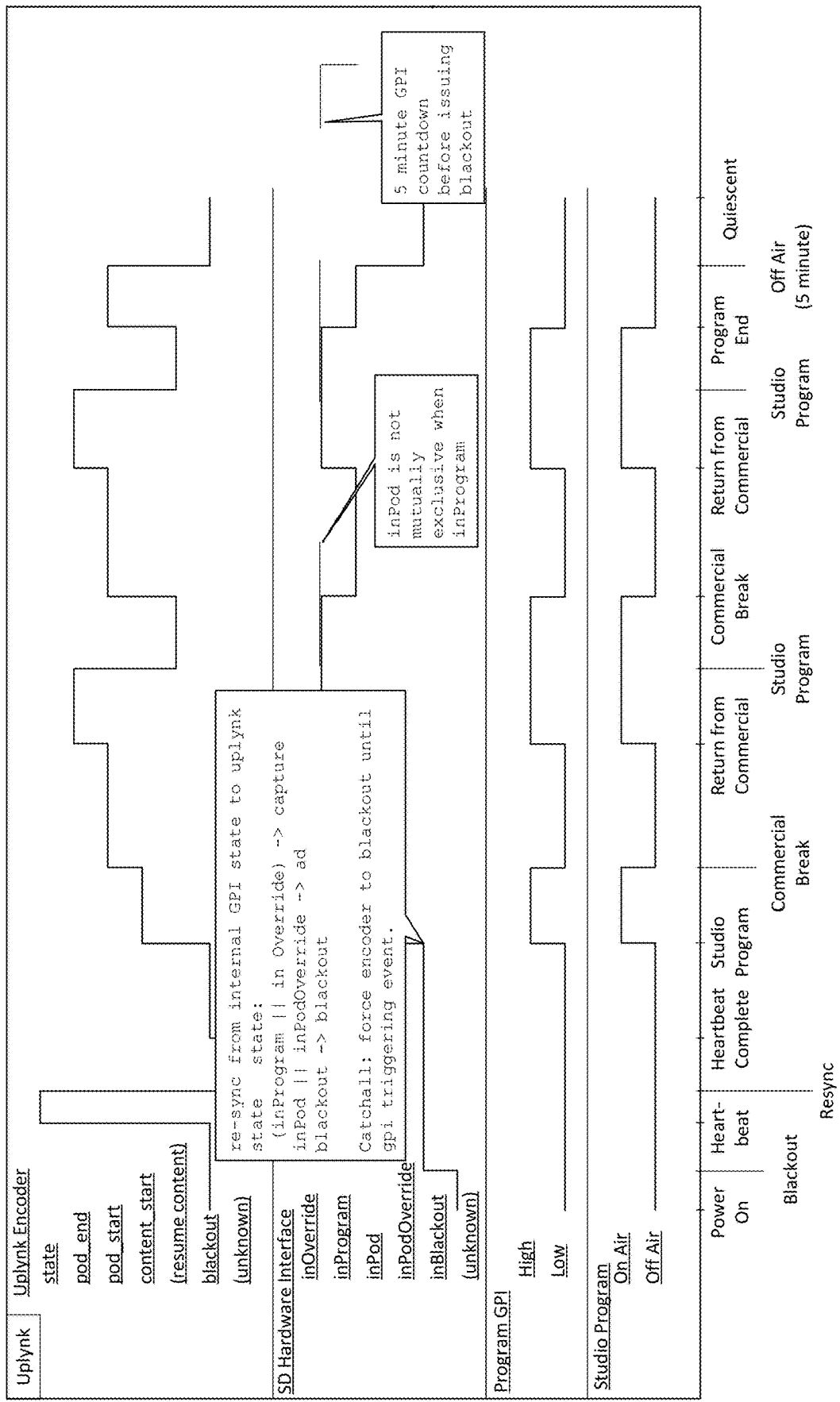
FIG. 23 illustrates diagrams of one aspect of various phases of the Uplynk, SD Hardware Interface, Program GPI, and Studio Program throughout different program stages according to the disclosure.

FIG. 23 illustrates diagrams of the various phases of the Uplynk, SD Hardware Interface, Program GPI, and Studio Program throughout different program stages. For example, Uplynk may have an Uplynk encoder with phases such as state, pod end, pod start, content start, resume content, blackout, and unknown. When the program is in the power on stage, the Uplynk may be in the blackout phase until the program reaches the heartbeat stage. When the program enters the resync stage, the Uplynk may transition to the unknown phase until the heartbeat stage is complete. At that time the Uplynk may transition to a blackout stage. When the program reaches a studio program stage, the Uplynk may transition to the content start phase. The content start phase may last until the commercial break stage of the program, when the Uplynk may begin the pod start phase. The pod start phase may last through the entire commercial break until the return from commercial stage, when the Uplynk may move to the pod end phase. After the pod end phase, when the program enters a studio program stage, the Uplynk may move to a resume content phase. Content may resume until the next commercial break stage when the pod start phase activates again until a return from commercial stage. When the program returns from commercial, the pod end phase activates again until the next studio program stage. When the program ends, the pod start phase activates before going to the blackout phase when the program goes off air.

The SD Hardware Interface may have an inOverride phase, an inProgram phase, an inPod phase, an inPodOverride phase, an inBlackout phase, an unknown phase, and the like. The SD Hardware may begin in the inBlackout phase until a studio program stage begins. Then the SD Hardware may activate the inProgram phase until a commercial break stage. During the commercial break, the inPod phase may begin until a return from commercial stage, when the inProgram phase may activate again. The inPod phase, however, is not necessarily mutually exclusive during an inProgram phase. When the program ends, the inPod phase may activate until the off air stage, when the SD Hardware Interface may transition to the inBlackout phase.

The Program GPI may have a high and a low state and may begin in the low state until a studio program stage. When in the studio program stage, the Program GPI may move to a high state until a commercial break, when the Program GPI moves to the low state. When the program returns from commercials, the Program GPI moves back to the high state. When the program ends, the Program GPI moves back to the low state.

The Studio Program may have on On Air state and an Off Air state. The Studio Program may begin in the Off Air state until, for example, a studio program stage begins. The Studio Program may be On Air during a studio program stage, and may go Off Air during commercials and when the program ends.

Figure 24:
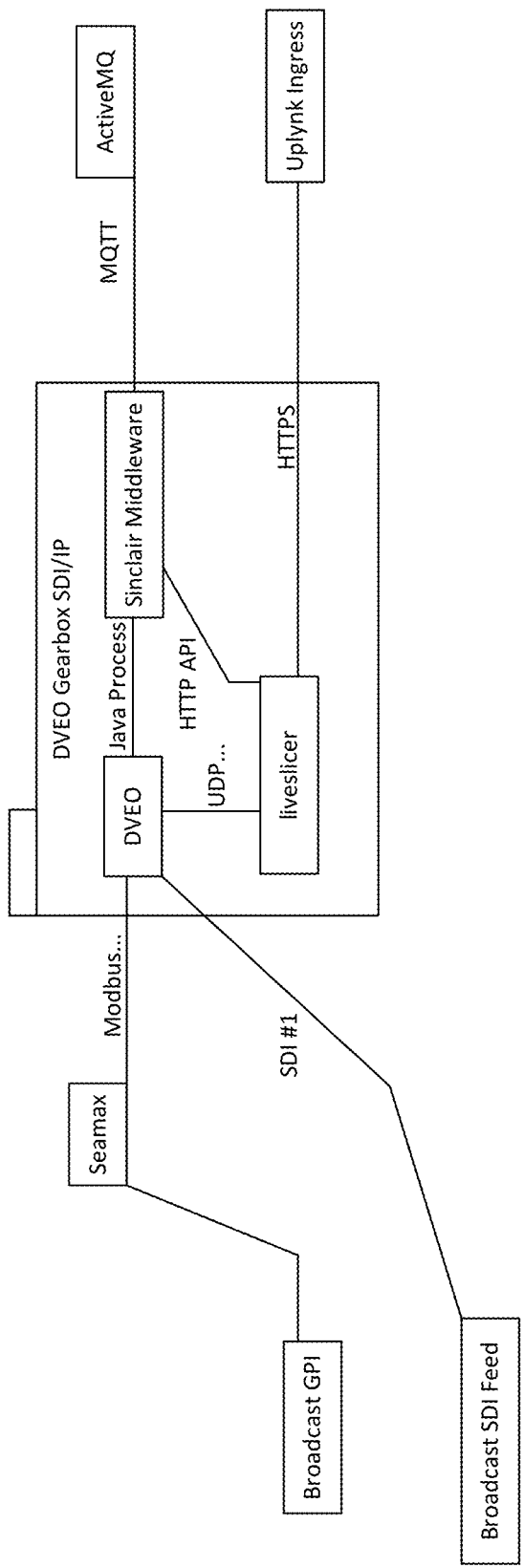
FIG. 24 illustrates interaction between a DVEO gearbox and other broadcast components according to the disclosure.

FIG. 24 illustrates interaction between a DVEO gearbox and other broadcast components. The Broadcast GPI may, for example, communicate through a Seamax API, which may communicate with a communications protocol such as Modbus to the DVEO gearbox. The Broadcast SDI feed may also communicate to the DVEO gearbox via SDI.

As referenced herein, the DVEO gearbox is a product of Computer Modules Inc., San Diego Calif. The DVEO gearbox or its equivalent may be implemented in various aspects of the disclosure. The DVEO gearbox may operate as a real time adaptive bitrate streaming transcoder, streamer and integrated RF receiver. The system receives simultaneous satellite, IP, SDI, HD-SDI, and terrestrial RF signals, transcodes them to H.264 or other format, and streams them to any number of IP devices—including standard IP capable set-top boxes, streaming video, TV's, smart phones, iPads, or software clients such as VLC or MPlayer.

The DVEO gearbox may include software such as liveslicer to capture content from a live signal and send it to the encoder 110. The DVEO gearbox may also have middleware which may communicate with the software via, for example, an HTTP API. The middleware may communicate with the DVEO of the gearbox via a Java process or the like, and the DVEO may communicate with the software via a protocol such as user datagram protocol (UDP). The software may communicate via HTTPS with an Uplynk Ingress. The middleware may communicate with a message broker such as ActiveMQ via a messaging protocol such as MQTT.

Figure 25:
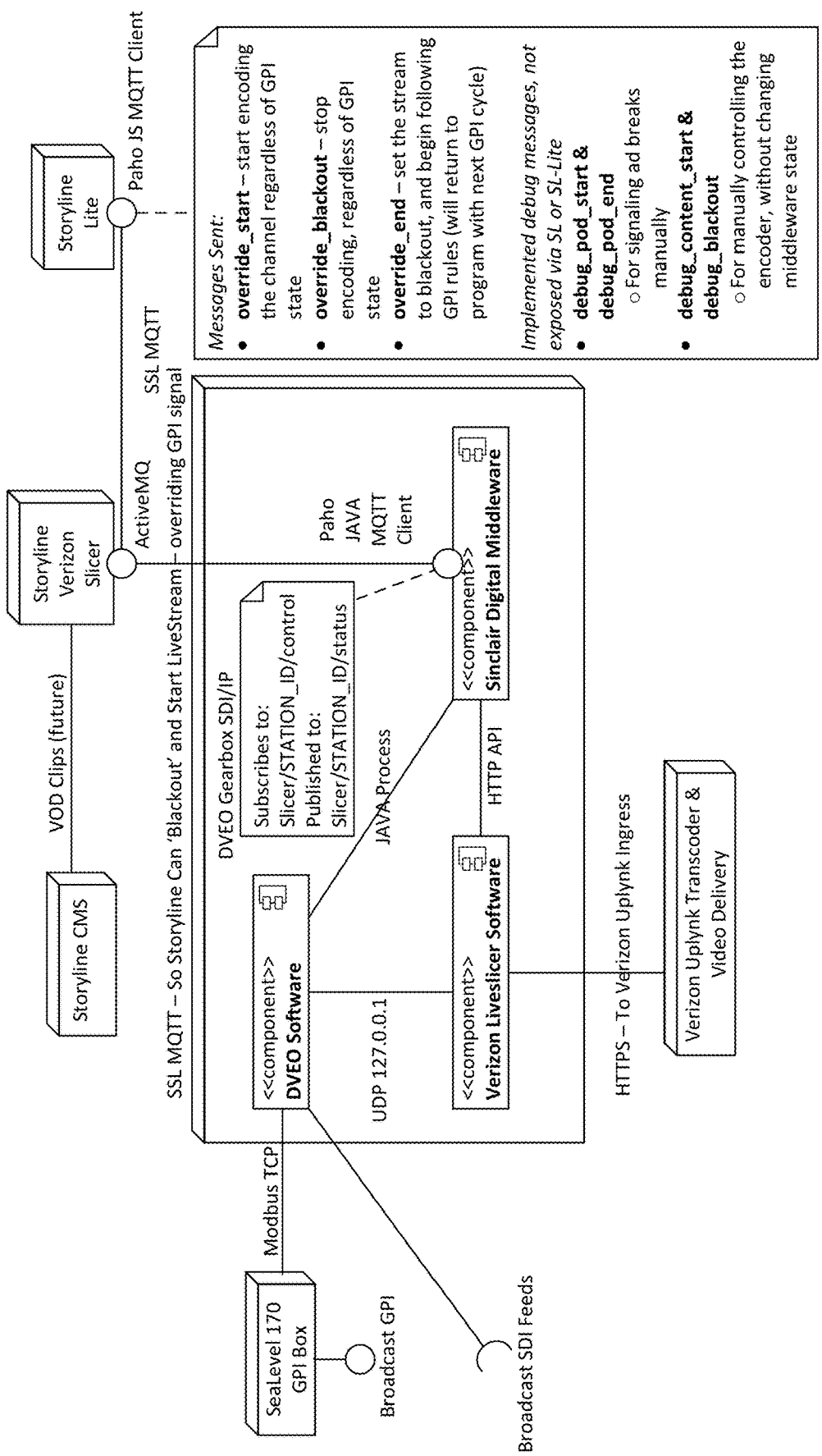
FIG. 25 illustrates more detailed interaction between a DVEO gearbox and other broadcast components.
Figure 26A:
FIGS. 26A through 26I illustrate an example sequence diagram for break state detection and ad flexing implemented in conjunction with a mobile device.
Figure 26B:
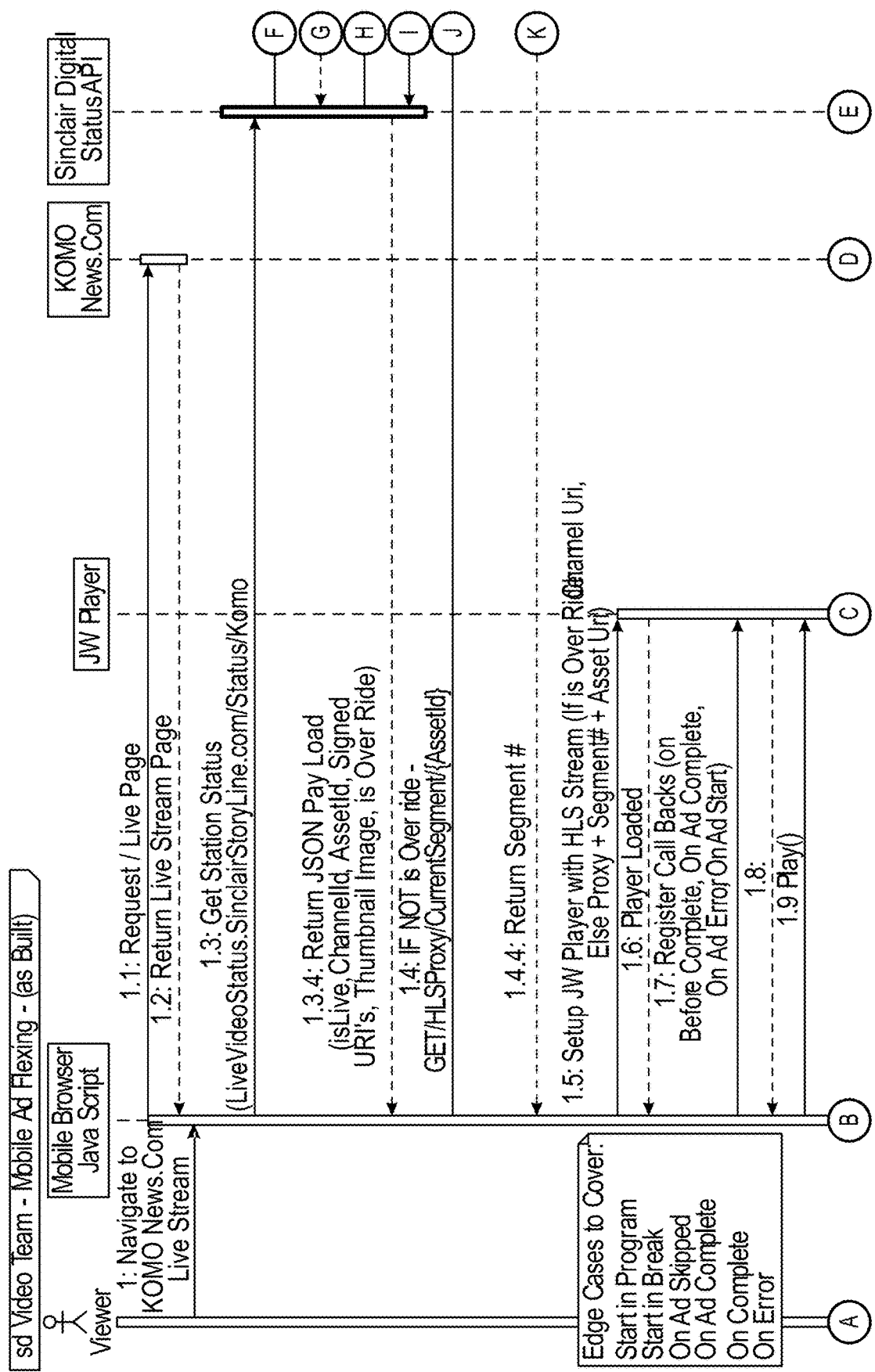
Figure 26C:
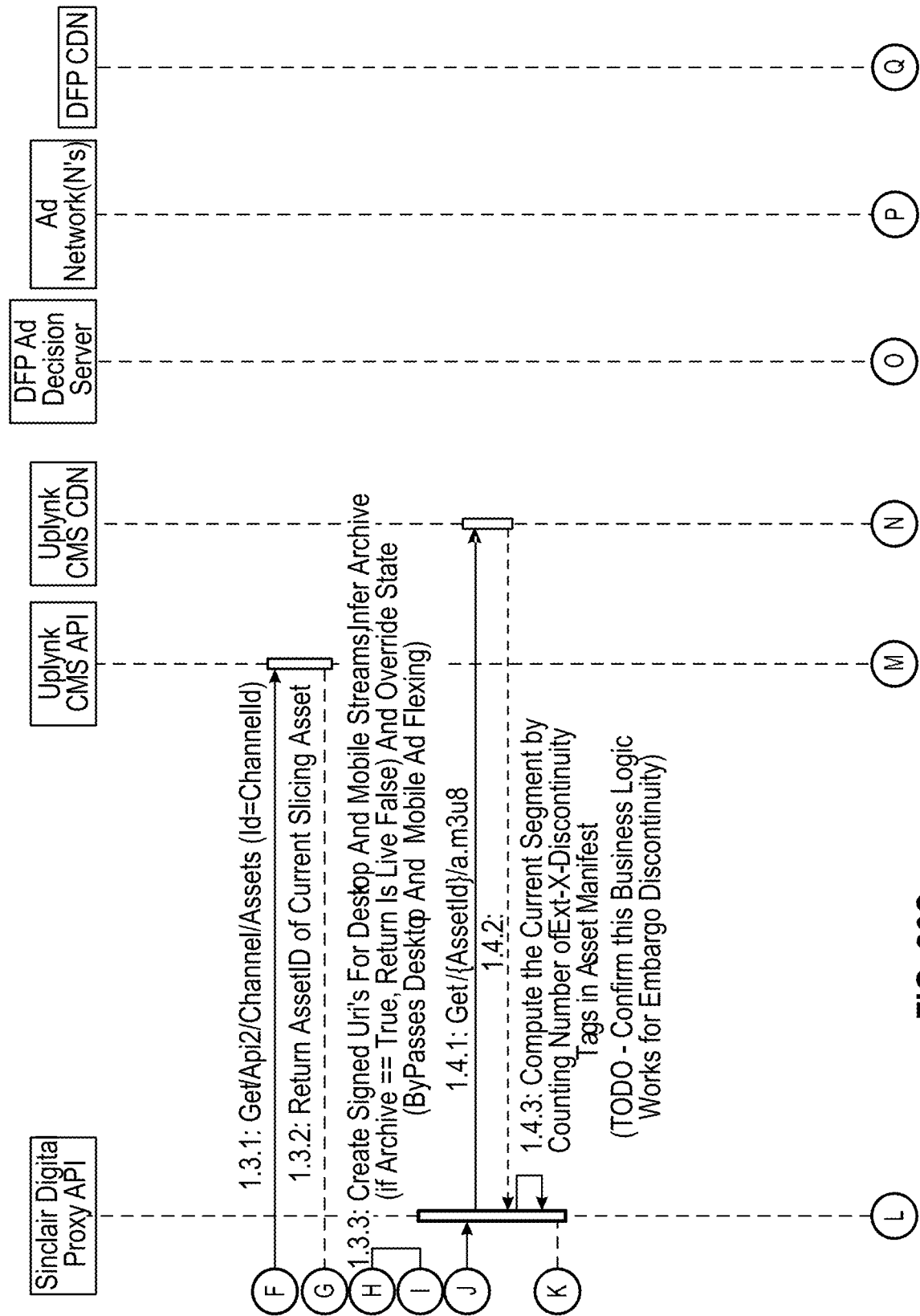
Figure 26D:
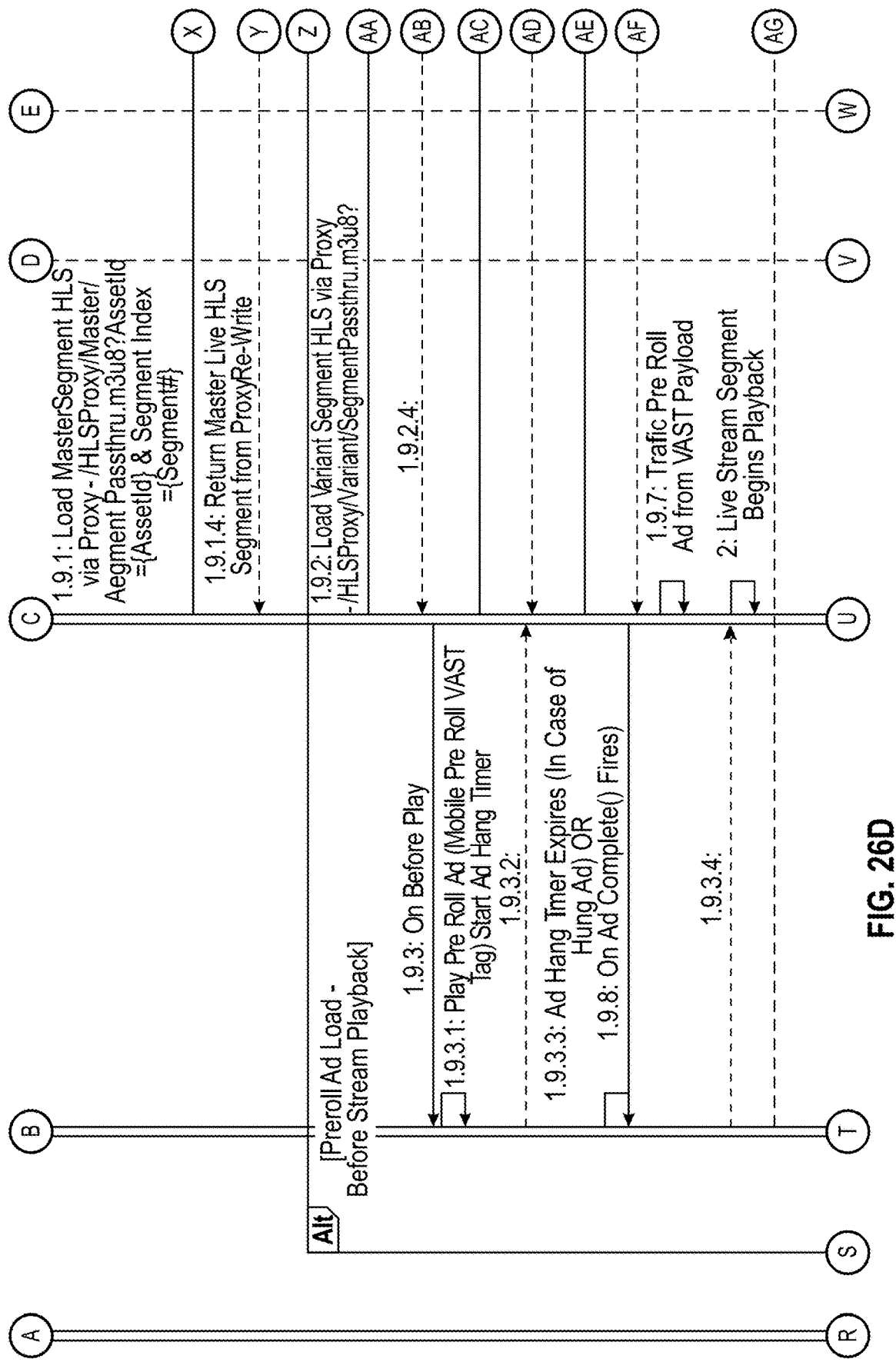
Figure 26E:
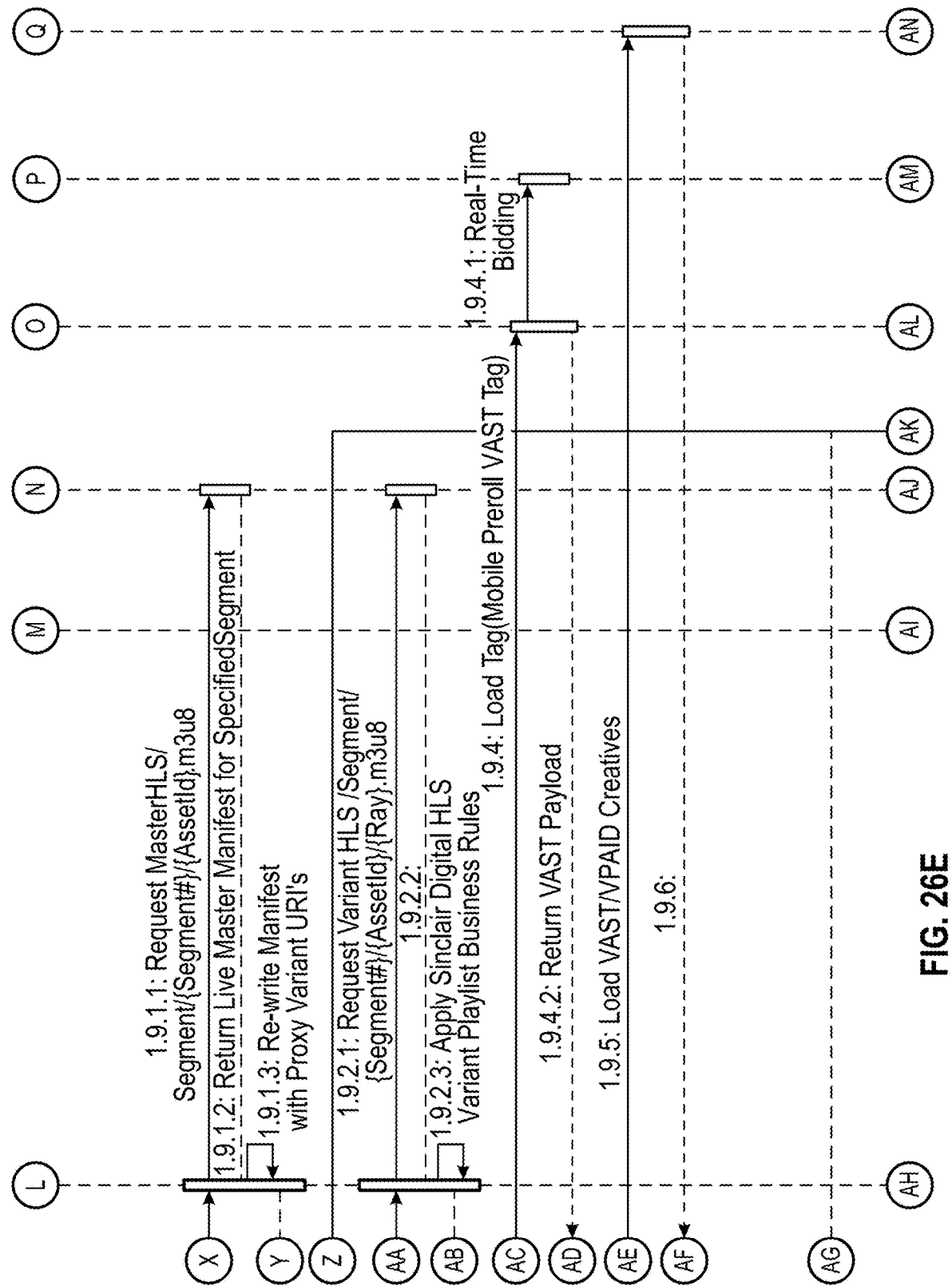
Figure 26F:
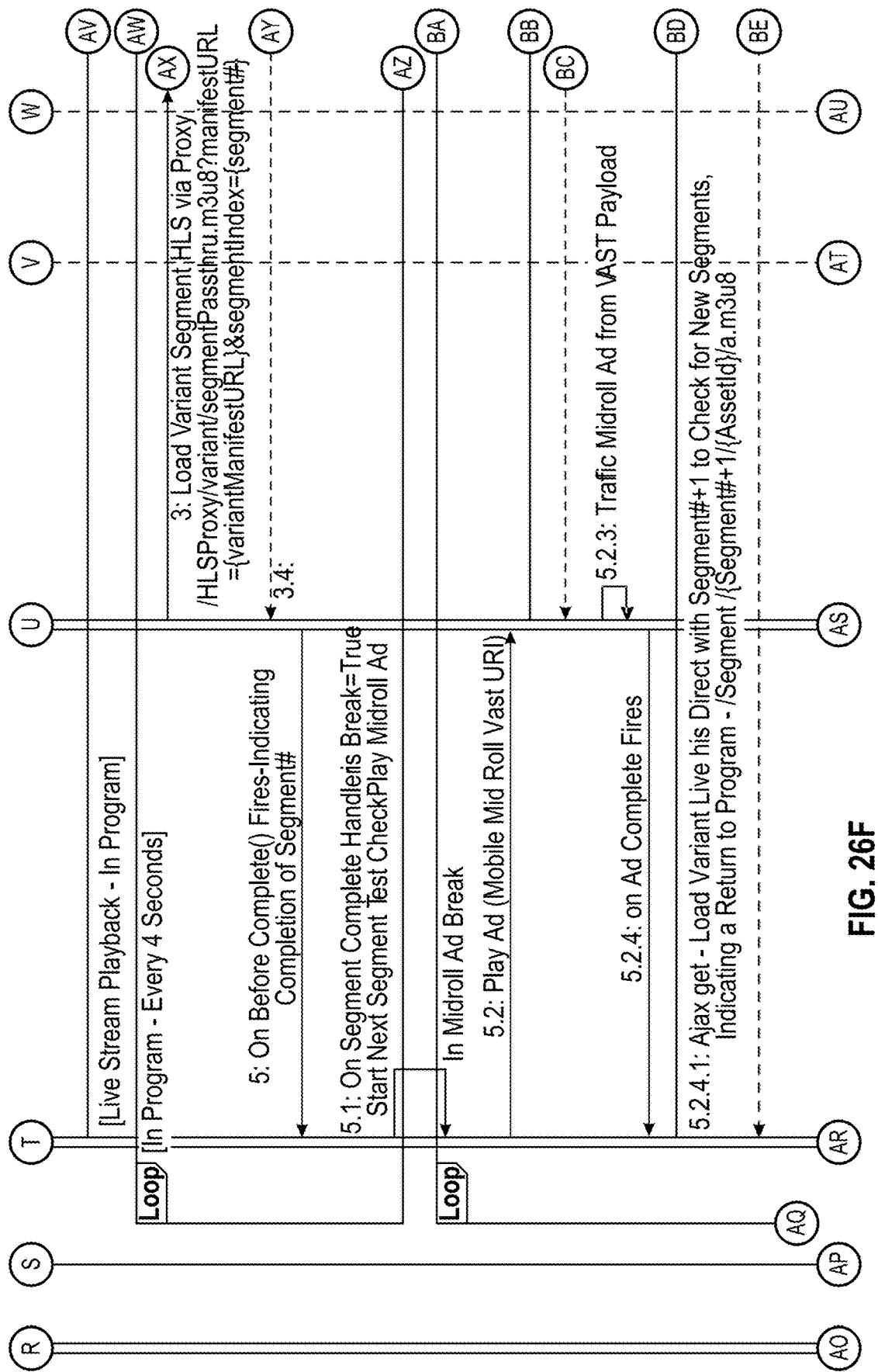
Figure 26G:
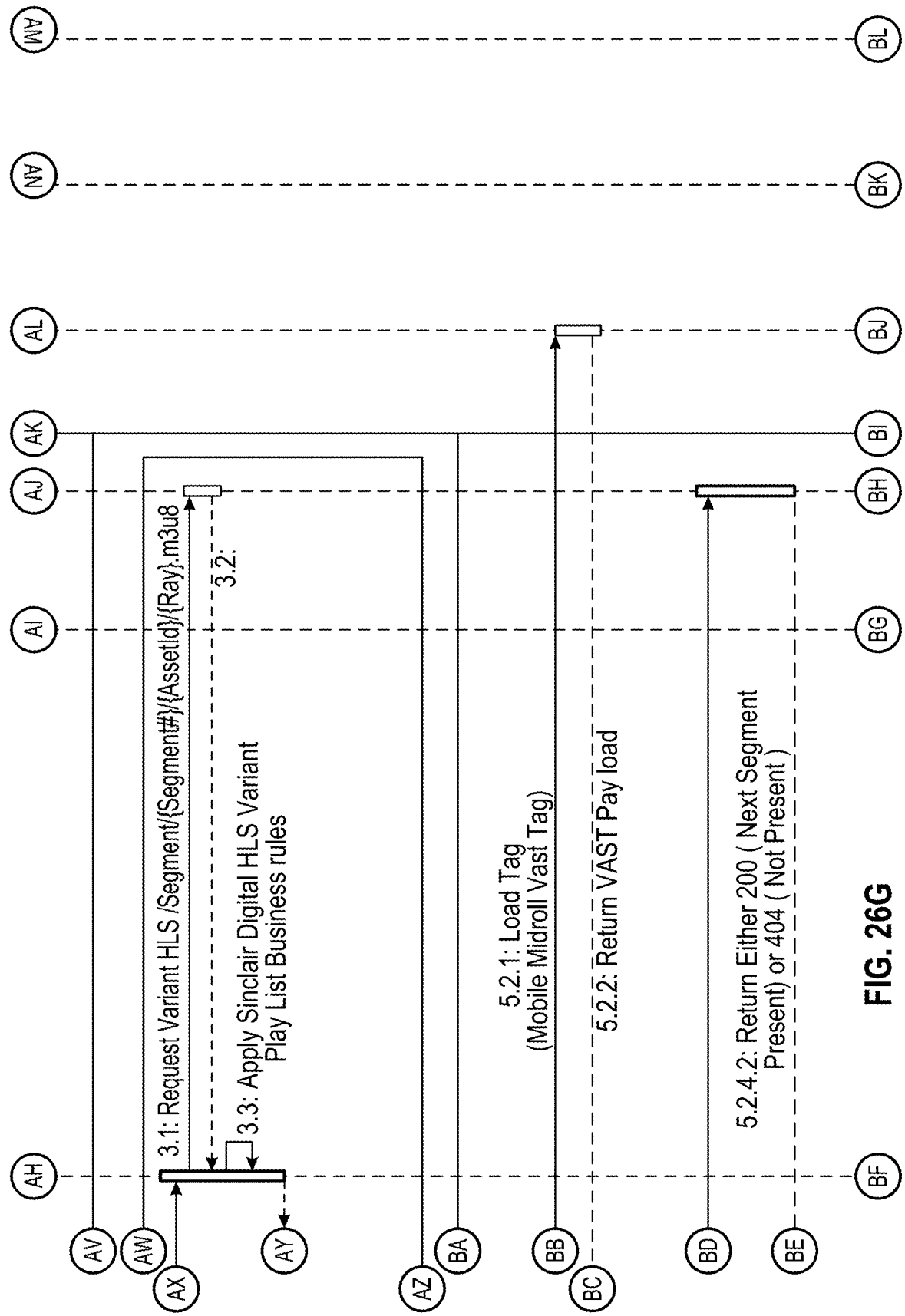
Figure 26H:
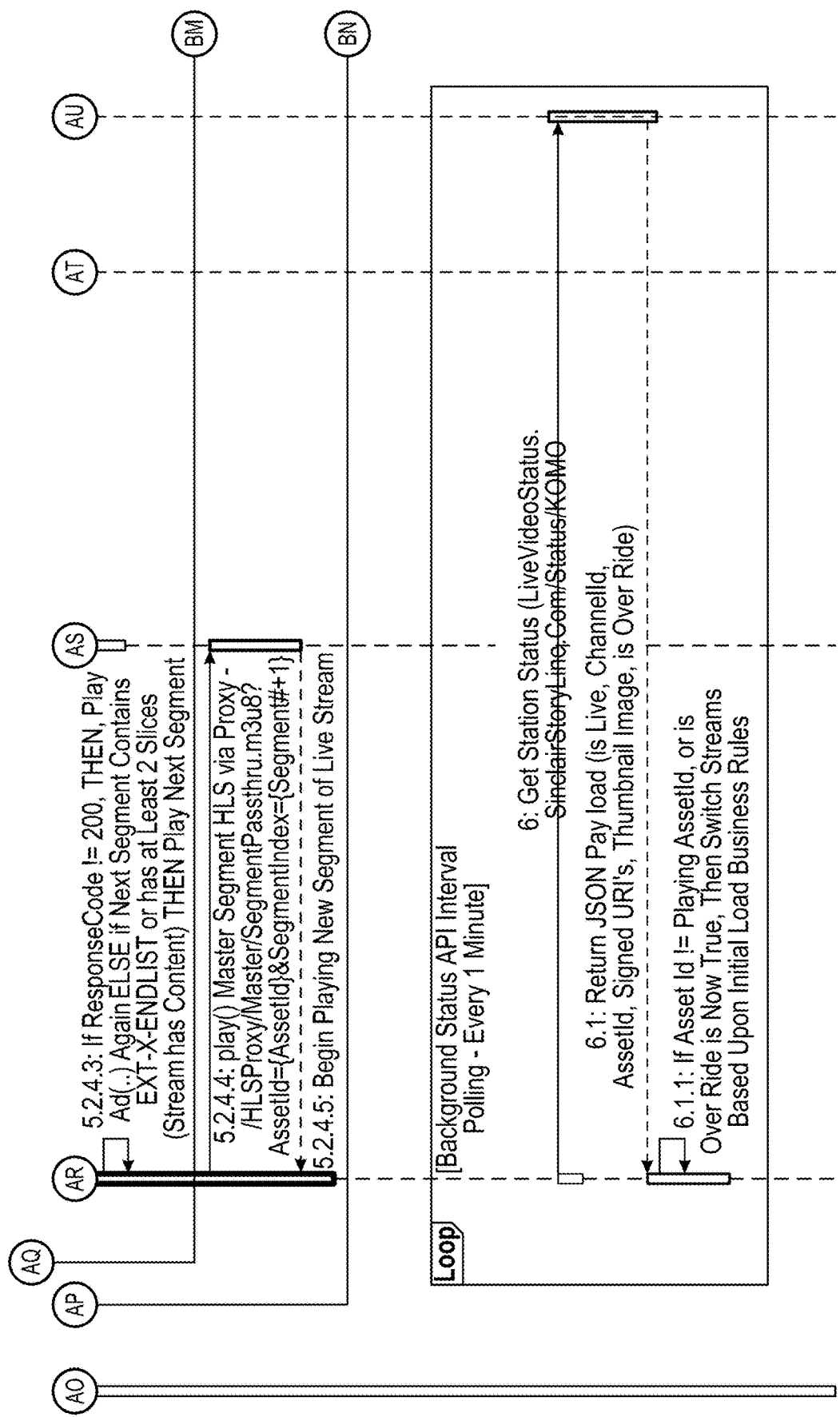
Figure 26I:
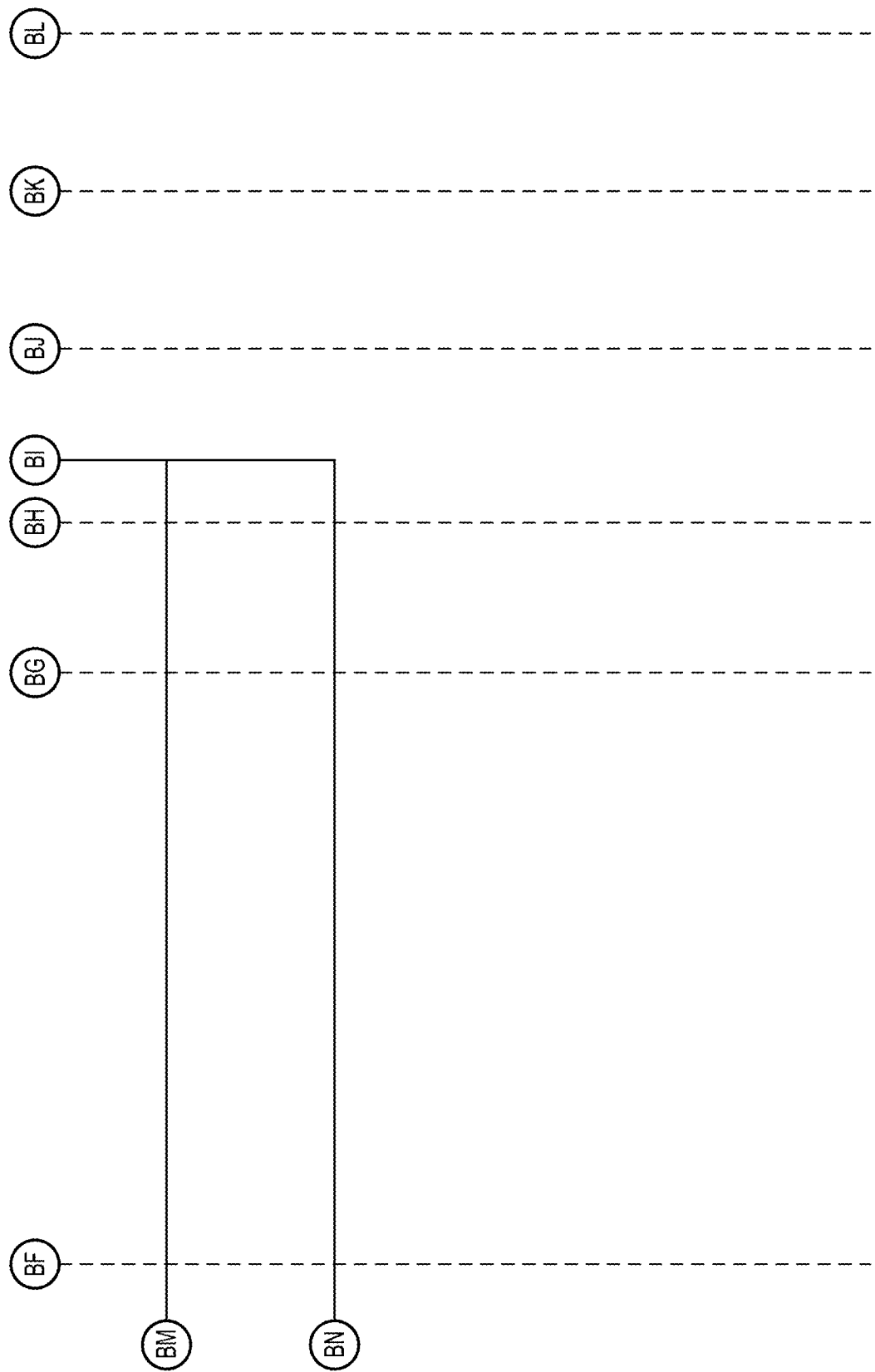
Figure 27B:
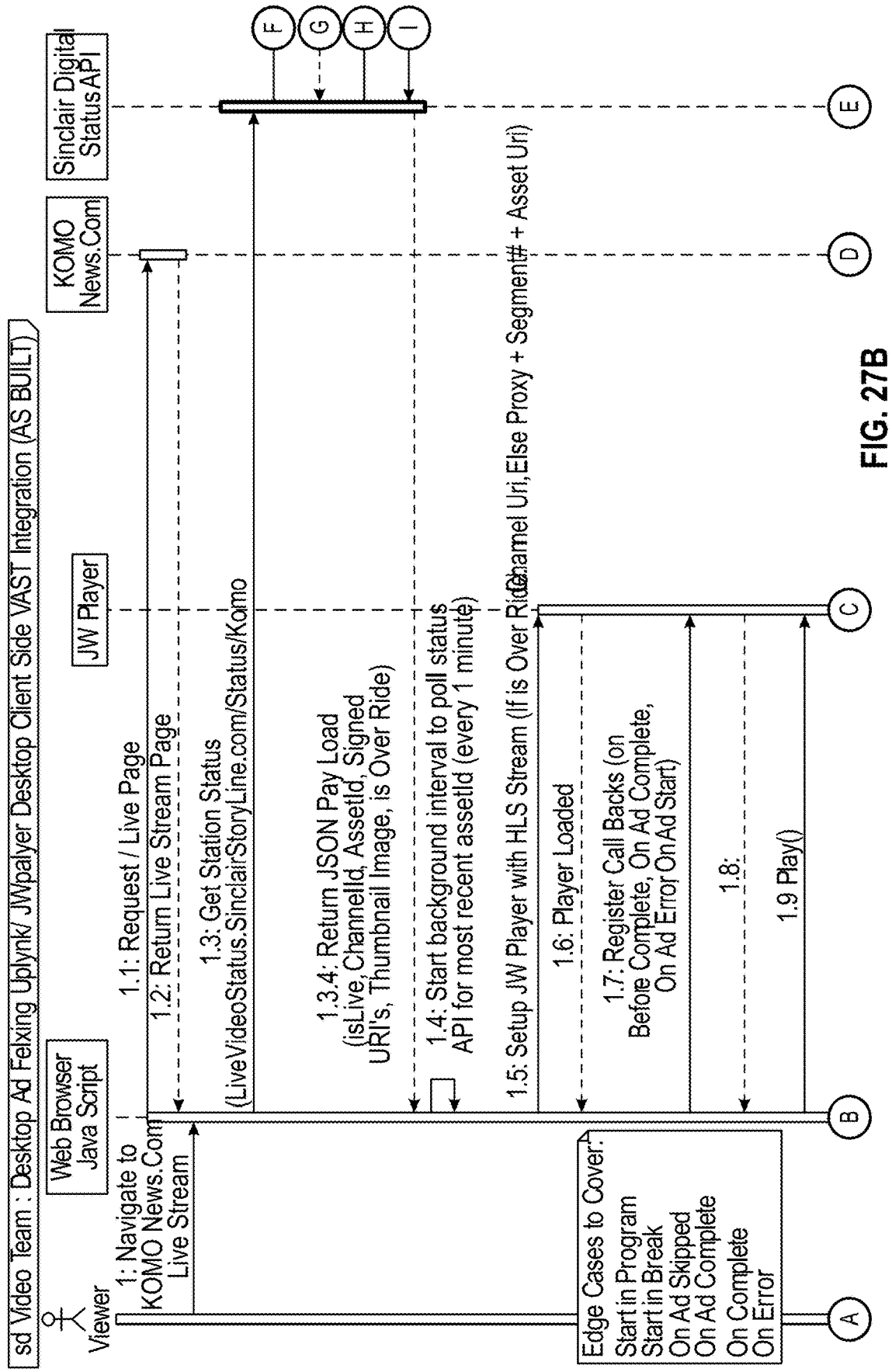
Figure 27C:
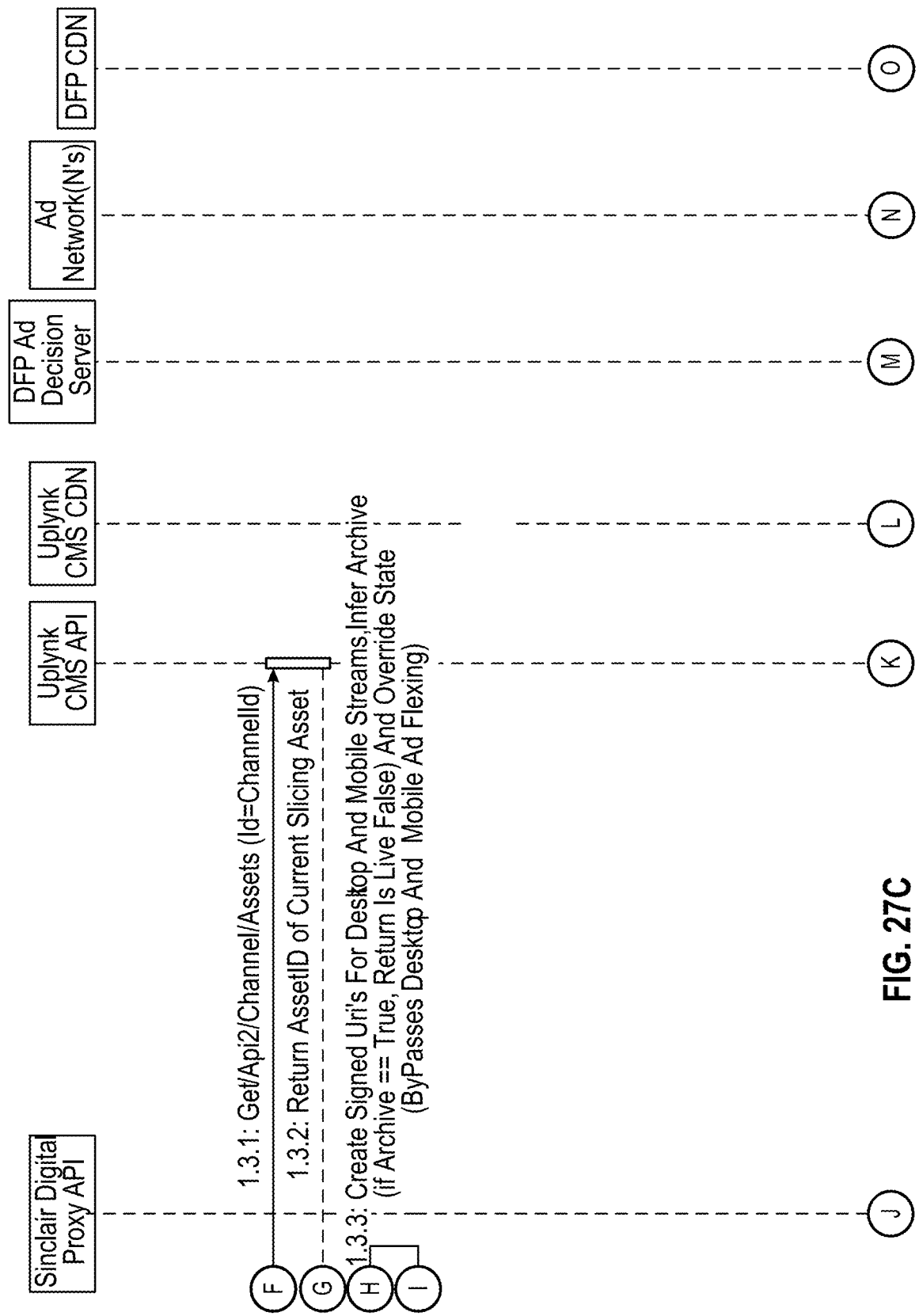
Figure 27D:
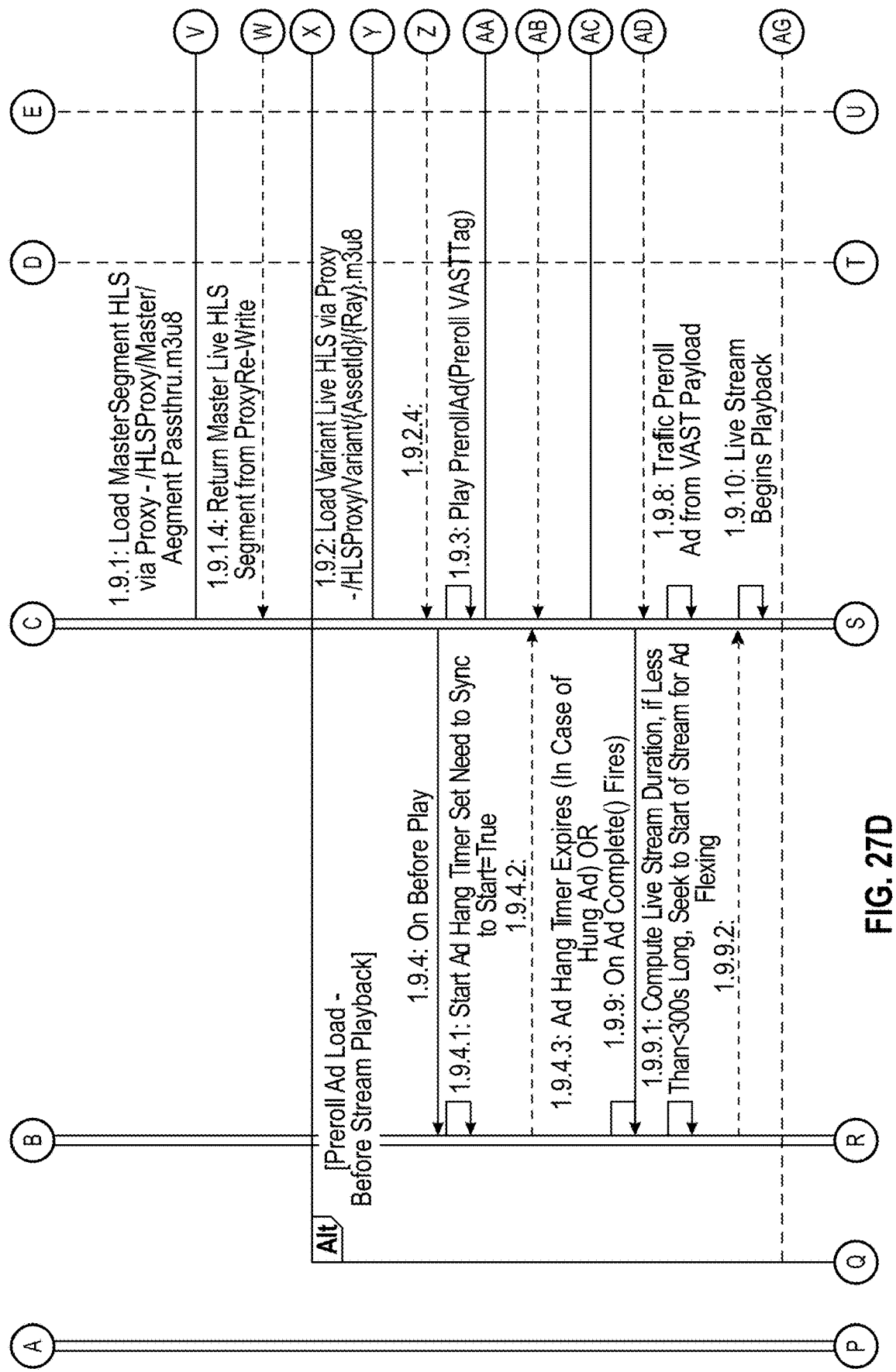
Figure 27E:
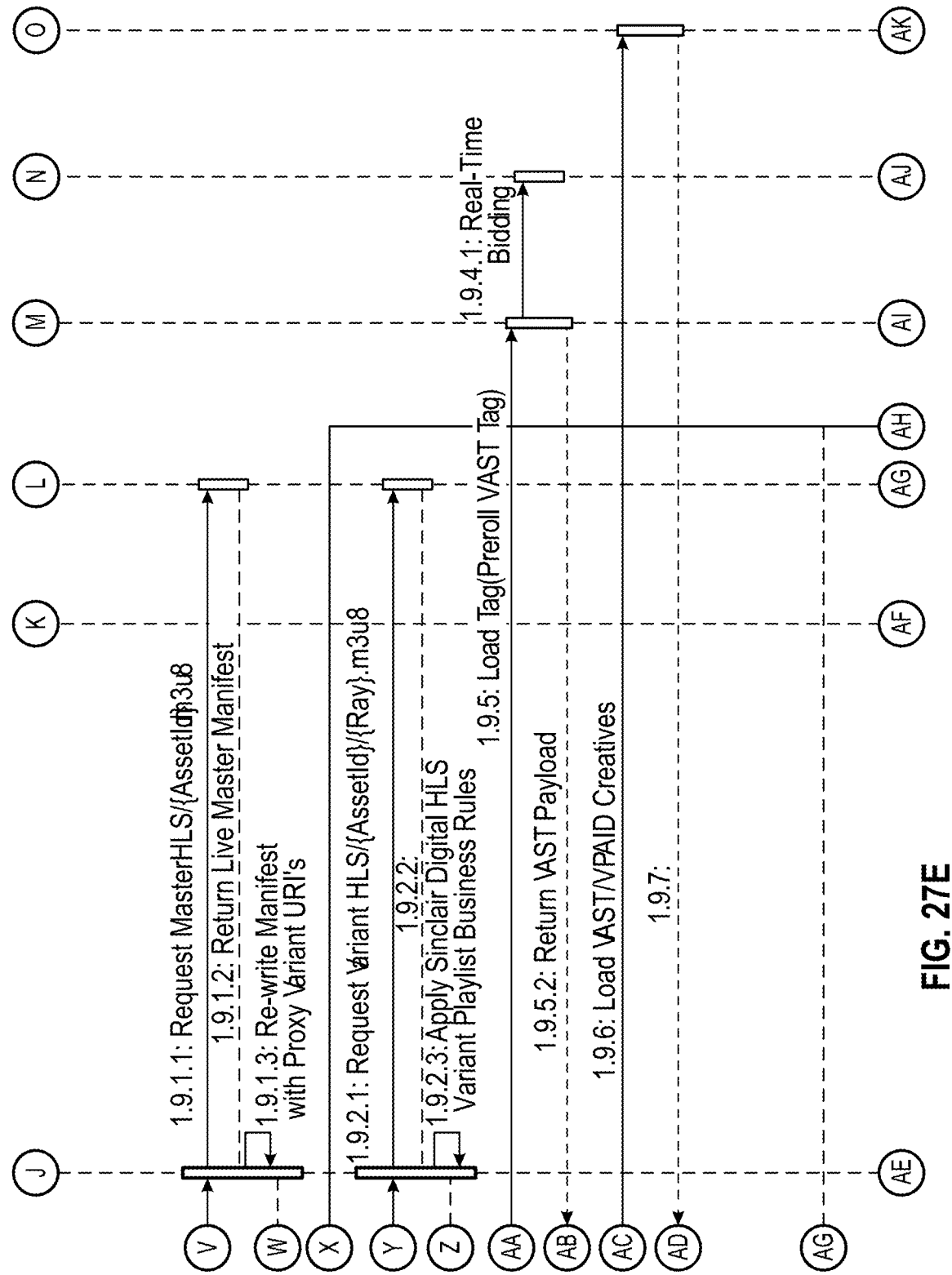
Figure 27F:
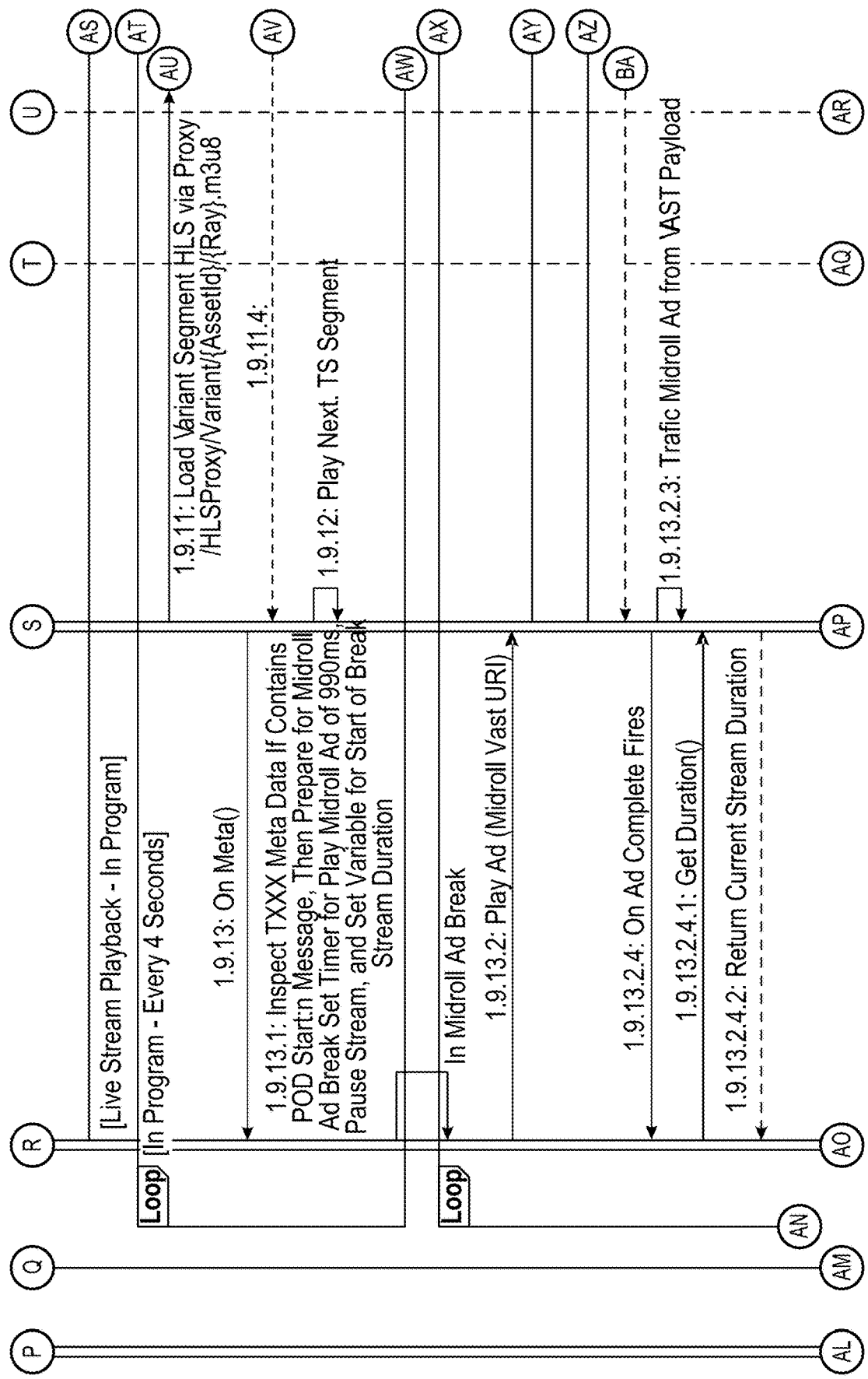
Figure 27H:
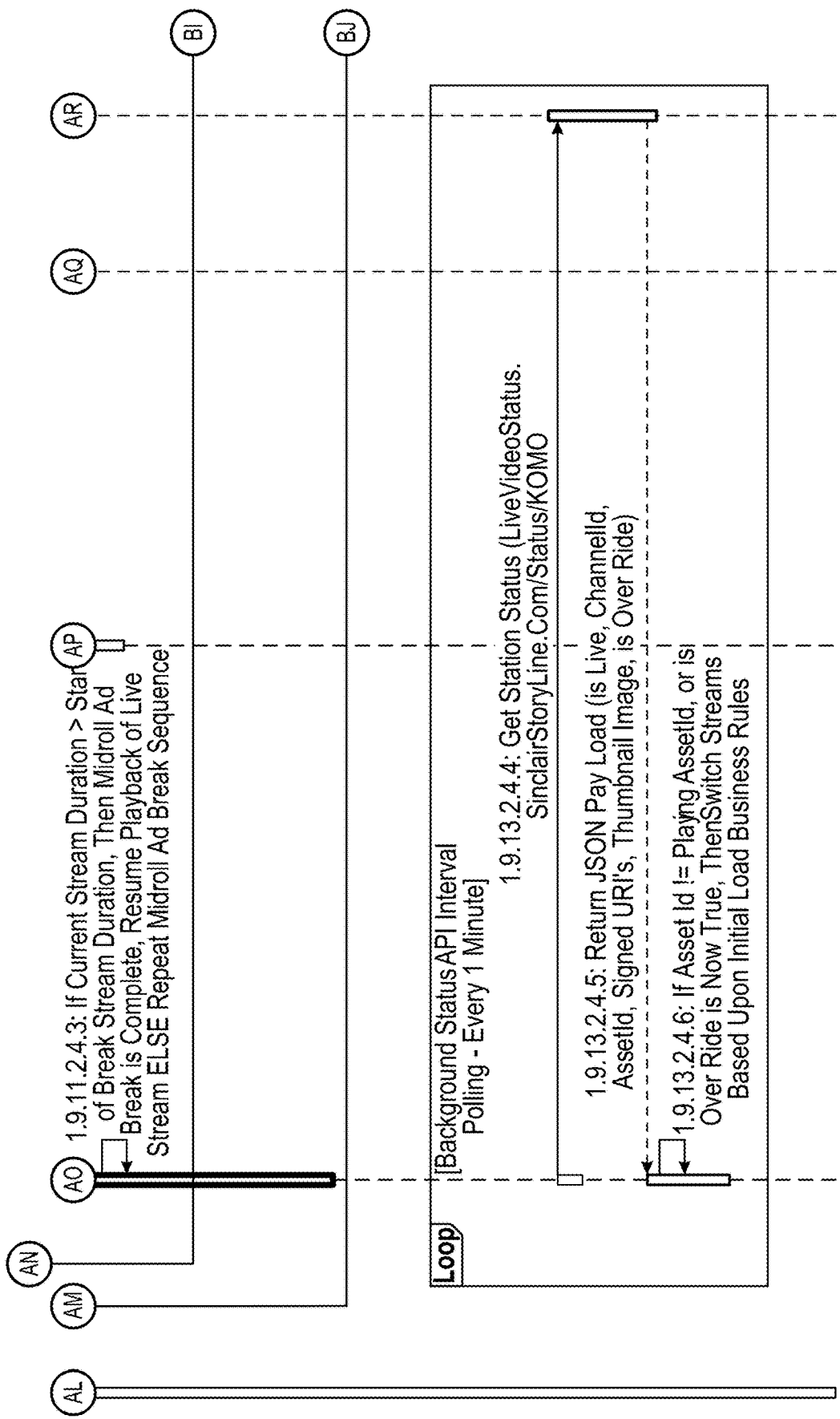
Figure 27I:
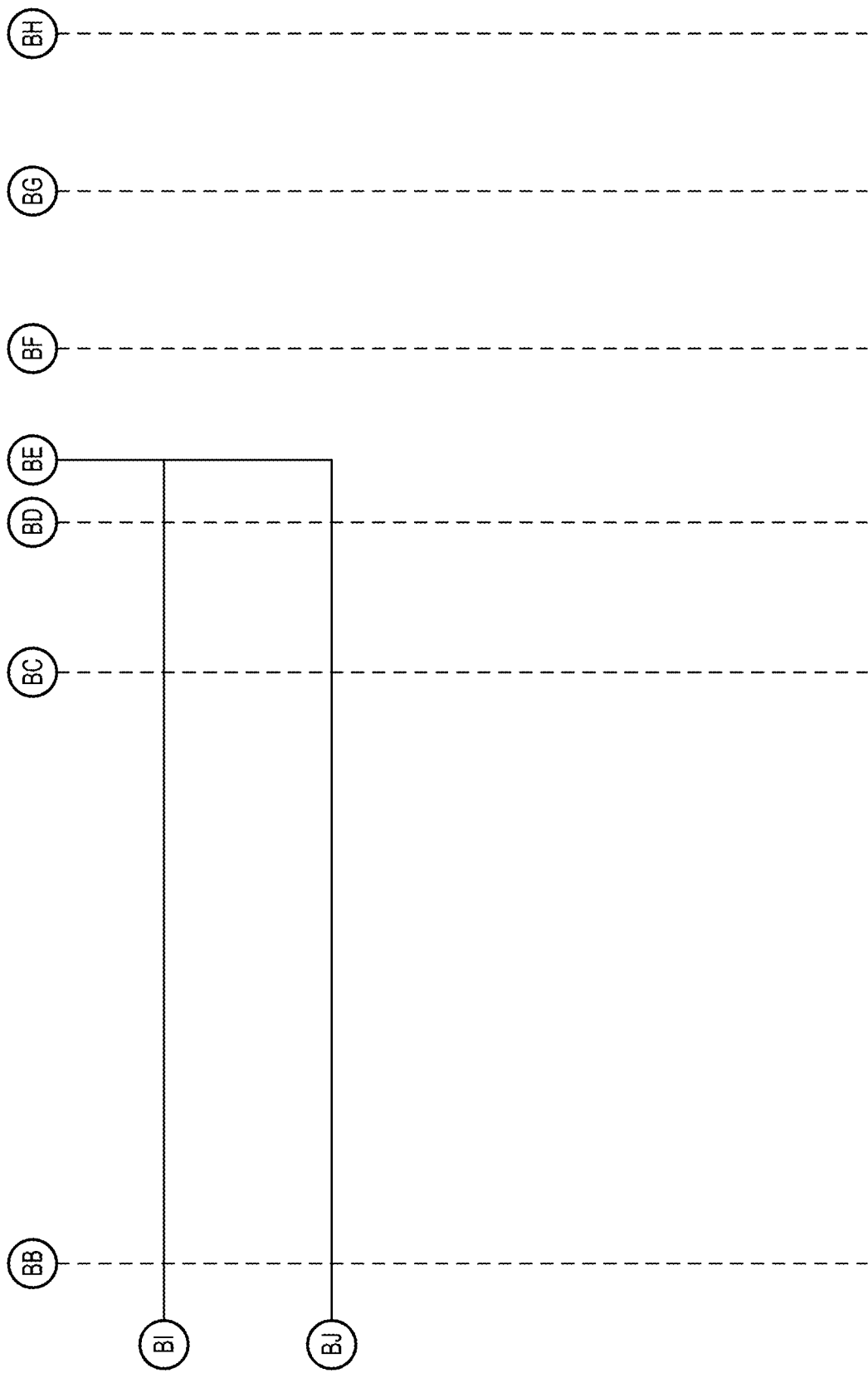

FIG. 25 illustrates more detailed interaction between a DVEO gearbox and other broadcast components. The Broadcast GPI may communicate through a SeaLevel 170 GPI Box, which may communicate via, for example, Modbus TCP to DVEO software on the DVEO gearbox. The DVEO software may also communicate with the Broadcast SDI Feeds. The DVEO software may communicate via, for example, UDP protocol, with software such as Liveslicer and via, for example, Java, with middleware on the DVEO gearbox. The Middleware and Liveslicer software may communicate via HTTP API. The Liveslicer software may communicate with a Verizon Uplynk transcoder and Video Delivery via HTTPS.

The middleware may communicate with a Storyline Verizon Slicer software via Paho, Java, MQTT, client protocol, or the like. The Storyline Verizon Slicer may use ActiveMQ software and may communicate with Storyline Lite software and Storyline CMS, which may transmit Video On Demand Clips. Storyline Lite may use a Paho JS MQTT client, and may use a message protocol for encoding.

State detection, such as break state detection, may be used, in some cases, to insert secondary content into a stream of primary content, during or concurrently with a break in the primary content. A system for detecting break state boundaries in a live video stream is described herein, in which a client player may insert dynamic digital content insertions, without knowing the duration of the corresponding break in the primary content. The system is designed to use in-band signaling initiating the start of an content break, called a midroll content or ad break. The live video stream is paused at the beginning of a midroll ad break. This midroll ad break is then trafficked third party or other content, such as VAST or VPAID advertisements, for the duration of the ad break. The player may then detect, via in or out of band signaling, when the ad break is complete and allow the currently playing advertisement to continue. The live video stream will then resume playback cleanly, at the resumption of the breakstate, therefore "flexing" the live video stream to provide a seamless audience experience.

In some aspects, when switching back to streaming of primary content from playing time-sensitive content, the client device may first switch to playing secondary content before resuming streaming of the primary content. In some aspects, the secondary content may include content that is selected for a specific user of the user device, for example, based on browser history, or other metadata associated with the user and/or client device.

FIGS. 26A through 26I illustrate an example sequence diagram for break state detection/ad flexing implemented in conjunction with a mobile device. In one aspect, the process/sequence diagram may include one or more of the following operations. Mobile ad flexing is designed to operate on ad break segment boundaries. Unlike the desktop ad flexing which can flex at any point in the stream, the Mobile ad flexing may only flex on ad segment break boundaries, due to limited streaming support on HTML5-base players.

At operation 1, a viewer may navigate to KOMONews.com Live stream or other live stream. At operation 1.1, the web browser requests/live streams a page from a CDN. The CDN may return a rendition of the property for a mobile device at operation 1.2. Next, javascript or other code component on or associated with the live stream page may load a status endpoint for the digital properties channel at operation 1.3. The status endpoint may call the Uplynk CMS or other CMS API to query for a named channel's assets at operation 1.3.1. A list of assets may be returned to the Status API at operation 1.3.2. Storyline Live Video Status Status API: a live stream payload consisting of an isLive flag, signed URI's are created for desktop and mobile streams, including isOverride state (which bypasses ad flexing), or checking for archive metadata, which will result in an empty response, at operation 1.3.3. Next, Payload of the Live Video Status endpoint is returned in JSON format or other format at operation 1.3.4

If the stream is not in override (e.g inOverride: false), the most current segment of the stream may be requested based upon ad break state via Live Video Proxy API at /HLSProxy/currentSegment/{assetId}, at operation 1.4. The proxy may request the 'a' variant manifest from the CDN and the supplied asset id. at operation 1.4.1. The CDN may return the 'a' variant manifest at operation 1.4.2, and the proxy may compute the number of segments in the video, computed by counting the number of breaks (e.g. EXT-X-DISCONTINUITY) in the manifest, at operation 1.4.3. The current segment index (e.g. 17) may be returned to the browsers javascript at operation 1.4.4.

Next, the player is configured with the appropriate stream (e.g. if in override, use the channel stream, otherwise, use the assetId+segment for playback), at operation 1.5. The Player setup may complete at operation 1.6. Callbacks may be registered from the browser to the player, indicating segment completion or any error conditions, at operation 1.7, and Callback registration may complete at operation 1.8.

Next, the viewer may press play to begin playback of the stream aty operation 1.9. The player may then request a master manifest of the asset with the supplied current segment in theq reust, at operation 1.9.1. The Proxy API requests the master playlist, pre-segmented by the CD, at operation 1.9.1.1. The CDN returns the segment of the master playlist at operation 1.9.1.2, and the Proxy API rewrites the master segment playlist with appropriate business rules (or other content distribution rules) for the resource, at operation 1.9.1.3. The Master Live HLS segment playlist is returned to the player at operation 1.9.1.4.

The variant segment playlist is then loaded from the Proxy API (reloaded every 4-8 seconds, for example, if the segment is currently streaming, reloaded only once if the current segment is completed encoding), at operation 1.9.2. The variant segment playlist is then requested from the CDN, at operation 1.9.2.1, and the Variant segment playlist is returned from the CDN at operation 1.9.2.2. The Proxy API applies any business or other rules for the variant playlist for mobile ad flexing, at operation 1.9.2.3, and the variant playlist is returned to the player at operation 1.9.2.4. The onBeforePlay callback may be fired to the mobile browser javascript at operation 1.9.3. The mobile browser javascript may in some cases, invokes a playPrerollAd with a mobile preroll tag, an ad hang timer is started (e.g., 15 s seconds as a watchdog timer to ensure a preroll will not hang the player), at operation 1.9.3.1, and onBeforePlay may be returned at operation 1.9.3.2.

On the player, loadTag may be called to load a VAST preroll call from the ad decision server, at operation 1.9.4, and VAST/VPAID creatives or other secondary content are requested from the mobile client player at operation 1.9.5. Creatives may then be returned to the mobile client player at operation 1.9.6. The preroll ad may be trafficked to the mobile client player at operation 1.9.7., and the nAdComplete fires to the javascript at operation 1.9.8. It should be appreciated that the preroll add break may be implemented in some implementations and not others, such as when content is immediately ready for consumption.

Next, at operation 2, live stream segment playback begins on the player. The player may load the variant playlist stream from the Proxy (reloaded every 4-8 seconds via the player, for example), new segments will be appended to the end of this stream until the stream is completed with an EXT-X-ENDLIST tag, at operation 3. The next .TS segment may be played in the player at operation 4, and onBeforeComplete( ) may fire when the player reaches the end of the manifest and the manifest contains an #EXT-X-ENDLIST tag indicating completion of segment from the CDN, at operation 5.

Next, at operation 5.1, javascript state may be set to inBreak, and a background check for the next segment's manifest is begun (out-of-band signaling). Operation 5.2, may including looping until exit of midroll ad break, at which point a midroll ad or other content may be played. An Ad decision server may be called t operation 5.2.1, a midroll ad or other content may be trafficked at operation 5.2.3, and onAdComplete is fired at operation 5.2.4. Next, the next segment may be loaded and tested if the next segment is available on the horizon at operation 5.2.4.1. CDN may return either 200 for next segment is available (midroll ad break is completed), OR 404 (not found) or other numbers or messages, at operation 5.2.4.2 If the responseCode is 200 AND the segment contains more than 2 slices of video Or the next segment is complete by the presence of an #EXT-X-ENDLIST tag, then play the next segment of video at operation 5.2.4.3 (see 5.2.4.4). Otherwise, if the responseCode is 404, then continue to playAd, indicating the ad break is not yet complete. At operation 5.2.4.4, the next master playlist via HLS proxy may be played with new segmentId.

In some cases, the above process may include Background Status API polling, which may further include the Status API endpoint being invoked every minute or other time period to check for any change in underlying stream or override state, at operation 1.1.1.1.1.1. The Status API may return state information in a JSON payload at operation 1.1.1.1.1.2, and the javascript may check for a different assetId, or override state at operation 1.1.1.1.1.3. If this does not match the current live stream players parameters, then the stream playback is switched to these new parameters and the sequence begins from 1.9 (play).

FIGS. 27A through 27I illustrate an example sequence diagram for break state detection/ad flexing implemented in conjunction with a client device, such as a desktop computer, laptop, or other resource rich computing device. In one aspect, the process/ sequence diagram may include one or more of the following operations.

At operation 1, a viewer may navigate to KOMONews-.com Live stream or other live stream to launch/ a desktop web browser to the live news stream of a digital property may launch in response to one or more selections. At operation 1.1, the web browser requests/live streams a page from a CDN. The CDN may return a rendition of the property for a digital property at operation 1.2. Next, javascript or other code component on or associated with the live stream page may load a status endpoint for the digital properties channel at operation 1.3. The status endpoint may call the Uplynk CMS or other CMS API to query for a named channel's assets at operation 1.3.1. A list of assets may be returned to the Status API at operation 1.3.2. Storyline Live Video Status Status API: a live stream payload consisting of an isLive flag, signed URI' s are created for desktop and mobile streams, including isOverride state (which bypasses ad flexing), or checking for archive metadata, which will result in an empty response, at operation 1.3.3. Next, Payload of the Live Video Status endpoint is returned in JSON format or other format at operation 1.3.4.

Next, a background task is started to poll the status api (out-of-band signaling) for most recent asset/override state at operation 1.4. The player is instantiated in the web browser with the proper stream information (asset or channel uri's), and preroll vast tag parameters at operation 1.5. A call back from the player is fired to the javascript indicating the player is loaded at operation 1.6. Additional callbacks are registered on the player for event state detection at operation 1.7., and returned at at operation 1.8

The player is next instructed to begin playing the stream at operation 1.9. The master live HLS playlist is loaded via the Sinclair Storyline proxy at operation 1.9.1. The storyline proxy makes a request to the CDN for the master manifest at operation 1.9.1.1, and the master manifest is returned at operation 1.9.1.2. Storyline Proxy API re-writes URI's in the playlist for variant streams at operation 1.9.1.3. The master live HLS playlist is returned to the player at operation 1.9.1.4.

Next, at operation 1.9.2., the player loads the appropriate variant playlist based upon bitrate via the Sinclair Proxy API, and the Proxy API loads the appropriate variant playlist from the CDN at operation 1.9.2.1. The CDN returns the variant playlist at operation 1.9.2.2, and the Sinclair Proxy API applies necessary business logic and modifications for the variant playlist to support ad flexing at operation 1.9.2.3. The variant playlist may then be returned to the player at operation 1.9.2.4.

At operation 1.9.3., in some cases, playPrerollAdmay be executed, such that a preroll advertisement is trafficked before playing the live stream. oneforePlay callback is then fired from player to javascript at operation 1.9.4. Timeout detection for preroll ad begins a 15 s or other length watchdog timer at operation 1.9.4.1, and control returns back to player at operation 1.9.4.2. LoadTag calls out to ad decision server to load preroll ad tag at operation 1.9.5. The ad decision server calls out to multiple providers to determine the best ad to traffic, for example, at operation 1.9.5.1, and the VAST payload of the winning (or waterfall) ad is returned to the player at operation 1.9.5.2.

Next, the player will load the appropriate creatives for the preroll advertisement at operation 1.9.6, and content is returned from the ad content delivery network at operation 1.9.7. The preroll advertisement is trafficked for the browser at operation 1.9.8, and onAdComplete fires (or the watchdog timer expires and the ad load is aborted) at operation 1.9.9. Computing the live stream duration may be performed, if the stream is less than 300 s (defined value), then the live stream may forwarded to the beginning of the live stream to provide the start of the stream for ad flexing, otherwise, the stream may be played in near real-time at operation 1.9.9.1.

At operation 1.9.10, the live stream beings playback. Every 4-8 seconds, or other configurable period, the player loads the variant HLS stream via Sinclair Proxy API at operation 1.9.11. The variant stream is requested from the CDN at oepriaton 1.9.11.1, and the variant stream is returned (with new segments if applicable) to the Proxy API at operation 1.9.11.2. Business rules or other rules for ad flexing may be applied to the variant stream at operation 1.9.11.3, and the final variant stream may be returned to the player at operation 1.9.11.4.

At operation 1.9.12, the next transport stream segment may be played. During the playback of the live stream, an in-band metadata event may fire based upon metadata injected into the stream, and may contain a start of ad-break signal at operation 1.9.13. The metadata event payload may be inspected at operation 1.9.13.1, if it matches a format of PODSTART:n message (where N is the segment number), then prepare for a midroll ad break, setTimer for 990 ms, pause the stream, and set a variable with the current stream duration for checking if the stream has resumed encoding. At operation 1.9.13.2, a Midroll ad is trafficked via a specified midroll VAST tag. The Midroll ad tag is requested from the ad decision server at operation 1.9.13.2.1, the ad decision server responds with VAST payload at operation 1.9.13.2.2, the VAST midroll ad is trafficked on the player at operation 1.9.13.2.3, and onAdComplete fires when the trafficked ad has completed playback at operation 1.9.13.2.4.

The current stream duration may be requested at operation 1.9.13.2.4.1, and the current stream duration returned at operation 1.9.13.2.4.2. If the current stream duration is greater than (>) the duration at the start of the ad break, at operation 1.9.13.2.4.2, then the midroll ad break is complete, and playback of the live stream may be resumed. Otherwise, the midroll ad break sequence may be repeated until the stream goes off air.

Some aspects of the above process may include background Status API polling, which may further include the Status API endpointbeing invoked every minute or other period to check for any change in underlying stream or override state at operation 1.9.13.2.4.4. The Status API may return state information in a JSON payload at operation 1.9.13.2.4.5. The javascript may check for a different assetId, or override state at operation 1.9.13.2.4.6. If this does not match the current live stream players parameters, then the stream playback is switched to these new parameters and the sequence begins from operation 1.9 (play).

Figure 28A:
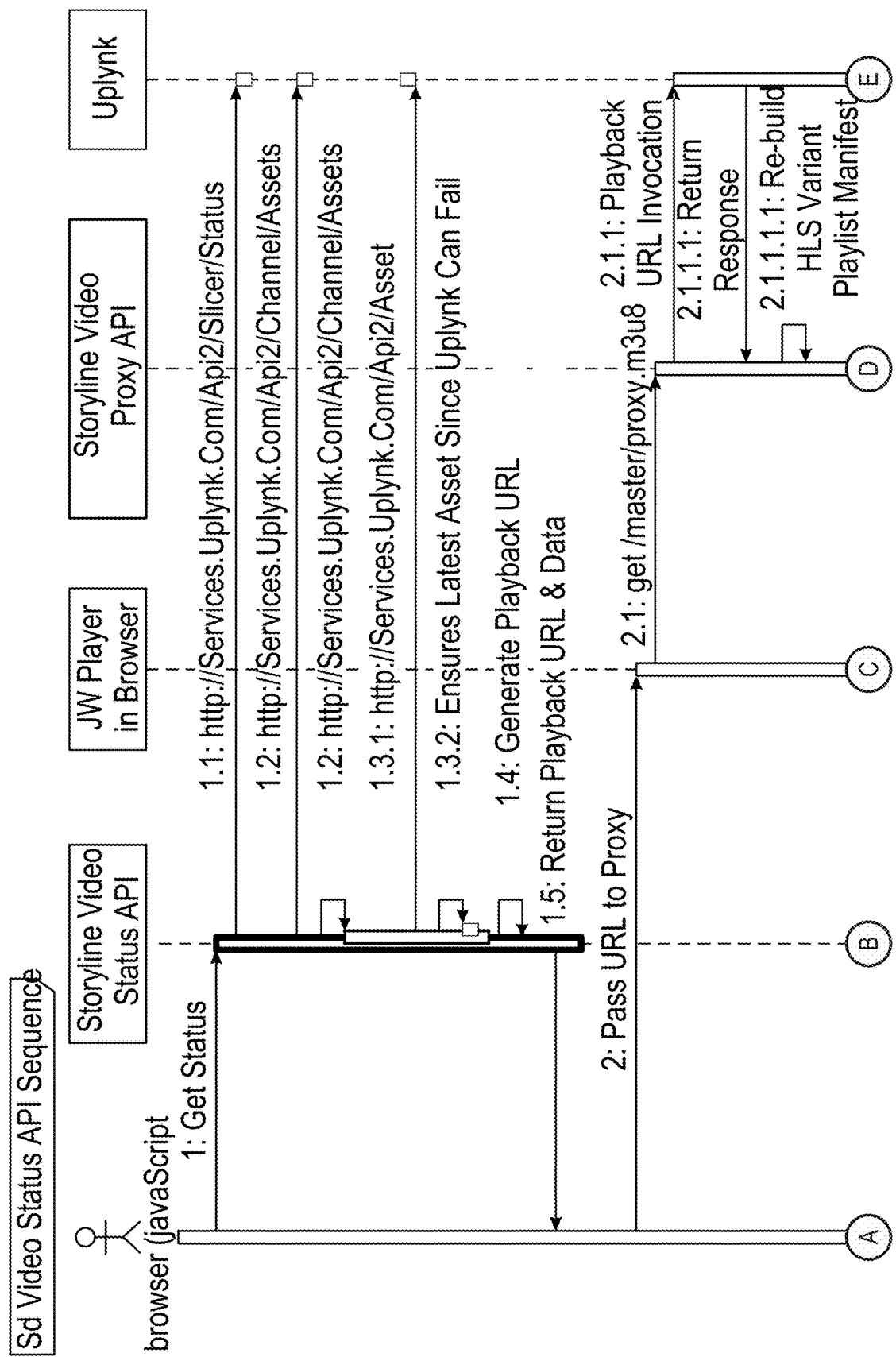
FIGS. 28A and 28B illustrate an example sequence diagram for determining video status.
Figure 28B:
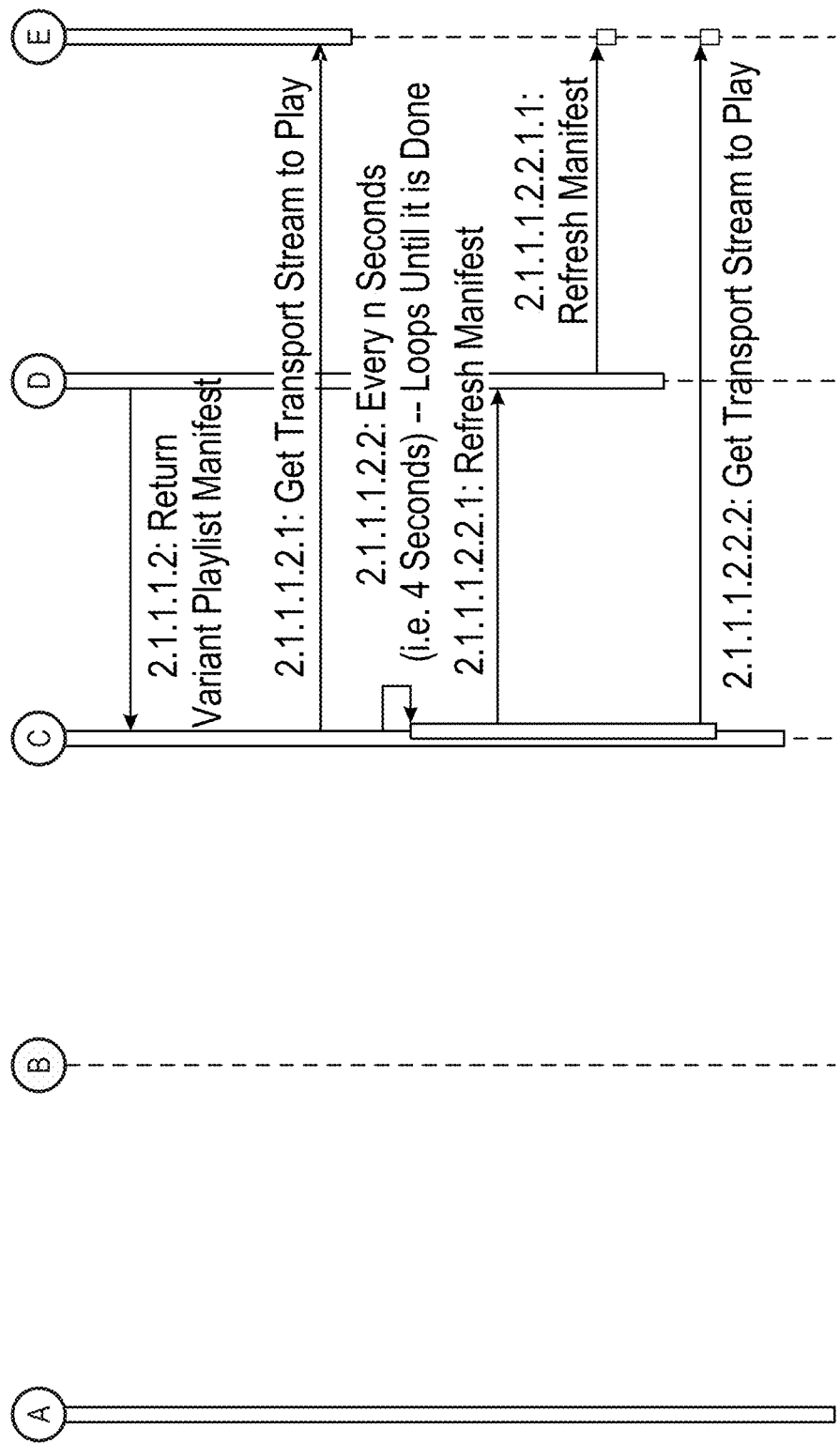

FIGS. 28A and 28B illustrate an example sequence diagram for determining video status, for example, by a video status API, as described aboe in reference to FIGS. 26 and 27.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

What is claimed is:

1. A method, comprising:
   selecting a plurality of brand templates;
   after each of the selections, generating a set of properties, (i) by applying a portion of a plurality of settings of the respective brand template, the remaining portion of the settings being overridden with a set of other settings for a channel communicating a presentation from a plurality of presentations to at least one of the set of properties at a node of a network involved in the communication, (ii) comprising a set of sections each configured for a different focus area or type of content, and (iii) being associated with at least one tag to enable brand-level-targeting;
   identifying a plurality of filters; and
   based on each of the identifications, selecting the at least one property from among the generated sets of properties based on comparisons with the associated tags, wherein the plurality of presentations comprise different renditions of the same content.

2. The method of claim 1, wherein the properties are organized in a hierarchy.

3. The method of claim 1, further comprising:
   after at least one of the presentations is published, ensuring a lock is applied to at least one of the properties in the respective set to prevent editing such that at least one of a brand control criterion or a consistency criterion is satisfied.

4. The method of claim 1, wherein the overriding is such that the respective brand template is better fitted or formatted to the property by including an adjustment to at least one of an area, space, aspect ratio, or resolution.

5. The method of claim 1, further comprising:
   cascading a set of changes made to shared components or shared presentation templates to update presentations and brands across the network with new or corrected functionality.

6. The method of claim 1, further comprising:
   providing a user interface for use with a computer in controlling at least one of the presentations.

7. The method of claim 6, wherein at least one of the brand templates includes a plurality of themed templates, and
   wherein each of the properties has a web page structure defined by a template linked to one or more of the properties.

8. The method of claim 7, wherein a preview provides a display, to a user of the user interface, of the content rendition in the respective webpage structure based on the respective brand template such that the user sees a potential visual impact across a plurality of different channels.

9. The method of claim 1, wherein at least one of the brand templates comprises a set of each of fonts, logos, and style guides, being visually manageable via a brand management interface.

10. The method of claim 1, wherein an access right of the presentations is shared.

11. A system, comprising:
    a processor; and
    a computer-readable storage medium comprising instructions that, upon execution, cause the processor to perform:
       selecting a plurality of brand templates;
       after each of the selections, generating a set of properties, (i) by applying a portion of a plurality of settings of the respective brand template, the remaining portion of the settings being overridden with a set of other settings for a channel communicating a presentation from a plurality of presentations to at least one of the set of properties at a node of a network involved in the communication, (ii) comprising a set of sections each configured for a different focus area or type of content, and (iii) being associated with at least one tag to enable brand-level-targeting;
       identifying a plurality of filters; and
       based on each of the identifications, selecting the at least one property from among the generated sets of properties based on comparisons with the associated tags, wherein the plurality of presentations comprise different renditions of the same content.

* * * * *